(12) United States Patent  
Pleis et al.

(10) Patent No.: US 8,533,677 B1
(45) Date of Patent: Sep. 10, 2013

(54) GRAPHICAL USER INTERFACE FOR DYNAMICALLY RECONFIGURING A PROGRAMMABLE DEVICE

(75) Inventors: Matthew A. Pleis, Carnation, WA (US); Kenneth Y. Ogami, Bothell, WA (US); Marat Zhaksilikov, Snohomish, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1073 days.

(21) Appl. No.: 10/256,829

(22) Filed: Sep. 27, 2002

Related U.S. Application Data

(63) Continuation of application No. 09/989,817, filed on Nov. 19, 2001, now Pat. No. 6,971,004.

(51) Int. Cl.
*G06F 9/45* (2006.01)

(52) U.S. Cl.
USPC .......................................................... 717/121

(58) Field of Classification Search
USPC ......... 715/202, 530–810, 500; 709/202–223; 716/1, 4–18; 710/8; 703/22; 717/105–172; 345/762
See application file for complete search history.

(56) References Cited

U.S. PATENT DOCUMENTS

| | | | |
|---|---|---|---|
| 3,600,690 A | 8/1971 | White | |
| 3,725,804 A | 4/1973 | Langan | |
| 3,740,588 A | 6/1973 | Stratton et al. | |
| 3,805,245 A | 4/1974 | Brooks et al. | |
| 3,810,036 A | 5/1974 | Bloedorn | |
| 3,831,113 A | 8/1974 | Ahmed | |
| 3,845,328 A | 10/1974 | Hollingsworth | |
| 3,940,760 A | 2/1976 | Brokaw | |
| 4,061,987 A | 12/1977 | Nagahama | |
| 4,134,073 A | 1/1979 | MacGregor | |
| 4,138,671 A | 2/1979 | Comer et al. | |
| 4,176,258 A | 11/1979 | Jackson | |
| 4,250,464 A | 2/1981 | Schade, Jr. | |
| 4,272,760 A | 6/1981 | Prazak et al. | |

(Continued)

FOREIGN PATENT DOCUMENTS

| | | |
|---|---|---|
| DE | 19710829 A1 | 9/1998 |
| EP | 0308583 A | 3/1989 |

(Continued)

OTHER PUBLICATIONS

Pleis et al., U.S. Appl. No. 13/182,431 received Jul. 13, 2011.*

(Continued)

*Primary Examiner* — John Chavis

(57) ABSTRACT

Embodiments for an interface, system and method enabling dynamic reconfiguration of an electronic device are disclosed. The interface enables operations, such as adding or deleting a device configuration and switching between different device configuration views/workspaces. In some embodiments, the system and method apply global device parameter values to each device configuration and/or allow only valid or legal states for device configurations beyond the first configuration. In another embodiment, the electronic device includes a microprocessor, a plurality of internal peripherals, an interconnecting component, an external coupling port, and a memory for storing instructions. The plurality of internal peripherals, the interconnecting component and the external coupling port are programmably configurable to perform a variety of functions. The instructions stored by the memory facilitate dynamic reconfiguration of the electronic device. Based upon the existence of a predetermined condition, the electronic device is automatically reconfigured by activating different configuration images.

11 Claims, 6 Drawing Sheets

(56) References Cited

U.S. PATENT DOCUMENTS

| | | |
|---|---|---|
| 4,283,713 A | 8/1981 | Philipp |
| 4,326,135 A | 4/1982 | Jarrett et al. |
| 4,344,067 A | 8/1982 | Lee |
| 4,380,083 A | 4/1983 | Andersson et al. |
| 4,438,404 A | 3/1984 | Philipp |
| 4,475,151 A | 10/1984 | Philipp |
| 4,497,575 A | 2/1985 | Philipp |
| 4,571,507 A | 2/1986 | Collings |
| 4,604,363 A | 8/1986 | Newhouse et al. |
| 4,608,502 A | 8/1986 | Dijkmans et al. |
| 4,656,603 A | 4/1987 | Dunn |
| 4,670,838 A | 6/1987 | Kawata |
| 4,689,740 A | 8/1987 | Moelands et al. |
| 4,692,718 A | 9/1987 | Roza et al. |
| 4,701,907 A | 10/1987 | Collins |
| 4,727,541 A | 2/1988 | Mori et al. |
| 4,736,097 A | 4/1988 | Philipp |
| 4,740,966 A | 4/1988 | Goad |
| 4,755,766 A | 7/1988 | Metz |
| 4,773,024 A | 9/1988 | Faggin et al. |
| 4,794,558 A | 12/1988 | Thompson |
| 4,802,103 A | 1/1989 | Faggin et al. |
| 4,802,119 A | 1/1989 | Heene et al. |
| 4,807,183 A | 2/1989 | Kung et al. |
| 4,809,345 A | 2/1989 | Tabata et al. |
| 4,812,684 A | 3/1989 | Yamagiwa et al. |
| 4,813,013 A | 3/1989 | Dunn |
| 4,827,401 A | 5/1989 | Hrustich et al. |
| 4,831,546 A | 5/1989 | Mitsuta et al. |
| 4,833,418 A | 5/1989 | Quintus et al. |
| 4,868,525 A | 9/1989 | Dias |
| 4,876,466 A | 10/1989 | Kondou et al. |
| 4,876,534 A | 10/1989 | Mead et al. |
| 4,878,200 A | 10/1989 | Asghar et al. |
| 4,879,461 A | 11/1989 | Philipp |
| 4,879,688 A | 11/1989 | Turner et al. |
| 4,885,484 A | 12/1989 | Gray |
| 4,907,121 A | 3/1990 | Hrassky |
| 4,935,702 A | 6/1990 | Mead et al. |
| 4,939,637 A | 7/1990 | Pawloski |
| 4,942,540 A | 7/1990 | Black et al. |
| 4,947,169 A | 8/1990 | Smith et al. |
| 4,953,928 A | 9/1990 | Anderson et al. |
| 4,962,342 A | 10/1990 | Mead et al. |
| 4,964,074 A | 10/1990 | Suzuki et al. |
| 4,969,087 A | 11/1990 | Tanagawa et al. |
| 4,970,408 A | 11/1990 | Hanke et al. |
| 4,972,372 A | 11/1990 | Ueno |
| 4,977,381 A | 12/1990 | Main |
| 4,980,652 A | 12/1990 | Tarusawa et al. |
| 4,999,519 A | 3/1991 | Kitsukawa et al. |
| 5,043,674 A | 8/1991 | Bonaccio et al. |
| 5,049,758 A | 9/1991 | Mead et al. |
| 5,050,168 A | 9/1991 | Paterson |
| 5,053,949 A | 10/1991 | Allison et al. |
| 5,055,827 A | 10/1991 | Philipp |
| 5,059,920 A | 10/1991 | Anderson et al. |
| 5,068,622 A | 11/1991 | Mead et al. |
| 5,073,759 A | 12/1991 | Mead et al. |
| 5,083,044 A | 1/1992 | Mead et al. |
| 5,088,822 A | 2/1992 | Kanda |
| 5,095,284 A | 3/1992 | Mead |
| 5,097,305 A | 3/1992 | Mead et al. |
| 5,099,191 A | 3/1992 | Galler et al. |
| 5,107,146 A | 4/1992 | El-Ayat |
| 5,107,149 A | 4/1992 | Platt et al. |
| 5,109,261 A | 4/1992 | Mead et al. |
| 5,119,038 A | 6/1992 | Anderson et al. |
| 5,120,996 A | 6/1992 | Mead et al. |
| 5,122,800 A | 6/1992 | Philipp |
| 5,126,685 A | 6/1992 | Platt et al. |
| 5,127,103 A | 6/1992 | Hill et al. |
| 5,128,871 A | 7/1992 | Schmitz |
| 5,136,188 A | 8/1992 | Ha et al. |
| 5,140,197 A | 8/1992 | Grider |
| 5,142,247 A | 8/1992 | Lada et al. |
| 5,144,582 A | 9/1992 | Steele |
| 5,146,106 A | 9/1992 | Anderson et al. |
| 5,150,079 A | 9/1992 | Williams et al. |
| 5,155,836 A | 10/1992 | Jordan et al. |
| 5,159,292 A | 10/1992 | Canfield et al. |
| 5,159,335 A | 10/1992 | Veneruso |
| 5,160,899 A | 11/1992 | Anderson et al. |
| 5,161,124 A | 11/1992 | Love |
| 5,165,054 A | 11/1992 | Platt et al. |
| 5,166,562 A | 11/1992 | Allen et al. |
| 5,175,884 A | 12/1992 | Suarez |
| 5,179,531 A | 1/1993 | Yamaki |
| 5,184,061 A | 2/1993 | Lee et al. |
| 5,198,817 A | 3/1993 | Walden et al. |
| 5,200,751 A | 4/1993 | Smith |
| 5,202,687 A | 4/1993 | Distinti |
| 5,204,549 A | 4/1993 | Platt et al. |
| 5,206,582 A | 4/1993 | Ekstedt et al. |
| 5,220,512 A | 6/1993 | Watkins et al. |
| 5,225,991 A | 7/1993 | Dougherty |
| 5,230,000 A | 7/1993 | Mozingo et al. |
| 5,235,617 A | 8/1993 | Mallard, Jr. |
| 5,241,492 A | 8/1993 | Girardeau, Jr. |
| 5,243,554 A | 9/1993 | Allen et al. |
| 5,245,262 A | 9/1993 | Moody et al. |
| 5,248,843 A | 9/1993 | Billings |
| 5,248,873 A | 9/1993 | Allen et al. |
| 5,258,760 A | 11/1993 | Moody et al. |
| 5,260,592 A | 11/1993 | Mead et al. |
| 5,260,979 A | 11/1993 | Parker et al. |
| 5,270,963 A | 12/1993 | Allen et al. |
| 5,276,407 A | 1/1994 | Mead et al. |
| 5,276,890 A | 1/1994 | Arai |
| 5,280,199 A | 1/1994 | Itakura |
| 5,280,202 A | 1/1994 | Chan et al. |
| 5,289,023 A | 2/1994 | Mead |
| 5,303,329 A | 4/1994 | Mead et al. |
| 5,304,955 A | 4/1994 | Atriss et al. |
| 5,305,017 A | 4/1994 | Gerphide |
| 5,305,312 A | 4/1994 | Fornek et al. |
| 5,307,381 A | 4/1994 | Ahuja |
| 5,313,618 A | 5/1994 | Pawloski |
| 5,317,202 A | 5/1994 | Waizman |
| 5,319,370 A | 6/1994 | Signore et al. |
| 5,319,771 A | 6/1994 | Takeda |
| 5,321,828 A | 6/1994 | Phillips et al. |
| 5,324,958 A | 6/1994 | Mead et al. |
| 5,325,512 A | 6/1994 | Takahashi |
| 5,329,471 A | 7/1994 | Swoboda et al. |
| 5,331,215 A | 7/1994 | Allen et al. |
| 5,331,315 A | 7/1994 | Crosette |
| 5,331,571 A | 7/1994 | Aronoff et al. |
| 5,334,952 A | 8/1994 | Maddy et al. |
| 5,335,342 A | 8/1994 | Pope et al. |
| 5,336,936 A | 8/1994 | Allen et al. |
| 5,339,213 A | 8/1994 | O'Callaghan |
| 5,339,262 A | 8/1994 | Rostoker et al. |
| 5,341,044 A | 8/1994 | Ahanin et al. |
| 5,341,267 A | 8/1994 | Whitten |
| 5,345,195 A | 9/1994 | Cordoba et al. |
| 5,349,303 A | 9/1994 | Gerpheide |
| 5,355,097 A | 10/1994 | Scott et al. |
| 5,357,626 A | 10/1994 | Johnson et al. |
| 5,361,290 A | 11/1994 | Akiyama |
| 5,371,524 A | 12/1994 | Herczeg et al. |
| 5,371,860 A | 12/1994 | Mura et al. |
| 5,371,878 A | 12/1994 | Coker |
| 5,371,883 A | 12/1994 | Gross et al. |
| 5,374,787 A | 12/1994 | Miller et al. |
| 5,377,333 A | 12/1994 | Nakagoshi et al. |
| 5,378,935 A | 1/1995 | Korhonen et al. |
| 5,381,515 A | 1/1995 | Platt et al. |
| 5,384,467 A | 1/1995 | Plimon et al. |
| 5,384,745 A | 1/1995 | Konishi et al. |
| 5,384,910 A * | 1/1995 | Torres ............ 715/810 |
| 5,390,173 A | 2/1995 | Spinney et al. |
| 5,392,784 A | 2/1995 | Gudaitis |
| 5,394,522 A | 2/1995 | Sanchez-Frank et al. |

| | | | | | | |
|---|---|---|---|---|---|---|
| 5,396,245 A | 3/1995 | Rempfer | | 5,594,388 A | 1/1997 | O'Shaughnessy et al. |
| 5,398,261 A | 3/1995 | Marbot | | 5,594,734 A | 1/1997 | Worsley et al. |
| 5,399,922 A | 3/1995 | Kiani et al. | | 5,594,876 A | 1/1997 | Getzlaff et al. |
| 5,408,194 A | 4/1995 | Steinbach et al. | | 5,594,890 A | 1/1997 | Yamaura et al. |
| 5,414,308 A | 5/1995 | Lee et al. | | 5,600,262 A | 2/1997 | Kolze |
| 5,414,380 A | 5/1995 | Floyd et al. | | 5,604,466 A | 2/1997 | Dreps et al. |
| 5,416,895 A | 5/1995 | Anderson et al. | | 5,608,892 A | 3/1997 | Wakerly |
| 5,422,823 A | 6/1995 | Agrawal et al. | | 5,614,861 A | 3/1997 | Harada |
| 5,424,689 A | 6/1995 | Gillig et al. | | 5,619,430 A | 4/1997 | Nolan et al. |
| 5,426,378 A | 6/1995 | Ong | | 5,625,316 A | 4/1997 | Chambers et al. |
| 5,426,384 A | 6/1995 | May | | 5,629,857 A | 5/1997 | Brennan |
| 5,428,319 A | 6/1995 | Marvin et al. | | 5,629,891 A | 5/1997 | LeMoncheck et al. |
| 5,430,395 A | 7/1995 | Ichimaru | | 5,630,052 A | 5/1997 | Shah |
| 5,430,687 A | 7/1995 | Hung et al. | | 5,630,057 A | 5/1997 | Hait |
| 5,430,734 A | 7/1995 | Gilson | | 5,630,102 A | 5/1997 | Johnson et al. |
| 5,432,476 A | 7/1995 | Tran | | 5,631,577 A | 5/1997 | Freidin et al. |
| 5,438,672 A | 8/1995 | Dey | | 5,633,766 A | 5/1997 | Hase et al. |
| 5,440,305 A | 8/1995 | Signore et al. | | 5,642,295 A | 6/1997 | Smayling |
| 5,451,887 A | 9/1995 | El-Avat et al. | | 5,646,544 A | 7/1997 | Iadanza |
| 5,453,904 A | 9/1995 | Higashiyama et al. | | 5,646,901 A | 7/1997 | Sharpe-Geisler et al. |
| 5,455,525 A | 10/1995 | Ho et al. | | 5,648,642 A | 7/1997 | Miller et al. |
| 5,455,731 A | 10/1995 | Parkinson | | 5,651,035 A | 7/1997 | Tozun |
| 5,455,927 A | 10/1995 | Huang | | 5,663,900 A | 9/1997 | Bhandari et al. |
| 5,457,410 A | 10/1995 | Ting | | 5,663,965 A | 9/1997 | Seymour |
| 5,457,479 A | 10/1995 | Cheng | | 5,664,199 A | 9/1997 | Kuwahara |
| 5,463,591 A | 10/1995 | Aimoto et al. | | 5,666,480 A | 9/1997 | Leung et al. |
| 5,479,603 A * | 12/1995 | Stone et al. ............... 715/804 | | 5,670,915 A | 9/1997 | Cooper et al. |
| 5,479,643 A | 12/1995 | Bhaskar et al. | | 5,673,198 A | 9/1997 | Lawman et al. |
| 5,479,652 A | 12/1995 | Dreyer et al. | | 5,675,825 A | 10/1997 | Dreyer et al. |
| 5,481,471 A | 1/1996 | Naglestad et al. | | 5,677,691 A | 10/1997 | Hosticka et al. |
| 5,488,204 A | 1/1996 | Mead et al. | | 5,680,070 A | 10/1997 | Anderson et al. |
| 5,491,458 A | 2/1996 | McCune | | 5,682,032 A | 10/1997 | Philipp |
| 5,493,246 A | 2/1996 | Anderson | | 5,684,434 A | 11/1997 | Mann et al. |
| 5,493,723 A | 2/1996 | Beck et al. | | 5,684,952 A | 11/1997 | Stein |
| 5,495,077 A | 2/1996 | Miller et al. | | 5,686,844 A | 11/1997 | Hull et al. |
| 5,495,593 A | 2/1996 | Elmer et al. | | 5,687,325 A | 11/1997 | Chang |
| 5,495,594 A | 2/1996 | MacKenna et al. | | 5,689,195 A | 11/1997 | Cliff et al. |
| 5,497,119 A | 3/1996 | Tedrow et al. | | 5,689,196 A | 11/1997 | Schutte |
| 5,499,192 A | 3/1996 | Knapp et al. | | 5,691,664 A | 11/1997 | Anderson et al. |
| 5,500,823 A | 3/1996 | Martin et al. | | 5,691,898 A | 11/1997 | Rosenberg et al. |
| 5,517,198 A | 5/1996 | McEwan | | 5,694,063 A | 12/1997 | Burlison et al. |
| 5,519,854 A | 5/1996 | Watt | | 5,696,952 A | 12/1997 | Pontarelli |
| 5,521,529 A | 5/1996 | Agrawal et al. | | 5,699,024 A | 12/1997 | Manlove et al. |
| 5,530,444 A | 6/1996 | Tice et al. | | 5,703,871 A | 12/1997 | Pope et al. |
| 5,530,673 A | 6/1996 | Tobita et al. | | 5,706,453 A | 1/1998 | Cheng et al. |
| 5,530,813 A | 6/1996 | Paulsen et al. | | 5,708,589 A | 1/1998 | Beauvais |
| 5,537,057 A | 7/1996 | Leong et al. | | 5,708,798 A | 1/1998 | Lynch et al. |
| 5,541,878 A | 7/1996 | LeMoncheck et al. | | 5,710,906 A | 1/1998 | Ghosh et al. |
| 5,542,055 A | 7/1996 | Amini et al. | | 5,712,969 A | 1/1998 | Zimmermann et al. |
| 5,543,588 A | 8/1996 | Bisset et al. | | 5,721,931 A | 2/1998 | Gephardt et al. |
| 5,543,590 A | 8/1996 | Gillespie et al. | | 5,724,009 A | 3/1998 | Collins et al. |
| 5,543,591 A | 8/1996 | Gillespie et al. | | 5,727,170 A | 3/1998 | Mitchell et al. |
| 5,544,067 A | 8/1996 | Rostoker et al. | | 5,729,704 A * | 3/1998 | Stone et al. ............... 715/804 |
| 5,544,311 A | 8/1996 | Harenberg et al. | | 5,730,165 A | 3/1998 | Philipp |
| 5,546,433 A | 8/1996 | Tran et al. | | 5,732,277 A | 3/1998 | Kodosky et al. |
| 5,546,562 A | 8/1996 | Patel | | 5,734,272 A | 3/1998 | Belot et al. |
| 5,552,725 A | 9/1996 | Ray et al. | | 5,734,334 A | 3/1998 | Hsieh et al. |
| 5,552,748 A | 9/1996 | O'Shaughnessy | | 5,737,557 A | 4/1998 | Sullivan |
| 5,554,951 A | 9/1996 | Gough | | 5,737,760 A | 4/1998 | Grimmer et al. |
| 5,555,452 A | 9/1996 | Callaway et al. | | 5,745,011 A | 4/1998 | Scott |
| 5,555,907 A | 9/1996 | Philipp | | 5,748,048 A | 5/1998 | Moyal |
| 5,557,762 A | 9/1996 | Okuaki et al. | | 5,748,875 A | 5/1998 | Tzori |
| 5,559,502 A | 9/1996 | Schutte | | 5,752,013 A | 5/1998 | Christensen et al. |
| 5,559,996 A | 9/1996 | Fujioka et al. | | 5,754,552 A | 5/1998 | Allmond et al. |
| 5,563,526 A | 10/1996 | Hastings et al. | | 5,754,826 A | 5/1998 | Gamal et al. |
| 5,563,529 A | 10/1996 | Seltzer et al. | | 5,757,368 A | 5/1998 | Gerpheide et al. |
| 5,564,010 A | 10/1996 | Henry et al. | | 5,758,058 A | 5/1998 | Milburn |
| 5,564,108 A | 10/1996 | Hunsaker et al. | | 5,761,128 A | 6/1998 | Watanabe |
| 5,565,658 A | 10/1996 | Gerpheide et al. | | 5,763,909 A | 6/1998 | Mead et al. |
| 5,566,702 A | 10/1996 | Philipp | | 5,764,714 A | 6/1998 | Stansell et al. |
| 5,572,665 A | 11/1996 | Nakabayashi et al. | | 5,767,457 A | 6/1998 | Gerpheide et al. |
| 5,572,719 A | 11/1996 | Biesterfeldt | | 5,774,704 A | 6/1998 | Williams |
| 5,574,678 A | 11/1996 | Gorecki | | 5,777,399 A | 7/1998 | Shibuya |
| 5,574,852 A | 11/1996 | Bakker et al. | | 5,781,030 A | 7/1998 | Agrawal et al. |
| 5,574,892 A | 11/1996 | Christensen | | 5,781,747 A | 7/1998 | Smith et al. |
| 5,579,353 A | 11/1996 | Parmenter et al. | | 5,784,545 A | 7/1998 | Anderson et al. |
| 5,587,945 A | 12/1996 | Lin et al. | | 5,790,957 A | 8/1998 | Heidari |
| 5,587,957 A | 12/1996 | Kowalczyk et al. | | 5,796,183 A | 8/1998 | Hourmand |
| 5,590,354 A | 12/1996 | Klapproth et al. | | 5,799,176 A | 8/1998 | Kapusta et al. |

| | | | | | | |
|---|---|---|---|---|---|---|
| 5,802,073 A | 9/1998 | Platt | | 5,941,991 A | 8/1999 | Kageshima |
| 5,802,290 A | 9/1998 | Casselman | | 5,942,733 A | 8/1999 | Allen et al. |
| 5,805,792 A | 9/1998 | Swoboda et al. | | 5,943,052 A | 8/1999 | Allen et al. |
| 5,805,897 A | 9/1998 | Glowny | | 5,945,878 A | 8/1999 | Westwick et al. |
| 5,808,883 A | 9/1998 | Hawkes | | 5,949,632 A | 9/1999 | Barreras, Sr. et al. |
| 5,811,987 A | 9/1998 | Ashmore, Jr. et al. | | 5,952,888 A | 9/1999 | Scott |
| 5,812,698 A | 9/1998 | Platt et al. | | 5,956,279 A | 9/1999 | Mo et al. |
| 5,818,254 A | 10/1998 | Agrawal et al. | | 5,959,871 A | 9/1999 | Pierzchala et al. |
| 5,818,444 A | 10/1998 | Alimpich et al. | | 5,963,075 A | 10/1999 | Hiiragizawa |
| 5,819,028 A | 10/1998 | Manghirmalani et al. | | 5,963,105 A | 10/1999 | Nguyen |
| 5,822,387 A | 10/1998 | Mar | | 5,963,503 A | 10/1999 | Lee |
| 5,822,531 A | 10/1998 | Gorczyca et al. | | 5,964,893 A | 10/1999 | Circello et al. |
| 5,828,693 A | 10/1998 | Mays et al. | | 5,966,027 A | 10/1999 | Kapusta et al. |
| 5,838,583 A | 11/1998 | Varadarajan et al. | | 5,966,532 A | 10/1999 | McDonald et al. |
| 5,841,078 A | 11/1998 | Miller et al. | | 5,968,135 A | 10/1999 | Teramoto et al. |
| 5,841,996 A | 11/1998 | Nolan et al. | | 5,969,513 A | 10/1999 | Clark |
| 5,844,256 A | 12/1998 | Higashino | | 5,969,632 A | 10/1999 | Diamant et al. |
| 5,844,404 A | 12/1998 | Caser et al. | | 5,973,368 A | 10/1999 | Pearce et al. |
| 5,848,285 A | 12/1998 | Kapusta et al. | | 5,974,235 A * | 10/1999 | Nunally et al. ............... 709/202 |
| 5,850,156 A | 12/1998 | Wittman | | 5,977,791 A | 11/1999 | Veenstra |
| 5,852,733 A | 12/1998 | Chien et al. | | 5,978,584 A | 11/1999 | Nishibata et al. |
| 5,854,625 A | 12/1998 | Frisch et al. | | 5,978,937 A | 11/1999 | Miyamori et al. |
| 5,857,109 A | 1/1999 | Taylor | | 5,982,105 A | 11/1999 | Masters |
| 5,861,583 A | 1/1999 | Schediwy et al. | | 5,982,229 A | 11/1999 | Wong et al. |
| 5,861,875 A | 1/1999 | Gerpheide | | 5,982,241 A | 11/1999 | Nguyen et al. |
| 5,864,242 A | 1/1999 | Allen et al. | | 5,983,277 A | 11/1999 | Heile et al. |
| 5,864,392 A | 1/1999 | Winklhofer et al. | | 5,986,479 A | 11/1999 | Mohan |
| 5,867,015 A | 2/1999 | Corsi et al. | | 5,987,246 A | 11/1999 | Thomsen et al. |
| 5,867,046 A | 2/1999 | Sugasawa | | 5,988,902 A | 11/1999 | Holehan |
| 5,867,399 A | 2/1999 | Rostoker et al. | | 5,994,939 A | 11/1999 | Johnson et al. |
| 5,869,979 A | 2/1999 | Bocchino | | 5,996,032 A | 11/1999 | Baker |
| 5,870,004 A | 2/1999 | Lu | | 5,999,725 A | 12/1999 | Barbier et al. |
| 5,870,309 A | 2/1999 | Lawman | | 6,002,268 A | 12/1999 | Sasaki et al. |
| 5,870,345 A | 2/1999 | Stecker | | 6,002,398 A | 12/1999 | Wilson |
| 5,872,464 A | 2/1999 | Gradinariu | | 6,003,054 A | 12/1999 | Oshima et al. |
| 5,874,958 A | 2/1999 | Ludolph | | 6,003,107 A | 12/1999 | Ranson et al. |
| 5,875,293 A | 2/1999 | Bell et al. | | 6,003,133 A | 12/1999 | Moughanni et al. |
| 5,877,656 A | 3/1999 | Mann et al. | | 6,005,814 A | 12/1999 | Mulholland et al. |
| 5,878,425 A | 3/1999 | Redpath | | 6,005,904 A | 12/1999 | Knapp et al. |
| 5,880,411 A | 3/1999 | Gillespie et al. | | 6,008,685 A | 12/1999 | Kunst |
| 5,880,598 A | 3/1999 | Duong | | 6,008,703 A | 12/1999 | Perrott et al. |
| 5,883,623 A | 3/1999 | Cseri | | 6,009,270 A | 12/1999 | Mann |
| 5,886,582 A | 3/1999 | Stansell | | 6,009,496 A | 12/1999 | Tsai |
| 5,887,189 A | 3/1999 | Birns et al. | | 6,011,407 A | 1/2000 | New |
| 5,889,236 A | 3/1999 | Gillespie et al. | | 6,012,835 A | 1/2000 | Thompson et al. |
| 5,889,723 A | 3/1999 | Pascucci | | 6,014,135 A | 1/2000 | Fernandes |
| 5,889,936 A | 3/1999 | Chan | | 6,014,509 A | 1/2000 | Furtek et al. |
| 5,889,988 A | 3/1999 | Held | | 6,014,723 A | 1/2000 | Tremblay et al. |
| 5,894,226 A | 4/1999 | Koyama | | 6,016,554 A | 1/2000 | Skrovan et al. |
| 5,894,243 A | 4/1999 | Hwang | | 6,016,563 A | 1/2000 | Fleisher |
| 5,894,565 A | 4/1999 | Furtek et al. | | 6,018,559 A | 1/2000 | Azegami et al. |
| 5,895,494 A | 4/1999 | Scalzi et al. | | 6,023,422 A | 2/2000 | Allen et al. |
| 5,896,068 A | 4/1999 | Moyal | | 6,023,565 A | 2/2000 | Lawman et al. |
| 5,896,330 A | 4/1999 | Gibson | | 6,026,134 A | 2/2000 | Duffy et al. |
| 5,898,345 A | 4/1999 | Namura et al. | | 6,026,501 A | 2/2000 | Hohl et al. |
| 5,900,780 A | 5/1999 | Hirose et al. | | 6,028,271 A | 2/2000 | Gillespie et al. |
| 5,901,062 A | 5/1999 | Burch et al. | | 6,028,959 A | 2/2000 | Wang et al. |
| 5,903,718 A | 5/1999 | Marik | | 6,031,365 A | 2/2000 | Sharpe-Geisler |
| 5,905,398 A | 5/1999 | Todsen et al. | | 6,032,268 A | 2/2000 | Swoboda et al. |
| 5,909,544 A | 6/1999 | Anderson, II et al. | | 6,034,538 A | 3/2000 | Abramovici |
| 5,911,059 A | 6/1999 | Profit, Jr. | | 6,037,807 A | 3/2000 | Wu et al. |
| 5,914,465 A | 6/1999 | Allen et al. | | 6,038,551 A | 3/2000 | Barlow et al. |
| 5,914,633 A | 6/1999 | Comino et al. | | 6,040,707 A | 3/2000 | Young et al. |
| 5,914,708 A | 6/1999 | LaGrange et al. | | 6,041,406 A | 3/2000 | Mann |
| 5,917,356 A | 6/1999 | Casal et al. | | 6,043,695 A | 3/2000 | O'Sullivan |
| 5,920,310 A | 7/1999 | Faggin et al. | | 6,043,719 A | 3/2000 | Lin et al. |
| 5,923,264 A | 7/1999 | Lavelle et al. | | 6,049,223 A | 4/2000 | Lytle et al. |
| 5,926,566 A | 7/1999 | Wang et al. | | 6,049,225 A | 4/2000 | Huang et al. |
| 5,929,710 A | 7/1999 | Bien | | 6,051,772 A | 4/2000 | Cameron et al. |
| 5,930,148 A | 7/1999 | Bjorksten et al. | | 6,052,035 A | 4/2000 | Nolan et al. |
| 5,930,150 A | 7/1999 | Cohen et al. | | 6,052,524 A | 4/2000 | Pauna |
| 5,931,959 A | 8/1999 | Kwiat | | 6,055,584 A | 4/2000 | Bridges et al. |
| 5,933,023 A | 8/1999 | Young | | 6,057,705 A | 5/2000 | Wojewoda et al. |
| 5,933,356 A | 8/1999 | Rostoker et al. | | 6,058,263 A | 5/2000 | Voth |
| 5,933,816 A | 8/1999 | Zeanah et al. | | 6,058,452 A | 5/2000 | Rangasayee et al. |
| 5,935,233 A | 8/1999 | Jeddeloh | | 6,061,511 A | 5/2000 | Marantz et al. |
| 5,935,266 A | 8/1999 | Thurnhofer et al. | | 6,066,961 A | 5/2000 | Lee et al. |
| 5,939,904 A | 8/1999 | Fetterman et al. | | 6,070,003 A | 5/2000 | Gove et al. |
| 5,939,949 A | 8/1999 | Olgaard et al. | | 6,072,803 A | 6/2000 | Allmond et al. |

| | | | |
|---|---|---|---|
| 6,075,941 A | 6/2000 Itoh et al. | 6,223,147 B1 | 4/2001 Bowers |
| 6,079,985 A | 6/2000 Wohl et al. | 6,223,272 B1 | 4/2001 Coehlo et al. |
| 6,081,140 A | 6/2000 King | RE37,195 E | 5/2001 Kean |
| 6,094,730 A | 7/2000 Lopez et al. | 6,225,866 B1 | 5/2001 Kubota et al. |
| 6,097,211 A | 8/2000 Couts-Martin et al. | 6,225,992 B1 | 5/2001 Hsu et al. |
| 6,097,432 A | 8/2000 Mead et al. | 6,236,242 B1 | 5/2001 Hedberg |
| 6,101,457 A | 8/2000 Barch et al. | 6,236,275 B1 | 5/2001 Dent |
| 6,101,617 A | 8/2000 Burckhartt et al. | 6,236,278 B1 | 5/2001 Olgaard |
| 6,104,217 A | 8/2000 Magana | 6,236,593 B1 | 5/2001 Hong et al. |
| 6,104,325 A | 8/2000 Liaw et al. | 6,239,389 B1 | 5/2001 Allen et al. |
| 6,107,769 A | 8/2000 Saylor et al. | 6,239,798 B1 | 5/2001 Ludolph et al. |
| 6,107,826 A | 8/2000 Young et al. | 6,240,375 B1 | 5/2001 Sonoda |
| 6,107,882 A | 8/2000 Gabara et al. | 6,246,258 B1 | 6/2001 Lesea |
| 6,110,223 A | 8/2000 Southgate et al. | 6,246,410 B1 | 6/2001 Bergeron et al. |
| 6,111,431 A | 8/2000 Estrada | 6,249,167 B1 | 6/2001 Oguchi et al. |
| 6,112,264 A | 8/2000 Beasley et al. | 6,249,447 B1 | 6/2001 Boylan et al. |
| 6,121,791 A | 9/2000 Abbott | 6,253,250 B1 | 6/2001 Evans et al. |
| 6,121,805 A | 9/2000 Thamsirianunt et al. | 6,253,754 B1 | 7/2001 Ward |
| 6,121,965 A | 9/2000 Kenney et al. | 6,262,717 B1 | 7/2001 Donohue et al. |
| 6,125,416 A | 9/2000 Warren | 6,263,302 B1 | 7/2001 Hellestrand et al. |
| 6,130,548 A | 10/2000 Koifman | 6,263,339 B1 | 7/2001 Hirsch |
| 6,130,551 A | 10/2000 Agrawal et al. | 6,263,484 B1 | 7/2001 Yang |
| 6,130,552 A | 10/2000 Jefferson et al. | 6,271,679 B1 | 8/2001 McClintock et al. |
| 6,133,773 A | 10/2000 Garlepp et al. | 6,272,646 B1 | 8/2001 Rangasayee |
| 6,134,181 A | 10/2000 Landry | 6,275,117 B1 | 8/2001 Abugharbieh et al. |
| 6,134,516 A | 10/2000 Wang et al. | 6,278,568 B1 | 8/2001 Cloke et al. |
| 6,137,308 A | 10/2000 Nayak | 6,280,391 B1 | 8/2001 Olson et al. |
| 6,140,853 A | 10/2000 Lo | 6,281,753 B1 | 8/2001 Corsi et al. |
| 6,141,007 A * | 10/2000 Lebling et al. ................ 715/792 | 6,282,547 B1 | 8/2001 Hirsch |
| 6,141,376 A | 10/2000 Shaw | 6,282,551 B1 | 8/2001 Anderson et al. |
| 6,141,764 A | 10/2000 Ezell | 6,286,127 B1 | 9/2001 King et al. |
| 6,144,327 A | 11/2000 Distinti et al. | 6,288,707 B1 | 9/2001 Philipp |
| 6,148,104 A | 11/2000 Wang et al. | 6,289,300 B1 | 9/2001 Brannick et al. |
| 6,148,441 A | 11/2000 Woodward | 6,289,478 B1 | 9/2001 Kitagaki |
| 6,149,299 A | 11/2000 Aslan et al. | 6,289,489 B1 | 9/2001 Bold et al. |
| 6,150,866 A | 11/2000 Eto et al. | 6,292,028 B1 | 9/2001 Tomita |
| 6,154,064 A | 11/2000 Proebsting | 6,294,932 B1 | 9/2001 Watarai |
| 6,157,024 A | 12/2000 Chapdelaine et al. | 6,294,962 B1 | 9/2001 Mar |
| 6,157,270 A | 12/2000 Tso | 6,298,320 B1 | 10/2001 Buckmaster et al. |
| 6,161,199 A | 12/2000 Szeto et al. | 6,304,014 B1 | 10/2001 England et al. |
| 6,166,367 A | 12/2000 Cho | 6,304,101 B1 | 10/2001 Nishihara |
| 6,166,960 A | 12/2000 Marneweck et al. | 6,304,790 B1 | 10/2001 Nakamura et al. |
| 6,167,077 A | 12/2000 Ducaroir | 6,307,413 B1 | 10/2001 Dalmia et al. |
| 6,167,559 A | 12/2000 Furtek et al. | 6,310,521 B1 | 10/2001 Dalmia |
| 6,169,383 B1 | 1/2001 Johnson | 6,310,611 B1 | 10/2001 Caldwell |
| 6,172,571 B1 | 1/2001 Moyal et al. | 6,311,149 B1 | 10/2001 Ryan et al. |
| 6,173,419 B1 | 1/2001 Barnett | 6,314,530 B1 | 11/2001 Mann |
| 6,175,914 B1 | 1/2001 Mann | 6,320,184 B1 | 11/2001 Winklhofer et al. |
| 6,175,949 B1 | 1/2001 Gristede et al. | 6,320,282 B1 | 11/2001 Caldwell |
| 6,181,163 B1 | 1/2001 Agrawal et al. | 6,321,369 B1 | 11/2001 Heile et al. |
| 6,183,131 B1 | 2/2001 Holloway et al. | 6,323,846 B1 | 11/2001 Westerman et al. |
| 6,185,127 B1 | 2/2001 Myers et al. | 6,324,628 B1 | 11/2001 Chan |
| 6,185,450 B1 | 2/2001 Seguine et al. | 6,326,859 B1 | 12/2001 Goldman et al. |
| 6,185,522 B1 | 2/2001 Bakker | 6,332,137 B1 | 12/2001 Hori et al. |
| 6,185,703 B1 | 2/2001 Guddat et al. | 6,332,201 B1 | 12/2001 Chin et al. |
| 6,185,732 B1 | 2/2001 Mann et al. | 6,337,579 B1 | 1/2002 Mochida |
| 6,188,228 B1 | 2/2001 Philipp | 6,338,109 B1 | 1/2002 Snyder et al. |
| 6,188,241 B1 | 2/2001 Gauthier et al. | 6,339,815 B1 | 1/2002 Feng et al. |
| 6,188,381 B1 | 2/2001 van der Wal et al. | 6,342,907 B1 | 1/2002 Petty et al. |
| 6,188,391 B1 | 2/2001 Seely et al. | 6,345,383 B1 | 2/2002 Ueki |
| 6,188,975 B1 | 2/2001 Gay | 6,347,395 B1 | 2/2002 Payne et al. |
| 6,191,603 B1 | 2/2001 Muradali et al. | 6,351,789 B1 | 2/2002 Green |
| 6,191,660 B1 | 2/2001 Mar et al. | 6,353,452 B1 | 3/2002 Hamada et al. |
| 6,191,998 B1 | 2/2001 Reddy et al. | 6,355,980 B1 | 3/2002 Callahan |
| 6,192,431 B1 | 2/2001 Dabral et al. | 6,356,862 B2 | 3/2002 Bailey |
| 6,198,303 B1 | 3/2001 Rangasayee | 6,356,958 B1 | 3/2002 Lin |
| 6,201,407 B1 | 3/2001 Kapusta et al. | 6,356,960 B1 | 3/2002 Jones et al. |
| 6,201,829 B1 | 3/2001 Schneider | 6,359,950 B2 | 3/2002 Gossmann et al. |
| 6,202,044 B1 | 3/2001 Tzori | 6,362,697 B1 | 3/2002 Pulvirenti |
| 6,204,687 B1 | 3/2001 Schultz et al. | 6,366,174 B1 | 4/2002 Berry et al. |
| 6,205,574 B1 | 3/2001 Dellinger et al. | 6,366,300 B1 | 4/2002 Ohara et al. |
| 6,208,572 B1 | 3/2001 Adams et al. | 6,366,874 B1 | 4/2002 Lee et al. |
| 6,211,708 B1 | 4/2001 Klemmer | 6,366,878 B1 | 4/2002 Grunert |
| 6,211,715 B1 | 4/2001 Terauchi | 6,369,660 B1 | 4/2002 Wei |
| 6,211,741 B1 | 4/2001 Dalmia | 6,371,878 B1 | 4/2002 Bowen |
| 6,215,352 B1 | 4/2001 Sudo | 6,373,954 B1 | 4/2002 Malcolm et al. |
| 6,219,729 B1 | 4/2001 Keats et al. | 6,374,370 B1 | 4/2002 Bockhaus et al. |
| 6,222,528 B1 | 4/2001 Gerpheide et al. | 6,377,009 B1 | 4/2002 Philipp |
| 6,223,144 B1 | 4/2001 Barnett et al. | 6,377,575 B1 | 4/2002 Mullaney et al. |

| | | | | | | |
|---|---|---|---|---|---|---|
| 6,377,646 B1 | 4/2002 | Sha | | 6,542,845 B1 | 4/2003 | Grucci et al. |
| 6,380,811 B1 | 4/2002 | Zarubinsky et al. | | 6,552,933 B1 | 4/2003 | Roohparvar |
| 6,380,929 B1 | 4/2002 | Platt | | 6,553,057 B1 | 4/2003 | Sha |
| 6,380,931 B1 | 4/2002 | Gillespie et al. | | 6,554,469 B1 | 4/2003 | Thomson et al. |
| 6,384,947 B1 | 5/2002 | Ackerman et al. | | 6,557,164 B1 | 4/2003 | Faustini |
| 6,385,742 B1 | 5/2002 | Kirsch et al. | | 6,559,685 B2 | 5/2003 | Green |
| 6,388,109 B1 | 5/2002 | Schwarz et al. | | 6,560,306 B1 | 5/2003 | Duffy et al. |
| 6,388,464 B1 | 5/2002 | Lacey et al. | | 6,560,699 B1 | 5/2003 | Konkle |
| 6,396,302 B2 | 5/2002 | New et al. | | 6,563,391 B1 | 5/2003 | Mar |
| 6,396,657 B1 | 5/2002 | Suzuki | | 6,564,179 B1 | 5/2003 | Belhaj |
| 6,397,232 B1 | 5/2002 | Cheng-Hung et al. | | 6,566,961 B2 | 5/2003 | Dasgupta et al. |
| 6,404,204 B1 | 6/2002 | Farruggia et al. | | 6,567,426 B1 | 5/2003 | van Hook et al. |
| 6,404,445 B1 | 6/2002 | Galea et al. | | 6,567,932 B2 | 5/2003 | Edwards et al. |
| 6,407,953 B1 | 6/2002 | Cleeves | | 6,570,557 B1 | 5/2003 | Westerman et al. |
| 6,408,432 B1 | 6/2002 | Herrmann et al. | | 6,571,331 B2 | 5/2003 | Henry et al. |
| 6,411,665 B1 | 6/2002 | Chan et al. | | 6,571,373 B1 | 5/2003 | Devins et al. |
| 6,411,974 B1 | 6/2002 | Graham et al. | | 6,574,590 B1 | 6/2003 | Kershaw et al. |
| 6,414,671 B1 | 7/2002 | Gillespie et al. | | 6,574,739 B1 | 6/2003 | Kung et al. |
| 6,421,698 B1 | 7/2002 | Hong | | 6,575,373 B1 | 6/2003 | Nakano |
| 6,425,109 B1 | 7/2002 | Choukalos et al. | | 6,577,258 B2 | 6/2003 | Ruha et al. |
| 6,429,882 B1 | 8/2002 | Abdelnur et al. | | 6,578,174 B1 | 6/2003 | Zizzo |
| 6,430,305 B1 | 8/2002 | Decker | | 6,580,329 B2 | 6/2003 | Sander |
| 6,433,645 B1 | 8/2002 | Mann et al. | | 6,581,191 B1 | 6/2003 | Schubert et al. |
| 6,434,187 B1 | 8/2002 | Beard | | 6,587,093 B1 | 7/2003 | Shaw et al. |
| 6,437,805 B1 | 8/2002 | Sojoodi et al. | | 6,587,995 B1 * | 7/2003 | Duboc et al. ............ 716/4 |
| 6,438,565 B1 | 8/2002 | Ammirato et al. | | 6,588,004 B1 | 7/2003 | Southgate et al. |
| 6,438,735 B1 | 8/2002 | McElvain et al. | | 6,590,422 B1 | 7/2003 | Dillon |
| 6,438,738 B1 | 8/2002 | Elayda | | 6,590,517 B1 | 7/2003 | Swanson |
| 6,441,073 B1 | 8/2002 | Tanaka et al. | | 6,591,369 B1 | 7/2003 | Edwards et al. |
| 6,445,211 B1 | 9/2002 | Saripella | | 6,592,626 B1 | 7/2003 | Bauchot et al. |
| 6,449,628 B1 | 9/2002 | Wasson | | 6,594,796 B1 | 7/2003 | Chiang |
| 6,449,755 B1 | 9/2002 | Beausang et al. | | 6,594,799 B1 | 7/2003 | Robertson et al. |
| 6,449,761 B1 | 9/2002 | Greidinger et al. | | 6,597,212 B1 | 7/2003 | Wang et al. |
| 6,452,437 B1 | 9/2002 | Takeuchi et al. | | 6,597,824 B2 | 7/2003 | Newberg et al. |
| 6,452,514 B1 | 9/2002 | Philipp | | 6,598,178 B1 | 7/2003 | Yee et al. |
| 6,453,175 B2 | 9/2002 | Mizell et al. | | 6,600,346 B1 | 7/2003 | Macaluso |
| 6,453,461 B1 | 9/2002 | Chaiken | | 6,600,351 B2 | 7/2003 | Bisanti et al. |
| 6,456,304 B1 | 9/2002 | Angiulo et al. | | 6,600,575 B1 | 7/2003 | Kohara |
| 6,457,355 B1 | 10/2002 | Philipp | | 6,601,189 B1 | 7/2003 | Edwards et al. |
| 6,457,479 B1 | 10/2002 | Zhuang et al. | | 6,601,236 B1 | 7/2003 | Curtis |
| 6,460,172 B1 | 10/2002 | Insenser Farre et al. | | 6,603,330 B1 | 8/2003 | Snyder |
| 6,463,488 B1 | 10/2002 | San Juan | | 6,603,348 B1 | 8/2003 | Preuss et al. |
| 6,466,036 B1 | 10/2002 | Philipp | | 6,604,179 B2 | 8/2003 | Volk et al. |
| 6,466,078 B1 | 10/2002 | Stiff | | 6,606,731 B1 | 8/2003 | Baum et al. |
| 6,466,898 B1 | 10/2002 | Chan | | 6,608,472 B1 | 8/2003 | Kutz et al. |
| 6,473,069 B1 | 10/2002 | Gerpheide | | 6,610,936 B2 | 8/2003 | Gillespie et al. |
| 6,473,825 B1 | 10/2002 | Worley et al. | | 6,611,220 B1 | 8/2003 | Snyder |
| 6,477,691 B1 | 11/2002 | Bergamashi/Rab et al. | | 6,611,276 B1 | 8/2003 | Muratori et al. |
| 6,480,921 B1 | 11/2002 | Mansoorian et al. | | 6,611,856 B1 | 8/2003 | Liao et al. |
| 6,483,343 B1 | 11/2002 | Faith et al. | | 6,611,952 B1 | 8/2003 | Prakash et al. |
| 6,487,700 B1 | 11/2002 | Fukushima | | 6,613,098 B1 | 9/2003 | Sorge et al. |
| 6,489,899 B1 | 12/2002 | Ely et al. | | 6,614,260 B1 | 9/2003 | Welch et al. |
| 6,490,213 B1 | 12/2002 | Mu et al. | | 6,614,320 B1 | 9/2003 | Sullam et al. |
| 6,492,834 B1 | 12/2002 | Lytle et al. | | 6,614,374 B1 | 9/2003 | Gustavsson et al. |
| 6,496,971 B1 | 12/2002 | Lesea et al. | | 6,614,458 B1 | 9/2003 | Lambert et al. |
| 6,498,720 B2 | 12/2002 | Glad | | 6,615,167 B1 | 9/2003 | Devins et al. |
| 6,499,134 B1 | 12/2002 | Buffet et al. | | 6,617,888 B2 | 9/2003 | Volk |
| 6,499,359 B1 | 12/2002 | Washeleski et al. | | 6,618,854 B1 | 9/2003 | Mann |
| 6,504,403 B2 | 1/2003 | Bangs et al. | | 6,621,356 B2 | 9/2003 | Gotz et al. |
| 6,507,214 B1 | 1/2003 | Snyder | | 6,624,640 B2 | 9/2003 | Lund et al. |
| 6,507,215 B1 | 1/2003 | Piasecki et al. | | 6,625,765 B1 | 9/2003 | Krishnan |
| 6,507,857 B1 | 1/2003 | Yalcinalp | | 6,628,163 B2 | 9/2003 | Dathe et al. |
| 6,509,758 B2 | 1/2003 | Piasecki et al. | | 6,628,311 B1 * | 9/2003 | Fang ............... 715/777 |
| 6,512,395 B1 | 1/2003 | Lacey et al. | | 6,631,508 B1 | 10/2003 | Williams |
| 6,516,428 B2 | 2/2003 | Wenzel et al. | | 6,634,008 B1 | 10/2003 | Dole |
| 6,522,128 B1 | 2/2003 | Ely et al. | | 6,636,096 B2 | 10/2003 | Schaffer et al. |
| 6,523,416 B2 | 2/2003 | Takagi et al. | | 6,637,015 B1 | 10/2003 | Ogami et al. |
| 6,525,593 B1 | 2/2003 | Mar | | 6,639,586 B2 | 10/2003 | Gerpheide |
| 6,526,556 B1 | 2/2003 | Stoica et al. | | 6,642,857 B1 | 11/2003 | Schediwy et al. |
| 6,529,791 B1 | 3/2003 | Takagi | | 6,643,151 B1 | 11/2003 | Nebrigic et al. |
| 6,530,065 B1 | 3/2003 | McDonald et al. | | 6,643,810 B2 | 11/2003 | Whetsel |
| 6,534,970 B1 | 3/2003 | Ely et al. | | 6,649,924 B1 | 11/2003 | Philipp et al. |
| 6,535,061 B2 | 3/2003 | Darmawaskita et al. | | 6,650,581 B2 | 11/2003 | Hong et al. |
| 6,535,200 B2 | 3/2003 | Philipp | | 6,658,498 B1 * | 12/2003 | Carney et al. .......... 710/8 |
| 6,535,946 B1 | 3/2003 | Bryant et al. | | 6,658,633 B2 | 12/2003 | Devins et al. |
| 6,536,028 B1 | 3/2003 | Katsioulas et al. | | 6,661,288 B2 | 12/2003 | Morgan et al. |
| 6,539,534 B1 | 3/2003 | Bennett | | 6,661,410 B2 | 12/2003 | Casebolt et al. |
| 6,542,025 B1 | 4/2003 | Kutz et al. | | 6,661,724 B1 | 12/2003 | Snyder et al. |
| 6,542,844 B1 | 4/2003 | Hanna | | 6,664,978 B1 | 12/2003 | Kekic et al. |

| Patent | Date | Name | | Patent | Date | Name |
|---|---|---|---|---|---|---|
| 6,664,991 B1 | 12/2003 | Chew et al. | | 6,809,566 B1 | 10/2004 | Xin-LeBlanc |
| 6,667,642 B1 | 12/2003 | Moyal | | 6,810,442 B1 | 10/2004 | Lin et al. |
| 6,667,740 B2 | 12/2003 | Ely et al. | | 6,812,678 B1 | 11/2004 | Brohlin |
| 6,670,852 B1 | 12/2003 | Hauck | | 6,815,979 B2 | 11/2004 | Ooshita |
| 6,673,308 B2 | 1/2004 | Hino et al. | | 6,816,544 B1 | 11/2004 | Bailey et al. |
| 6,677,814 B2 | 1/2004 | Low et al. | | 6,817,005 B2 | 11/2004 | Mason et al. |
| 6,677,932 B1 | 1/2004 | Westerman | | 6,819,142 B2 | 11/2004 | Viehmann et al. |
| 6,678,645 B1 | 1/2004 | Rajsuman et al. | | 6,823,282 B1 | 11/2004 | Snyder |
| 6,678,877 B1 | 1/2004 | Perry et al. | | 6,823,497 B2 | 11/2004 | Schubert et al. |
| 6,680,632 B1 | 1/2004 | Meyers et al. | | 6,825,689 B1 | 11/2004 | Snyder |
| 6,680,731 B2 | 1/2004 | Gerpheide et al. | | 6,825,869 B2 | 11/2004 | Bang |
| 6,681,280 B1 | 1/2004 | Miyake et al. | | 6,828,824 B2 | 12/2004 | Betz et al. |
| 6,681,359 B1 | 1/2004 | Au et al. | | 6,829,727 B1 | 12/2004 | Pawloski |
| 6,683,462 B2 | 1/2004 | Shimizu | | 6,834,384 B2 | 12/2004 | Fiorella, II et al. |
| 6,683,930 B1 | 1/2004 | Dalmia | | 6,836,169 B2 | 12/2004 | Richmond et al. |
| 6,686,787 B2 | 2/2004 | Ling | | 6,839,774 B1 | 1/2005 | Ahn et al. |
| 6,686,860 B2 | 2/2004 | Gulati et al. | | 6,842,710 B1 | 1/2005 | Gehring et al. |
| 6,690,224 B1 | 2/2004 | Moore | | 6,847,203 B1 | 1/2005 | Conti et al. |
| 6,691,193 B1 | 2/2004 | Wang et al. | | 6,850,117 B2 | 2/2005 | Weber et al. |
| 6,691,301 B2 | 2/2004 | Bowen | | 6,850,554 B1 | 2/2005 | Sha |
| 6,697,754 B1 | 2/2004 | Alexander | | 6,853,598 B2 | 2/2005 | Chevallier |
| 6,701,340 B1 | 3/2004 | Gorecki | | 6,854,067 B1 | 2/2005 | Kutz et al. |
| 6,701,487 B1 | 3/2004 | Ogami et al. | | 6,856,433 B2 | 2/2005 | Hatano et al. |
| 6,701,508 B1 * | 3/2004 | Bartz et al. ............ 716/139 | | 6,859,884 B1 | 2/2005 | Sullam |
| 6,704,381 B1 | 3/2004 | Moyal et al. | | 6,862,240 B2 | 3/2005 | Burgan |
| 6,704,879 B1 | 3/2004 | Parrish | | 6,864,710 B1 | 3/2005 | Lacey et al. |
| 6,704,889 B2 | 3/2004 | Veenstra et al. | | 6,865,429 B1 | 3/2005 | Schneider et al. |
| 6,704,893 B1 | 3/2004 | Bauwens et al. | | 6,865,504 B2 | 3/2005 | Larson et al. |
| 6,705,511 B1 | 3/2004 | Dames et al. | | 6,868,500 B1 | 3/2005 | Kutz et al. |
| 6,710,788 B1 * | 3/2004 | Freach et al. ............ 715/778 | | 6,871,253 B2 | 3/2005 | Greeff et al. |
| 6,711,226 B1 | 3/2004 | Williams et al. | | 6,871,331 B1 | 3/2005 | Bloom et al. |
| 6,711,731 B2 | 3/2004 | Weiss | | 6,873,203 B1 | 3/2005 | Latham, II et al. |
| 6,713,897 B2 | 3/2004 | Caldwell | | 6,873,210 B2 | 3/2005 | Mulder et al. |
| 6,714,066 B2 | 3/2004 | Gorecki et al. | | 6,876,941 B2 | 4/2005 | Nightingale |
| 6,714,817 B2 | 3/2004 | Daynes et al. | | 6,880,086 B2 | 4/2005 | Kidder et al. |
| 6,715,132 B1 * | 3/2004 | Bartz et al. ............ 716/1 | | 6,888,453 B2 | 5/2005 | Lutz et al. |
| 6,717,474 B2 | 4/2004 | Chen et al. | | 6,888,538 B2 | 5/2005 | Ely et al. |
| 6,718,294 B1 | 4/2004 | Bortfeld | | 6,892,310 B1 | 5/2005 | Kutz et al. |
| 6,718,520 B1 | 4/2004 | Merryman et al. | | 6,892,322 B1 | 5/2005 | Snyder |
| 6,718,533 B1 | 4/2004 | Schneider et al. | | 6,893,724 B2 | 5/2005 | Lin et al. |
| 6,724,220 B1 | 4/2004 | Snyder et al. | | 6,894,928 B2 | 5/2005 | Owen |
| 6,728,900 B1 | 4/2004 | Meli | | 6,897,390 B2 | 5/2005 | Caldwell et al. |
| 6,728,902 B2 | 4/2004 | Kaiser et al. | | 6,898,703 B1 | 5/2005 | Ogami et al. |
| 6,730,863 B1 | 5/2004 | Gerpheide | | 6,900,663 B1 | 5/2005 | Roper et al. |
| 6,731,552 B2 | 5/2004 | Perner | | 6,901,563 B1 | 5/2005 | Ogami et al. |
| 6,732,068 B2 | 5/2004 | Sample et al. | | 6,903,402 B2 | 6/2005 | Miyazawa |
| 6,732,347 B1 | 5/2004 | Camilleri et al. | | 6,903,613 B1 | 6/2005 | Mitchell et al. |
| 6,738,858 B1 | 5/2004 | Fernald et al. | | 6,904,570 B2 | 6/2005 | Foote et al. |
| 6,744,323 B1 | 6/2004 | Moyal et al. | | 6,910,126 B1 | 6/2005 | Mar et al. |
| 6,748,569 B1 | 6/2004 | Brooke et al. | | 6,911,857 B1 | 6/2005 | Stiff |
| 6,750,852 B2 | 6/2004 | Gillespie | | 6,917,661 B1 | 7/2005 | Scott et al. |
| 6,750,889 B1 | 6/2004 | Livingston et al. | | 6,922,821 B1 | 7/2005 | Nemecek |
| 6,754,101 B2 | 6/2004 | Terzioglu et al. | | 6,924,668 B2 | 8/2005 | Muller et al. |
| 6,754,723 B2 * | 6/2004 | Kato ............ 710/8 | | 6,934,674 B1 | 8/2005 | Douezy et al. |
| 6,754,765 B1 | 6/2004 | Chang et al. | | 6,937,075 B2 | 8/2005 | Lim et al. |
| 6,754,849 B2 | 6/2004 | Tamura | | 6,940,356 B2 | 9/2005 | McDonald et al. |
| 6,757,882 B2 | 6/2004 | Chen et al. | | 6,941,336 B2 | 9/2005 | Mar |
| 6,765,407 B1 | 7/2004 | Snyder | | 6,941,538 B2 | 9/2005 | Hwang et al. |
| 6,768,337 B2 | 7/2004 | Kohno et al. | | 6,944,018 B2 | 9/2005 | Caldwell |
| 6,768,352 B1 | 7/2004 | Maher et al. | | 6,949,811 B2 | 9/2005 | Miyazawa |
| 6,769,622 B1 | 8/2004 | Tournemille et al. | | 6,949,984 B2 | 9/2005 | Siniscalchi |
| 6,771,552 B2 | 8/2004 | Fujisawa | | 6,950,954 B1 | 9/2005 | Sullam et al. |
| 6,774,644 B2 | 8/2004 | Eberlein | | 6,950,990 B2 | 9/2005 | Rajarajan et al. |
| 6,781,456 B2 | 8/2004 | Pradhan | | 6,952,778 B1 | 10/2005 | Snyder |
| 6,782,068 B1 | 8/2004 | Wilson et al. | | 6,954,511 B2 | 10/2005 | Tachimori |
| 6,784,821 B1 | 8/2004 | Lee | | 6,956,419 B1 | 10/2005 | Mann et al. |
| 6,785,881 B1 | 8/2004 | Bartz et al. | | 6,957,180 B2 | 10/2005 | Nemecek |
| 6,788,116 B1 | 9/2004 | Cook et al. | | 6,957,242 B1 | 10/2005 | Snyder |
| 6,788,221 B1 | 9/2004 | Ely et al. | | 6,963,233 B2 | 11/2005 | Puccio et al. |
| 6,788,521 B2 | 9/2004 | Nishi | | 6,963,908 B1 * | 11/2005 | Lynch et al. ............ 709/220 |
| 6,791,377 B2 | 9/2004 | Ilchmann et al. | | 6,966,039 B1 | 11/2005 | Bartz et al. |
| 6,792,584 B1 | 9/2004 | Eneboe et al. | | 6,967,511 B1 | 11/2005 | Sullam |
| 6,798,218 B2 | 9/2004 | Kasperkovitz | | 6,967,960 B1 | 11/2005 | Bross et al. |
| 6,798,299 B1 | 9/2004 | Mar et al. | | 6,969,978 B2 | 11/2005 | Dening |
| 6,799,198 B1 * | 9/2004 | Huboi et al. ............ 709/203 | | 6,970,844 B1 | 11/2005 | Bierenbaum |
| 6,806,771 B1 | 10/2004 | Hildebrant et al. | | 6,971,004 B1 | 11/2005 | Pleis et al. |
| 6,806,782 B2 | 10/2004 | Motoyoshi et al. | | 6,973,400 B2 | 12/2005 | Cahill-O'Brien et al. |
| 6,807,109 B2 | 10/2004 | Tomishima | | 6,975,123 B1 | 12/2005 | Malang et al. |
| 6,809,275 B1 | 10/2004 | Cheng et al. | | 6,980,060 B2 | 12/2005 | Boerstler et al. |

| | | | | | | |
|---|---|---|---|---|---|---|
| 6,981,090 B1 | 12/2005 | Kutz et al. | | 7,282,905 B2 | 10/2007 | Chen et al. |
| 6,988,192 B2 | 1/2006 | Snider | | 7,283,151 B2 | 10/2007 | Nihei et al. |
| 6,989,659 B2 | 1/2006 | Menegoli et al. | | 7,287,112 B1 | 10/2007 | Pleis et al. |
| 6,996,799 B1 | 2/2006 | Cismas et al. | | 7,288,977 B2 | 10/2007 | Stanley |
| 7,005,933 B1 | 2/2006 | Shutt | | 7,290,244 B2 | 10/2007 | Peck et al. |
| 7,009,444 B1 | 3/2006 | Scott | | 7,295,049 B1 | 11/2007 | Moyal et al. |
| 7,010,773 B1 | 3/2006 | Bartz et al. | | 7,298,124 B1 | 11/2007 | Kan et al. |
| 7,015,735 B2 | 3/2006 | Kimura et al. | | 7,301,835 B2 | 11/2007 | Joshi et al. |
| 7,017,145 B2 | 3/2006 | Taylor | | 7,305,510 B2 | 12/2007 | Miller |
| 7,017,409 B2 | 3/2006 | Zielinski et al. | | 7,307,485 B1 | 12/2007 | Snyder et al. |
| 7,020,854 B2 | 3/2006 | Killian et al. | | 7,308,608 B1 | 12/2007 | Pleis et al. |
| 7,023,215 B2 | 4/2006 | Steenwyk | | 7,312,616 B2 | 12/2007 | Snyder |
| 7,023,257 B1 | 4/2006 | Sullam | | 7,323,879 B2 | 1/2008 | Kuo et al. |
| 7,024,636 B2 | 4/2006 | Weed | | 7,332,976 B1 | 2/2008 | Brennan |
| 7,024,654 B2 | 4/2006 | Bersch et al. | | 7,342,405 B2 | 3/2008 | Eldridge et al. |
| 7,026,861 B2 | 4/2006 | Steenwyk | | 7,348,861 B1 | 3/2008 | Wu et al. |
| 7,030,513 B2 | 4/2006 | Caldwell | | 7,358,714 B2 | 4/2008 | Watanabe et al. |
| 7,030,656 B2 | 4/2006 | Lo et al. | | 7,367,017 B2 | 4/2008 | Maddocks et al. |
| 7,030,688 B2 | 4/2006 | Dosho et al. | | 7,373,437 B2 | 5/2008 | Seigneret et al. |
| 7,030,782 B2 | 4/2006 | Ely et al. | | 7,376,001 B2 | 5/2008 | Joshi et al. |
| 7,034,603 B2 | 4/2006 | Brady et al. | | 7,376,904 B2 | 5/2008 | Cifra et al. |
| 7,042,301 B2 | 5/2006 | Sutardja | | 7,386,740 B2 | 6/2008 | Kutz et al. |
| 7,047,166 B2 | 5/2006 | Dancea | | 7,391,204 B2 | 6/2008 | Bicking |
| 7,055,035 B2 | 5/2006 | Allison et al. | | 7,397,226 B1 | 7/2008 | Mannama et al. |
| 7,058,921 B1 | 6/2006 | Hwang et al. | | 7,400,183 B1 | 7/2008 | Sivadasan et al. |
| 7,073,158 B2 | 7/2006 | McCubbrey | | 7,406,674 B1 | 7/2008 | Ogami et al. |
| 7,076,420 B1 | 7/2006 | Snyder et al. | | 7,421,251 B2 | 9/2008 | Westwick et al. |
| 7,079,166 B1 * | 7/2006 | Hong .......................... 715/777 | | 7,466,307 B2 | 12/2008 | Trent, Jr. et al. |
| 7,086,014 B1 | 8/2006 | Bartz et al. | | 7,542,533 B2 | 6/2009 | Jasa et al. |
| 7,088,166 B1 | 8/2006 | Reinschmidt et al. | | 7,554,847 B2 | 6/2009 | Lee |
| 7,089,175 B1 | 8/2006 | Nemecek et al. | | 7,612,527 B2 | 11/2009 | Hoffman et al. |
| 7,091,713 B2 | 8/2006 | Erdelyi et al. | | 7,616,509 B2 | 11/2009 | Qureshi et al. |
| 7,092,980 B1 | 8/2006 | Mar et al. | | 8,085,020 B1 | 12/2011 | Bennett |
| 7,098,414 B2 | 8/2006 | Caldwell | | 8,164,365 B2 | 4/2012 | Wright et al. |
| 7,099,818 B1 | 8/2006 | Nemecek | | 2001/0002129 A1 | 5/2001 | Zimmerman et al. |
| 7,103,108 B1 | 9/2006 | Beard | | 2001/0010083 A1 | 7/2001 | Satoh |
| 7,109,978 B2 | 9/2006 | Gillespie et al. | | 2001/0021985 A1 | 9/2001 | Aldridge et al. |
| 7,117,485 B2 | 10/2006 | Wilkinson et al. | | 2001/0038392 A1 | 11/2001 | Humpleman et al. |
| 7,119,550 B2 | 10/2006 | Kitano et al. | | 2001/0043081 A1 | 11/2001 | Rees |
| 7,119,602 B2 | 10/2006 | Davis | | 2001/0044927 A1 | 11/2001 | Karniewicz |
| 7,124,376 B2 | 10/2006 | Zaidi et al. | | 2001/0045861 A1 | 11/2001 | Bloodworth et al. |
| 7,127,630 B1 | 10/2006 | Snyder | | 2001/0047509 A1 | 11/2001 | Mason et al. |
| 7,129,793 B2 | 10/2006 | Gramegna | | 2002/0010716 A1 | 1/2002 | McCartney et al. |
| 7,129,873 B2 | 10/2006 | Kawamura | | 2002/0016706 A1 | 2/2002 | Cooke et al. |
| 7,132,835 B1 | 11/2006 | Arcus | | 2002/0023110 A1 | 2/2002 | Fortin et al. |
| 7,133,140 B2 | 11/2006 | Lukacs et al. | | 2002/0042696 A1 | 4/2002 | Garcia et al. |
| 7,133,793 B2 | 11/2006 | Ely et al. | | 2002/0052729 A1 | 5/2002 | Kyung et al. |
| 7,138,841 B1 | 11/2006 | Li | | 2002/0052941 A1 * | 5/2002 | Patterson .................... 709/223 |
| 7,138,868 B2 | 11/2006 | Sanchez et al. | | 2002/0055834 A1 | 5/2002 | Andrade et al. |
| 7,139,530 B2 | 11/2006 | Kusbel | | 2002/0059543 A1 | 5/2002 | Cheng et al. |
| 7,139,999 B2 * | 11/2006 | Bowman-Amuah .......... 717/101 | | 2002/0063688 A1 | 5/2002 | Shaw et al. |
| 7,141,968 B2 | 11/2006 | Hibbs et al. | | 2002/0065646 A1 | 5/2002 | Waldie et al. |
| 7,141,987 B2 | 11/2006 | Hibbs et al. | | 2002/0068989 A1 | 6/2002 | Ebisawa et al. |
| 7,149,316 B1 | 12/2006 | Kutz et al. | | 2002/0073119 A1 | 6/2002 | Richard |
| 7,150,002 B1 | 12/2006 | Anderson et al. | | 2002/0073380 A1 | 6/2002 | Cooke |
| 7,151,528 B2 | 12/2006 | Taylor et al. | | 2002/0080186 A1 | 6/2002 | Frederiksen |
| 7,152,027 B2 | 12/2006 | Andrade et al. | | 2002/0085020 A1 | 7/2002 | Carroll, Jr. |
| 7,154,294 B2 | 12/2006 | Liu et al. | | 2002/0099863 A1 | 7/2002 | Comeau et al. |
| 7,161,936 B1 | 1/2007 | Barrass et al. | | 2002/0109722 A1 | 8/2002 | Rogers et al. |
| 7,162,410 B1 | 1/2007 | Nemecek et al. | | 2002/0116168 A1 | 8/2002 | Kim |
| 7,171,455 B1 | 1/2007 | Gupta et al. | | 2002/0121679 A1 | 9/2002 | Bazarjani et al. |
| 7,176,701 B2 | 2/2007 | Wachi et al. | | 2002/0122060 A1 | 9/2002 | Markel |
| 7,178,096 B2 * | 2/2007 | Rangan et al. ................. 715/202 | | 2002/0129334 A1 | 9/2002 | Dane et al. |
| 7,180,342 B1 | 2/2007 | Shutt et al. | | 2002/0133771 A1 | 9/2002 | Barnett |
| 7,185,162 B1 | 2/2007 | Snyder | | 2002/0133794 A1 | 9/2002 | Kanapathippillai et al. |
| 7,185,321 B1 | 2/2007 | Roe et al. | | 2002/0138516 A1 | 9/2002 | Igra |
| 7,188,063 B1 | 3/2007 | Snyder | | 2002/0144099 A1 | 10/2002 | Muro et al. |
| 7,193,901 B2 | 3/2007 | Ruby et al. | | 2002/0145433 A1 | 10/2002 | Morrise et al. |
| 7,200,507 B2 | 4/2007 | Chen et al. | | 2002/0152234 A1 | 10/2002 | Estrada et al. |
| 7,206,733 B1 | 4/2007 | Nemecek | | 2002/0152449 A1 | 10/2002 | Lin |
| 7,212,189 B2 | 5/2007 | Shaw et al. | | 2002/0156885 A1 | 10/2002 | Thakkar |
| 7,221,187 B1 | 5/2007 | Snyder et al. | | 2002/0156929 A1 | 10/2002 | Hekmatpour |
| 7,227,389 B2 | 6/2007 | Gong et al. | | 2002/0156998 A1 | 10/2002 | Casselman |
| 7,236,921 B1 | 6/2007 | Nemecek et al. | | 2002/0161802 A1 | 10/2002 | Gabrick et al. |
| 7,250,825 B2 | 7/2007 | Wilson et al. | | 2002/0166100 A1 | 11/2002 | Meding |
| 7,256,588 B2 | 8/2007 | Howard et al. | | 2002/0170050 A1 | 11/2002 | Fiorella, III et al. |
| 7,265,633 B1 | 9/2007 | Stiff | | 2002/0174134 A1 | 11/2002 | Goykhman |
| 7,266,768 B2 | 9/2007 | Ferlitsch et al. | | 2002/0174411 A1 | 11/2002 | Feng et al. |
| 7,281,846 B2 | 10/2007 | McLeod | | 2002/0183956 A1 | 12/2002 | Nightingale |

| | | | |
|---|---|---|---|
| 2002/0188910 A1 | 12/2002 | Zizzo | |
| 2002/0191029 A1 | 12/2002 | Gillespie et al. | |
| 2003/0011639 A1 | 1/2003 | Webb | |
| 2003/0014447 A1 | 1/2003 | White | |
| 2003/0025734 A1 | 2/2003 | Boose et al. | |
| 2003/0038842 A1 | 2/2003 | Peck et al. | |
| 2003/0041235 A1 | 2/2003 | Meyer | |
| 2003/0046657 A1* | 3/2003 | White | 717/105 |
| 2003/0056071 A1 | 3/2003 | Triece et al. | |
| 2003/0058469 A1 | 3/2003 | Buis et al. | |
| 2003/0061572 A1 | 3/2003 | McClannahan et al. | |
| 2003/0062889 A1 | 4/2003 | Ely et al. | |
| 2003/0080755 A1 | 5/2003 | Kobayashi | |
| 2003/0088852 A1* | 5/2003 | Lacas et al. | 717/121 |
| 2003/0097640 A1* | 5/2003 | Abrams et al. | 715/530 |
| 2003/0105620 A1* | 6/2003 | Bowen | 703/22 |
| 2003/0126947 A1 | 7/2003 | Margaria | |
| 2003/0135842 A1 | 7/2003 | Frey et al. | |
| 2003/0149961 A1 | 8/2003 | Kawai et al. | |
| 2003/0163798 A1 | 8/2003 | Hwang et al. | |
| 2003/0229482 A1 | 12/2003 | Cook et al. | |
| 2003/0233631 A1* | 12/2003 | Curry et al. | 717/100 |
| 2004/0018711 A1 | 1/2004 | Madurawe | |
| 2004/0031030 A1* | 2/2004 | Kidder et al. | 717/172 |
| 2004/0054821 A1 | 3/2004 | Warren et al. | |
| 2004/0153802 A1 | 8/2004 | Kudo et al. | |
| 2004/0201627 A1* | 10/2004 | Maddocks et al. | 345/762 |
| 2004/0205553 A1 | 10/2004 | Hall et al. | |
| 2004/0205617 A1 | 10/2004 | Light | |
| 2004/0205695 A1 | 10/2004 | Fletcher | |
| 2004/0217799 A1 | 11/2004 | Ichihara | |
| 2004/0250231 A1* | 12/2004 | Killian et al. | 716/18 |
| 2005/0024341 A1 | 2/2005 | Gillespie et al. | |
| 2005/0066152 A1 | 3/2005 | Garey | |
| 2005/0140659 A1 | 6/2005 | Hohl et al. | |
| 2005/0143968 A9 | 6/2005 | Odom et al. | |
| 2005/0240917 A1 | 10/2005 | Wu | |
| 2005/0248534 A1 | 11/2005 | Kehlstadt | |
| 2005/0280453 A1 | 12/2005 | Hsieh | |
| 2006/0015862 A1* | 1/2006 | Odom et al. | 717/168 |
| 2006/0031768 A1* | 2/2006 | Shah et al. | 715/735 |
| 2006/0032680 A1 | 2/2006 | Elias et al. | |
| 2006/0097991 A1 | 5/2006 | Hotelling et al. | |
| 2006/0150149 A1* | 7/2006 | Chandhoke et al. | 717/109 |
| 2006/0273804 A1 | 12/2006 | Delorme et al. | |
| 2007/0139074 A1 | 6/2007 | Reblewski | |
| 2007/0139338 A1 | 6/2007 | Lin et al. | |
| 2007/0258458 A1 | 11/2007 | Kapoor | |
| 2008/0095213 A1 | 4/2008 | Lin et al. | |
| 2008/0186052 A1 | 8/2008 | Needham et al. | |
| 2008/0259998 A1 | 10/2008 | Venkataraman et al. | |
| 2008/0294806 A1 | 11/2008 | Swindle et al. | |
| 2009/0054129 A1 | 2/2009 | Yoshimura et al. | |
| 2009/0066427 A1 | 3/2009 | Brennan | |
| 2009/0322305 A1 | 12/2009 | De Cremoux | |
| 2011/0248692 A1 | 10/2011 | Shehu et al. | |

FOREIGN PATENT DOCUMENTS

| | | |
|---|---|---|
| EP | 0308583 A2 | 3/1989 |
| EP | 368398 A1 | 5/1990 |
| EP | 0450863 A | 10/1991 |
| EP | 0450863 A2 | 10/1991 |
| EP | 0499383 A | 8/1992 |
| EP | 0499383 A2 | 8/1992 |
| EP | 0639816 A | 2/1995 |
| EP | 0639816 A2 | 2/1995 |
| EP | 1170671 A | 1/2002 |
| EP | 1205848 A1 | 5/2002 |
| EP | 1191423A2 | 2/2003 |
| EP | 1170671 A1 | 9/2003 |
| JP | 404083405 A1 | 3/1992 |
| JP | 5941651 A | 2/1993 |
| JP | 405055842 A1 | 3/1993 |
| JP | 06021732 A1 | 1/1994 |
| JP | 404095408 A1 | 3/2002 |
| WO | 9532478 A1 | 11/1995 |
| WO | US96/17305 A1 | 6/1996 |
| WO | US98/34376 A1 | 8/1998 |
| WO | US99/09712 A1 | 2/1999 |

OTHER PUBLICATIONS

Eady, Fred; "PSoc 101"; Circuit Cellar; http://www.circuitcellar.com/library/print/0804/eady169/2.htm.

Killat, Kirk; "A One-Chip Solution for Electronic Ballasts in Fluorescent Lamps"; Power Electronics; http://powerelectonics.com/mag/power_onechip_solution_electronic/.

Goodenough, F, "Analog Counterparts of FPGAS Ease System Design", Electronic Design, Penton Publishing, Cleveland, OH, US, vol. 2 No. 21, Oct. 14, 1994, pp. 63-64, 66, 68, 7.

Harbaum, T. et al., "Design of a Flexible Coprocessor Unit", Proceedings of the Euromicro Conference, Sep. 1999, pp. 335-342, p. 337, right hand column, line 13-p. 338, left hand column, line 4; figure 1.

"New Object Domain R3 Beta Now Available (Build 134)!" Mar. 13, 2001; <http://web.archive.org/web/20010033120260​5/www.objectdomain.com/domain30/index.html>; 2 pages.

"OMG XML Metadata Interchange (XMI) Specifications" 2000; 17 pages.

Electronic Tools Company; E-Studio User Manuel; 2000; retrieved from http://web.archive.org for site http://e-tools.com on Mar. 23, 2005; 77 pages.

Cover Pages Technology Reports; XML and Electronic Design Automation (EDA); Aug. 2000; retrieved from http://xml.coverpages.org on Mar. 23, 2005; 5 pages.

Microsoft Computer Dictionary "ActiveX" 2002; Microsoft Press; 5th Edition; 3 pages.

Wikipedia "XML" retrieved on Jan. 29, 2007 from http://en.wikipedia.org/wiki/XML; 16 pages.

"VHDL Samples" retrieved on Jan. 29, 2007 from http://www.csee.umbc.edu/help/VHDL/samples/samples.shtml; 10 pages.

Anonymous, "Lotus Notes FAQ—How do you generate unique document numbers?" Sep. 19, 1999; retrieved from www.keysolutions.com on Jul. 9, 2008; 1 page.

Ashok Bindra, "Programmable SoC Delivers a New Level of System Flexibility"; Electronic Design; Nov. 6, 2000; 11 pages.

Cypress MicroSystem, Inc. "Cypress Customer Forums" retrieved from <http://www.cypress.com/forums/messageview>; Nov. 30, 2004; 1 page.

Cypress MicroSystem, Inc. "PsoC Designer: Integrated Development Environment User Guide"; Rev. 1.18; Sep. 8, 2003; 193 pages.

Hamblen, "Rapid Prototyping Using Field-Programmable Logic Devices" Jun. 2000, IEEE; 9 pages.

USPTO Final Rejection for U.S. Appl. No. 09/943,062 dated Apr. 30, 2004; 9 pages.

Snyder et al., "Xilinx's A-to-Z Systems Platform" Cahners Microprocessor, the Insider's Guide to Microprocessor Hardware, Feb. 6, 2001; 6 pages.

"PSoC Technology Completely Changes 8-bit MCU System Design" Cypress MicroSystem, Inc. Feb. 19, 2001; 21 pages.

USPTO Non-Final Rejection for U.S. Appl. No. 09/943,062 dated Dec. 8, 2003; 9 pages.

USPTO Advisory Action for U.S. Appl. No. 09/943,062 dated Sep. 25, 2003; 3 pages.

USPTO Final Rejection for U.S. Appl. No. 09/943,062 dated Jun. 27, 2003; 8 pages.

USPTO Non-Final Rejection for U.S. Appl. No. 09/943,062 dated Jan. 27, 2003; 7 pages.

USPTO Non-Final Rejection for U.S. Appl. No. 09/943,062 dated Sep. 11, 2002; 9 pages.

"PSoC Designer: Integrated Development Environment" User Guide; Revision 1.11; Last Revised Jul. 17, 2001; 109 pages.

Cypress Microsystems, "Cypress Microsystems Unveils Programmable System-on-a-Chip for Embedded Internet, Communications and Consumer Systems;" 2000, <http://www.cypressmicro.com/corporate/CY_Announces_nov_13_2000.html>; 3 pages.

Huang et al., ICEBERG, An Embedded In-Circuit Emulator Synthesizer for Microcontrollers, Proceedings of the 36th Design Automation Conference Jun. 21-26, 1999; 6 pages.

Yoo et al., "Fast Hardware-Software Co-verification by Optimistic Execution of Real Processor," Proceedings of Design, Automation and Test in Europe Conference and Exhibition 2000; 6 pages.

USPTO Advisory Action for U.S. Appl. No. 09/943,062 dated Mar. 27, 2008; 3 pages.
USPTO Final Rejection for U.S. Appl. No. 09/943,062 dated Jan. 18, 2008; 8 pages.
USPTO Non-Final Rejection for U.S. Appl. No. 09/943,062 dated Jun. 22, 2007; 12 pages.
USPTO Miscellaneous Action for U.S. Appl. No. 09/943,062 dated Jan. 30, 2006; 2 pages.
USPTO Notice of Allowance for U.S. Appl. No. 10/113,064 dated Sep. 21, 2006; 7 pages.
USPTO Non-Final Rejection for U.S. Appl. No. 10/113,064 dated Apr. 6, 2006; 19 pages.
USPTO Final Rejection for U.S. Appl. No. 10/113,064 dated Oct. 18, 2005; 22 pages.
USPTO Non-Final Rejection for U.S. Appl. No. 10/113,064 dated Apr. 25, 2005; 15 pages.
USPTO U.S. Appl. No. 10/113,064 "Method and System for Debugging through Supervisory Operating Codes and Self Modifying Codes," Roe et al., filed on Mar. 29, 2002; 36 pages.
USPTO U.S. Appl. No. 10/002,726 "Method and Apparatus for Generating Microcontroller Configuration information," Ogami et al., filed on Oct. 24, 2001; 54 pages.
USPTO Notice of Allowance for U.S. Appl. No. 10/002,726 dated Feb. 6, 2007; 7 pages.
USPTO Non-Final Rejection for U.S. Appl. No. 10/002,726 dated Aug. 28, 2006; 10 pages.
USPTO Final Rejection for U.S. Appl. No. 10/002,726 dated Mar. 27, 2006; 8 pages.
USPTO Final Rejection for U.S. Appl. No. 10/002,726 dated Nov. 30, 2005; 10 pages.
USPTO Non-Final Rejection for U.S. Appl. No. 10/002,726 dated Jun. 10, 2005; 10 pages.
USPTO Non-Final Rejection for U.S. Appl. No. 10/002,726 dated Dec. 13, 2004; 7 pages.
USPTO U.S. Appl. No. 11/818,005 "Techniques for Generating Microcontroller Configuration Information," Ogami et al., filed on Jun. 12, 2007; 61 pages.
USPTO Requirement for Restriction/Election for U.S. Appl. No. 11/818,005 dated Jul. 14, 2009; 5 pages.
USPTO U.S. Appl. No. 11/850,260 "Circuit and Method for Improving the Accuracy of a Crystal less Oscillator Having Dual-Frequency Modes," Wright et al., filed on Sep. 5, 2007; 33 pages.
USPTO Non-Final Rejection for U.S. Appl. No. 11/850,260 dated Mar. 6, 2009; 7 pages.
USPTO Non-Final Rejection for U.S. Appl. No. 11/644,100 dated Mar. 9, 2009; 11 pages.
USPTO Advisory Action for U.S. Appl. No. 11/644,100 dated Feb. 9, 2009; 3 pages.
USPTO Final Rejection for U.S. Appl. No. 11/644,100 dated Nov. 18, 2008; 12 pages.
USPTO Non-Final Rejection for U.S. Appl. No. 11/644,100 dated Apr. 14, 2008; 10 pages.
USPTO Notice of Allowance for U.S. Appl. No. 11/415,588 dated Mar. 11, 2008; 6 pages.
USPTO Advisory Action for U.S. Appl. No. 11/415,588 dated Jan. 14, 2008; 3 pages.
USPTO Final Rejection for U.S. Appl. No. 11/415,588 dated Oct. 19, 2007; 8 pages.
USPTO Non-Final Rejection for U.S. Appl. No. 11/415,588 dated Jun. 13, 2007; 8 pages.
USPTO Notice of Allowance for U.S. Appl. No. 12/218,404 dated Mar. 19, 2009; 7 pages.
USPTO Non-Final Rejection for U.S. Appl. No. 12/218,404 dated Sep. 30, 2008; 8 pages.
USPTO U.S. Appl. No. 11/644,100 "Differential-to-single ended signal converter circuit and method," Jonathon Stiff, filed on Dec. 21, 2006; 33 pages.
USPTO U.S. Appl. No. 11/415,588: "Voltage Controlled Oscillator Delay Cell and Method," Sivadasan et al., filed on May 1, 2006; 24 pages.
USPTO U.S. Appl. No. 12/218,404: "Voltage Controlled Oscillator Delay Cell and Method," Sivadasan et al., filed on Jul. 14, 2008; 23 pages.
USPTO Notice of Allowance for U.S. Appl. No. 11/132,894 dated Apr. 26, 2007; 4 pages.
USPTO Non-Final Rejection for U.S. Appl. No. 11/132,894 dated Dec. 19, 2006; 12 pages.
USPTO U.S. Appl. No. 11/132,894: "Open Loop Bandwidth Test Architecture and Method for Phase Locked Loop (PLL)," Jonathon Stiff, filed on May 19, 2005; 38 pages.
USPTO Non-Final Rejection for U.S. Appl. No. 11/322,044 dated May 4, 2009; 18 pages.
USPTO Non-Final Rejection for U.S. Appl. No. 11/322,044 dated Nov. 25, 2008; 15 pages.
USPTO Non-Final Rejection for U.S. Appl. No. 11/322,044 dated Apr. 11, 2008; 11 pages.
USPTO Advisory Action for U.S. Appl. No. 11/322,044 dated Nov. 30, 2007; 2 pages.
USPTO Final Rejection for U.S. Appl. No. 11/322,044 dated Sep. 21, 2007; 14 pages.
USPTO Non-Final Rejection for U.S. Appl. No. 11/322,044 dated Apr. 24, 2007; 13 pages.
USPTO U.S. Appl. No. 11/322,044: "Split charge pump PLL architecture," Jonathon Stiff, filed on Dec. 28, 2005; 19 pages.
USPTO Notice of Allowance for U.S. Appl. No. 10/305,589 dated Feb. 4, 2005; 5 pages.
USPTO Final Rejection for U.S. Appl. No. 10/305,589 dated Oct. 21, 2004; 7 pages.
USPTO Non-Final Rejection for U.S. Appl. No. 10/305,589 dated Oct. 7, 2003; 6 pages.
USPTO U.S. Appl. No. 10/305,589: "Current Controlled Delay Circuit," Jonathon Stiff, filed on Nov. 26, 2002; 18 pages.
USPTO U.S. Appl. No. 09/849,164: "Reduced Static Phase Error CMOS PLL Charge Pump," Jonathon Stiff, filed on May 4, 2001; 30 pages.
Maneatis, "Low-Jitter Process-Independent DLL and PLL Based on Self-Biased Techniques," IEEE Journal of Solid-State Circuits, vol. 31, No. 11, Nov. 1996; 10 pages.
Larsson, "A 2-1600-MHz CMOS Clock Recovery PLL with Low-V dd Capability," IEEE Journal of Solid-State Circuits, vol. 34, No. 12, Dec. 1999; 10 pages.
USPTO Notice of Allowance for U.S. Appl. No. 10/327,217 dated Aug. 12, 2004; 6 pages.
USPTO Non-Final Rejection for U.S. Appl. No. 10/327,217 dated Apr. 30, 2004; 5 pages.
USPTO Miscellaneous Action for U.S. Appl. No. 10/327,217 dated Feb. 10, 2004; 1 page.
USPTO U.S. Appl. No. 10/327,217: "Single Ended Clock Signal Generator Having a Differential Output," Richmond et al., filed on Dec. 20, 2002; 27 pages.
USPTO Notice of Allowance for U.S. Appl. No. 10/871,582 dated Mar. 30, 2006; 6 pages.
USPTO Final Rejection for U.S. Appl. No. 10/871,582 dated Feb. 1, 2006; 5 pages.
USPTO Non-Final Rejection for U.S. Appl. No. 10/871,582 dated Sep. 7, 2005; 7 pages.
USPTO U.S. Appl. No. 10/871,582: "LVDS Input Circuit with Extended Common Mode Range," Reinschmidt et al., filed on Jun. 17, 2004; 25 pages.
USPTO Notice of Allowance for U.S. Appl. No. 09/404,891 dated Mar. 4, 2005; 6 pages.
USPTO Final Rejection for U.S. Appl. No. 09/404,891 dated Dec. 8, 2004; 7 pages.
USPTO Non-Final Rejection for U.S. Appl. No. 09/404,891 dated Jun. 25, 2004; 6 pages.
USPTO Non-Final Rejection for U.S. Appl. No. 09/404,891 dated Jan. 5, 2004; 5 pages.
USPTO Non-Final Rejection for U.S. Appl. No. 09/404,891 dated Jul. 10, 2003; 6 pages.
USPTO Non-Final Rejection for U.S. Appl. No. 09/404,891 dated Mar. 5, 2003; 6 pages.
USPTO Non-Final Rejection for U.S. Appl. No. 09/404,891 dated Oct. 11, 2002; 5 pages.
USPTO U.S. Appl. No. 09/404,891: "Method, Architecture and Circuitry for Controlling Pulse Width in a Phase and/or Frequency Detector," Scott et al., filed on Sep. 24, 1999; 17 pages.

USPTO Notice of Allowance for U.S. Appl. No. 10/226,911 dated Aug. 20, 2004; 4 pages.
USPTO Non-Final Rejection for U.S. Appl. No. 10/226,911 dated Mar. 19, 2004; 6 pages.
USPTO U.S. Appl. No. 10/226,911: "Calibration of Integrated Circuit Time Constants," Gehring et al., filed on Aug. 22, 2002; 32 pages.
USPTO Notice of Allowance for U.S. Appl. No. 09/943,149 dated Jan. 12, 2004; 7 pages.
USPTO Non-Final Rejection for U.S. Appl. No. 09/943,149 dated Aug. 28, 2003; 9 pages.
USPTO Final Rejection for U.S. Appl. No. 09/943,149 dated May 7, 2003; 10 pages.
USPTO Non-Final Rejection for U.S. Appl. No. 09/943,149 dated Nov. 20, 2002; 7 pages.
USPTO U.S. Appl. No. 09/943,149: "Method for Phase Locking in a Phase Lock Loop," Moyal et al., filed on Aug. 30, 2001; 21 pages.
Durham et al., "Integrated Continuous-Time Balanced Filters for 16-bit DSP Interfaces," IEEE, 1993; 6 pages.
Durham et al., "Circuit Architectures for High Linearity Monolithic Continuous-Time Filtering," IEEE, 1992; 7 pages.
Durham et al., "High-Linearity Conitnuous-Time Filter in 5-V VSLI CMOS," IEEE, 1992; 8 pages.
USPTO U.S. Appl. No. 09/047,595: "Roving Range Control to Limit Receive PLL Frequency of Operation," Paul H. Scott, filed on Mar. 29, 1998; 35 pages.
USPTO U.S. Appl. No. 09/216,460: "Circuit and Method for Controlling an Output of a Ring Oscillator," Abugharbieh et al., filed on Dec. 18, 1998; 21 pages.
USPTO U.S. Appl. No. 09/471,914: "Reference-Free Clock Generator and Data Recovery PLL," Dalmia et al., filed on Dec. 23, 1999; 32 pages.
USPTO U.S. Appl. No. 09/471,576: "Reference-Free Clock Generation and Data Recovery PLL," Kamal Dalmia, filed on Dec. 23, 1999; 30 pages.
USPTO U.S. Appl. No. 10/083,442: "Method/Architecture for a Low Gain PLL with Wide Frequency Range," Meyers et al., filed on Feb. 26, 2002; 28 pages.
USPTO U.S. Appl. No. 09/470,665: "Digital Phase/Frequency Detector, and Clock Generator and Data Recovery PLL Containing the Same," Kamal Dalmia, filed on Dec. 23, 1999; 26 pages.
USPTO U.S. Appl. No. 09/893,161: "Architecture of a PLL with Dynamic Frequency Control on a PLD," Michael T. Moore, filed on Jun. 27, 2001; 32 pages.
USPTO U.S. Appl. No. 09/608,753: "PLL Lockout Watchdog," Wilson et al., filed on Aug. 24, 2004; 24 pages.
USPTO U.S. Appl. No. 09/398,956: "Frequency Acquisition Rate Control in Phase Lock Loop Circuits," Moyal et al., filed on Sep. 17, 1999; 35 pages.
USPTO U.S. Appl. No. 09/747,262:"Linearized Digital Phase-Locked Loop," Williams et al., filed on Dec. 22, 2000; 9 pages.
USPTO U.S. Appl. No. 09/981,448: "Oscillator Tuning Method," Lane T. Hauck, filed on Oct. 17, 2001; 28 pages.
USPTO U.S. Appl. No. 09/538,989: "Memory Based Phase Locked Loop," Rengarajan S. Krishnan, filed on Mar. 30, 2000; 27 pages.
USPTO U.S. Appl. No. 09/048,905: "Programmable Clock Generator," Mann et al., filed on Mar. 26, 1998; 42 pages.
USPTO U.S. Appl. No. 08/865,342: "Programmable Clock Generator," Mann et al., filed on May 29, 1997; 41 pages.
USPTO Notice of Allowance for U.S. Appl. No. 10/293,392 dated Mar. 10, 2004; 6 pages.
USPTO Non-Final Rejection for U.S. Appl. No. 10/293,392 dated Oct. 16, 2003; 6 pages.
USPTO U.S. Appl. No. 10/293,392: "Low Voltage Receiver Circuit and Method for Shifting the Differential Input Signals of the Receiver Depending on a Common Mode Voltage of the Input Signals," Maher et al., filed on Nov. 13, 2002; 20 pages.
USPTO Notice of Allowance for U.S. Appl. No. 10/288,003 dated Jan. 14, 2005; 6 pages.
USPTO Final Rejection for U.S. Appl. No. 10/288,003 dated Oct. 6, 2004; 6 pages.
USPTO Non-Final Rejection for U.S. Appl. No. 10/288,003 dated Apr. 7, 2004; 9 pages.
USPTO U.S. Appl. No. 10/288,003 : "Low Voltage Differential Signal Driver Circuit and Method," Roper et al., filed on Nov. 4, 2002; 30 pages.
USPTO Notice of Allowance for U.S. Appl. No. 09/989,777 dated Mar. 9, 2009; 7 pages.
USPTO Advisory Action for U.S. Appl. No. 11/200,619 dated May 11, 2009; 3 pages.
USPTO Final Rejection for U.S. Appl. No. 11/200,619 dated Mar. 3, 2009; 14 pages.
USPTO Non-Final Rejection for U.S. Appl. No. 11/200,619 dated Aug. 27, 2008; 13 pages.
USPTO U.S. Appl. No. 11/200,619: "Providing hardware independence to automate code generation of processing device firmware," Snyder et al., filed on Aug. 10, 2005; 41 pages.
USPTO Notice of Allowance for U.S. Appl. No. 11/201,922 dated Apr. 9, 2009; 4 pages.
USPTO Non-Final Rejection for U.S. Appl. No. 11/201,922 dated Oct. 21, 2008; 12 pages.
USPTO Final Rejection for U.S. Appl. No. 11/201,922 dated Apr. 30, 2008; 10 pages.
USPTO Non-Final Rejection for U.S. Appl. No. 11/201,922 dated Oct. 15, 2007; 10 pages.
USPTO U.S. Appl. No. 11/201,922: "Design model for a hardware device-independent method of defining embedded firmware for programmable systems," McDonald et al., filed on Aug. 10, 2005; 31 pages.
USPTO Non-Final Rejection for U.S. Appl. No. 11/201,627 dated Dec. 12, 2008; 17 pages.
USPTO Final Rejection for U.S. Appl. No. 11/201,627 dated Apr. 29, 2008; 21 pages.
USPTO Non-Final Rejection for U.S. Appl. No. 11/201,627 dated Nov. 16, 2007; 16 pages.
USPTO U.S. Appl. No. 11/201,627: "Method and an apparatus to design a processing system using a graphical user interface," Ogami et al., filed on Aug. 10, 2005; 37 pages.
USPTO Notice of Allowance for U.S. Appl. No. 09/989,808 dated Feb. 13, 2006; 4 pages.
USPTO Non-Final Rejection for U.S. Appl. No. 09/989,808 dated Oct. 19, 2005; 8 pages.
USPTO Non-Final Rejection for U.S. Appl. No. 09/989,808 dated Apr. 14, 2005; 8 pages.
USPTO U.S. Appl. No. 09/989,808: "Automatic generation of application program interfaces, source code, interrupts, and data sheets for microcontroller programming," Bartz et al., filed on Nov. 19, 2001; 67 pages.
USPTO Notice of Allowance for U.S. Appl. No. 10/109,979 dated Mar. 14, 2006; 6 pages.
USPTO Non-Final Rejection for U.S. Appl. No. 10/109,979 dated Jun. 30, 2005; 6 pages.
USPTO U.S. Appl. No. 10/109,979: "Graphical user interface with logic unifying functions," Anderson et al., filed on Mar. 29, 2002; 100 pages.
USPTO U.S. Appl. No. 09/989,781: "System and method for decoupling and iterating resources associated with a module," Ogami et al., filed on Nov. 19, 2001; 40 pages.
USPTO U.S. Appl. No. 09/989,775: "User defined names for registers in memory banks derived from configurations," Ogami et al., filed on Nov. 19, 2001; 29 pages.
USPTO Notice of Allowance for U.S. Appl. No. 09/989,819 dated Jan. 11, 2005; 7 pages.
USPTO Non-Final Rejection for U.S. Appl. No. 09/989,819 dated Jul. 13, 2004; 4 pages.
USPTO Miscellaneous Action for U.S. Appl. No. 09/989,819 dated Dec. 14, 2001; 1 pages.
USPTO U.S. Appl. No. 09/989,819: "System and method for creating a boot file utilizing a boot template," Ogami et al., filed on Nov. 19, 2001; 43 pages.
USPTO Notice of Allowance for U.S. Appl. No. 09/989,761 dated Jan. 14, 2005; 6 pages.
USPTO Final Rejection for U.S. Appl. No. 09/989,761 dated Aug. 26, 2004; 7 pages.
USPTO Non-Final Rejection for U.S. Appl. No. 09/989,761 dated Mar. 10, 2004; 6 pages.

USPTO Final Rejection for U.S. Appl. No. 09/989,761 dated Oct. 3, 2003; 7 pages.
USPTO Non-Final Rejection for U.S. Appl. No. 09/989,761 dated Apr. 18, 2003; 5 pages.
USPTO U.S. Appl. No. 09/989,761: "Storing of global parameter defaults and using them over two or more design projects," Ogami et al., filed on Nov. 19, 2001; 37 pages.
Wang, et al. "Synthesizing Operating System Based Device Drivers in Embedded Systems," Oct. 1-3, 2003; ACM; 8 pages.
Lutovac et al. "Symbolic Computation of Digital Filter Transfer Function Using MATLAB," Proceedings of 23rd International Conference on Microelectronics (MIEL 2002), vol. 2 NIS, Yugoslavia; 4 pages.
Nouta et al. "Design and FPGA-Implementation of Wave Digital Bandpass Filters with Arbitrary Amplitude Transfer Characteristics," Proceedings of IEEE International Symposium on Industrial Electronics; 1998, vol. 2; 5 pages.
Xilinx, Virtex-II Pro Platform FPGA Developer's Kit, "How Data2BRAM Fits in with Hardware and Software Flows," Chapter 2: Using Data2BRAM; Jan. 2003 Release; 2 pages.
PCT Preliminary Report on Patentability (Chapter 1 of the Patent Cooperation Treaty), PCT/US2005/028793, filed Aug. 12, 2005, mailed Dec. 21, 2007; 2 pages.
PCT Written Opinion of the International Searching Authority for PCT/US2005/028793, filed Aug. 12, 2005, mailed Nov. 19, 2007; 7 pages.
PCT International Search Report of the International Searching Authority for PCT/US05/28793, filed Aug. 12, 2005, mailed Nov. 19, 2007; 5 pages.
International Search Report and Written Opinion of the International Searching Authority for PCT/US05/28898, filed Aug. 12, 2005, mailed Mar. 6, 2007; 6 pages.
Burogs et al., "Power Converter Analysis and Design using Matlab: A Transfer Function Approach," Proceedings of IEEE International Symposium on Industrial Electronics 1998, vol. 2; 6 pages.
Efstathiou, "Analog Electronics: Basic Circuits of Operational Amplifiers," <http://web.archive.org/web/20021231045232> Dec. 31, 2002, version, retrieved from the Internet Archives; 10 pages.
PCT International Search Report for PCT/US05/28791, filed Aug. 12, 2005, mailed Mar. 31, 2008; 4 pages.
PCT International Written Opinion for PCT/US05/28791, filed Aug. 12, 2005, mailed Mar. 31, 2008; 8 pages.
Kory Hopkins, "Definition;" Jan. 16, 1997; <http://www.cs.sfu.ca/cs/people/GradStudent.htm>; 1 page.
Ebeling et al., "Validating VLSI Circuit Layout by Wirelist Comparison;" Sep. 1983; in proceedings of the IEEE International Conference on Computer Aided Design (ICCAD-83); 2 pages.
"The Gemini Netlist Comparison Project;" <http://www.cs.washington.edu/research/projects/lis/www/gemini/gemini.html> larry@cs.washington.edu; Mar. 19, 2002; 2 pages.
Ohlrich et al., "Sub-Gemini: Identifying Subcircuits using a Fast Subgraph Isomorphism Algorithm;" Jun. 1993; in proceedings of the 30th IEEE/ACM Design Automation Conference; 7 pages.
Ebling, "Gemini II: A Second Generation Layout Validation Program;" 1988; in proceedings of the IEEE International Conference on Computer Aided Design (ICCAD-88); 4 pages.
USPTO U.S. Appl. No. 12/132,527: "System and Method for Performing Next Placements and Pruning of Disallowed Placements for Programming an Integrated Circuit;" Ogami et al., filed on Jun. 3, 2008; 44 pages.
USPTO U.S. Appl. No. 12/356,468: "System and Method for Dynamically Generating a Configuration Datasheet," Anderson et al.; filed on Jan. 20, 2009; 27 pages.
Written Opinion of the International Search Authority for International Application No. PCT/US08/60680 dated Aug. 15, 2008; 4 pages.
USPTO Notice of Allowance for U.S. Appl. No. 09/475,879 dated Oct. 22, 2004; 7 pages.
USPTO Advisory Action for U.S. Appl. No. 09/475,879 dated Mar. 4, 2002; 3 pages.
USPTO Advisory Action for U.S. Appl. No. 09/475,879 dated Dec. 31, 2001; 3 pages.

USPTO Final Rejection for U.S. Appl. No. 09/475,879 dated Oct. 11, 2001; 10 pages.
USPTO Non-Final Rejection for U.S. Appl. No. 09/475,879 dated Mar. 8, 2001; 6 pages.
USPTO U.S. Appl. No. 09/475,879: "Programmable Logic Device," Lacey et al.; filed on Dec. 30, 1999; 50 pages.
USPTO U.S. Appl. No. 09/475,808: "Configurable Memory for Programmable Logic Circuits," Lacey et al., filed on Dec. 30, 1999; 24 pages.
USPTO Non-Final Rejection for U.S. Appl. No. 09/475,808 dated Jun. 6, 2001; 8 pages.
USPTO Notice of Allowance for U.S. Appl. No. 09/475,808 dated Nov. 6, 2001; 8 pages.
USPTO U.S. Appl. No. 10/137,497: "Reconfigurable Testing System and Method," Pleis et al., filed on May 1, 2002; 40 pages.
USPTO Non-Final Rejection for U.S. Appl. No. 10/137,497 dated Nov. 5, 2004; 17 pages.
USPTO Final Rejection for U.S. Appl. No. 10/137,497 dated May 5, 2005; 13 pages.
USPTO Non-Final Rejection for U.S. Appl. No. 10/137,497 dated Sep. 22, 2005; 21 pages.
USPTO Final Rejection for U.S. Appl. No. 10/137,497 dated Mar. 13, 2006; 15 pages.
USPTO Non-Final Rejection for U.S. Appl. No. 10/137,497 dated Aug. 2, 2006; 21 pages.
USPTO Notice of Allowance for U.S. Appl. No. 10/137,497 dated Jan. 24, 2007; 12 pages.
USPTO Notice of Allowance for U.S. Appl. No. 10/137,497 dated Jul. 20, 2007; 4 pages.
USPTO U.S. Appl. No. 10/653,050: "Method and System for Programming a Memory Device," Snyder et al., filed on Aug. 29, 2003; 69 pages.
USPTO Non-Final Rejection for U.S. Appl. No. 10/653,050 dated Apr. 6, 2004; 7 pages.
USPTO Notice of Allowance for U.S. Appl. No. 10/653,050 dated Jul. 29, 2004; 3 pages.
USPTO U.S. Appl. No. 10/172,670: "Method and System for Programming a Memory Device," Snyder et al., filed on Jun. 13, 2002; 66 pages.
USPTO U.S. Appl. No. 11/986,338: Reconfigurable Testing System and Method, Pleis et al., filed on Nov. 20, 2007; 41 pages.
USPTO Notice of Allowance for U.S. Appl. No. 11/965,291 dated May 5, 2009; 7 pages.
USPTO Non-Final Rejection for U.S. Appl. No. 11/965,291 dated Dec. 17, 2008; 8 pages.
USPTO U.S. Appl. No. 11/965,291: "Universal Digital Block Interconnection and Channel Routing," Snyder et al., filed on Dec. 27, 2007; 31 pages.
USPTO Notice of Allowance for U.S. Appl. No. 11/986,338 dated May 7, 2009; 1 page.
USPTO U.S. Appl. No. 11/273,708: "Capacitance Sensor Using Relaxation Oscillators," Snyder et al., filed on Nov. 14, 2005; 33 pages.
USPTO Non-Final Rejection for U.S. Appl. No. 11/273,708 dated Mar. 19, 2007; 16 pages.
USPTO Final Rejection for U.S. Appl. No. 11/273,708 dated Jul. 5, 2007; 8 pages.
USPTO Notice of Allowance for U.S. Appl. No. 11/273,708 dated Aug. 9, 2007; 4 pages.
USPTO U.S. Appl. No. 11/337,272: "Successive Approximate Capacitance Measurement Circuit" Warren Snyder, filed on Jan. 20, 2006 29 pages.
USPTO Requirement for Restriction/Election for U.S. Appl. No. 11/337,272 dated Sep. 11, 2006; 5 pages.
USPTO Non-Final Rejection for U.S. Appl. No. 11/337,272 dated Oct. 24, 2006; 9 pages.
USPTO Final Rejection for U.S. Appl. No. 11/337,272 dated Feb. 2, 2007; 11 pages.
USPTO Advisory Action for U.S. Appl. No. 11/337,272 dated Apr. 3, 2007; 3 pages.
USPTO Non-Final Rejection for U.S. Appl. No. 11/337,272 dated May 17, 2007; 11 pages.

USPTO Notice of Allowance for U.S. Appl. No. 11/337,272 dated Aug. 15, 2007; 9 pages.
USPTO U.S. Appl. No. 11/983,291: "Successive Approximate Capacitance Measurement Circuit," Warren Snyder, filed on Nov. 7, 2007; 26 pages.
USPTO Non-Final Rejection for U.S. Appl. No. 11/983,291 dated Mar. 9, 2009; 9 pages.
USPTO U.S. Appl. No. 11/698,660: "Configurable Bus," Kutz et al., filed on Jan. 25, 2007; 35 pages.
USPTO Non-Final Rejection for U.S. Appl. No. 11/698,660 dated Dec. 2, 2008; 12 pages.
USPTO Final Rejection for U.S. Appl. No. 11/698,660 dated May 28, 2009; 12 pages.
USPTO U.S. Appl. No. 11/709,866: "Input/Output Multiplexer Bus," Dennis Sequine, filed on Feb. 21, 2007; 33 pages.
USPTO Non-Final Rejection for U.S. Appl. No. 11/709,866 dated Nov. 7, 2008; 14 pages.
USPTO Notice of Allowance for U.S. Appl. No. 11/709,866 dated Apr. 7, 2009; 8 pages.
Sedra et al., "Microelectronic Circuits," 3rd Edition, 1991, Oxford University Press, Feb. 5, 2007; 20 pages.
Van Ess, David; "Simulating a 555 Timer with PSoC," Cypress Semiconductor Corporation, Application Note AN2286, May 19, 2005; 10 pages.
Cypress Semiconductor Corporation, "Fan Controller CG6457AM and CG6462AM," PSoC Mixed Signal Array Preliminary Data Sheet; May 24, 2005; 25 pages.
Cypress Semiconductor Corporation, "PSoC Mixed-Signal Controllers," Production Description; <http://www.cypress.com/portal/server>; retrieved on Sep. 27, 2005; 2 pages.
Cypress Semiconductor Corporation, "CY8C21x34 Data Sheet," CSR User Module, CSR V.1.0; Oct. 6, 2005; 36 pages.
Chapweske, Adam; "The PS/2 Mouse Interface," PS/2 Mouse Interfacing, 2001, retrieved on May 18, 2006; 11 pages.
Cypress Semiconductor Corporation, "Cypress Introduces PSoC(TM)-Based Capacitive Touch Sensor Solution," Cypress Press Release; May 31, 2005; <http://www.cypress.com/portal/server>; retrieved on Feb. 5, 2007; 4 pages.
Seguine, Ryan; "Layout Guidelines for PSoC CapSense," Cypress Semiconductor Corporation, Application Note AN2292; Jul. 22, 2005; 13 pages.
Lee, Mark; "EMC Design Considerations for PSoC CapSense Applications," Cypress Semiconductor Corporation, Application Note AN2318; Sep. 16, 2005; 6 pages.
Cypress Semiconductor Corporation, "Release Notes srn017," Jan. 24, 2007; 3 pages.
Cypress Semiconductor Corporation, "PSoC CY8C20x34 Technical Reference Manual (TRM)," PSoC CY8C20x34 TRM, Version 1.0, 2006; 220 pages.
USPTO U.S. Appl. No. 11/166,622: "Touch wake for electronic devices," Beard et al., filed Jun. 23, 2005; 22 pages.
International Written Opinion of the International Searching Authority for International Application No. PCT/US2006/09572 dated Jan. 10, 2008; 5 pages.
International Search Report for International Application No. PCT/US2006/09572 dated Jan. 10, 2008; 2 pages.
USPTO Notice of Allowance for U.S. Appl. No. 10/024,093 dated Sep. 10, 2002; 7 pages.
USPTO U.S. Appl. No. 10/024,093: "Configurable Memory for Programmable Logic Circuits," Lacey et al., filed on Dec. 18, 2001; 25 pages.
USPTO U.S. Appl. No. 11/088,028: "Method and Circuit for Rapid Alignment of Signals," Moyal et al., filed on Nov. 13, 2007; 34 pages.
USPTO Notice of Allowance for U.S. Appl. No. 11/088,028 dated Jul. 2, 2007; 6 pages.
USPTO Notice of Allowance for U.S. Appl. No. 11/088,028 dated Jan. 26, 2007; 6 pages.
USPTO Non-Final Rejection for U.S. Appl. No. 11/088,028 dated Jun. 16, 2006; 8 pages.
USPTO U.S. Appl. No. 11/985,340: "Method and Circuit for Rapid Alignment of Signals," Moyal et al., filed on Nov. 13, 2007; 34 pages.
USPTO Notice of Allowance for U.S. Appl. No. 11/985,340 dated Jun. 2, 2009; 7 pages.
USPTO Requirement for Restriction for U.S. Appl. No. 11/985,340 dated Mar. 16, 2009; 7 pages.
USPTO Non-Final Rejection for U.S. Appl. No. 11/865,672 dated Jul. 17, 2009; 6 pages.
USPTO Non-Final Rejection for U.S. Appl. No. 11/859,547 dated Oct. 1, 2009; 9 pages.
USPTO Non-Final Rejection for U.S. Appl. No. 11/967,243 dated Sep. 17, 2009; 9 pages.
USPTO Non-Final Rejection for U.S. Appl. No. 11/967,240 dated Jun. 10, 2009; 7 pages.
USPTO Non-Final Rejection for U.S. Appl. No. 11/857,947 dated Mar. 30, 2009; 18 pages.
USPTO Non-Final Rejection for U.S. Appl. No. 12/104,672 dated Aug. 26, 2009; 11 pages.
USPTO Non-Final Rejection for U.S. Appl. No. 12/060,128 dated Apr. 29, 2009; 11 pages.
International Search Report of the International Searching Authority for International Application No. PCT/US08/60695 dated Jul. 22, 2009; 3 pages.
Written Opinion of the International Searching Authority for International Application No. PCT/US08/60695 dated Jul. 22, 2009; 6 pages.
Azim et al., "A Custom DSP Chip to Implement a Robot Motion Controller Proceedings of the IEEE Custom Integrated Circuits Conference," May 1988, pp. 8.7.1-8.7.5; 6 pages.
Catthoor et al., "Architectural Strategies for an Application-Specific Synchronous Multiprocessor Environment," IEEE transactions on Acoustics, Speech, and Signal Processing; vol. 36, No. 2, Feb. 1988, pp. 265-284; 20 pages.
International Search Report of the International Searching Authority for International Application No. PCT/US08/60696 dated Sep. 22, 2008; 2 pages.
International Search Report of the International Searching Authority for International Application No. PCT/US08/60698 dated Sep. 5, 2008; 2 pages.
Shahbahrami et al., "Matrix Register File and Extended Subwords: Two Techniques for Embedded Media Processors," ACM, May 2005; 9 pages.
Jung et al., "A Register File with Transposed Access Mode," 2000, IEEE; 2 pages.
International Search Report of the International Searching Authority for International Application No. PCT/US08/60681 dated Sep. 12, 2008; 2 pages.
Written Opinion of the International Searching Authority for International Application No. PCT/US08/60681 dated Sep. 12, 2008; 4 pages.
USPTO Notice of Allowance for U.S. Appl. No. 11/965,677 dated Sep. 10, 2009; 6 pages.
USPTO Non-Final Rejection for U.S. Appl. No. 11/965,677 dated Mar. 10, 2009; 10 pages.
Written Opinion of the International Searching Authority for International Application No. PCT/US08/60696 dated Sep. 22, 2008; 4 pages.
USPTO Notice of Allowance for U.S. Appl. No. 10/238,966 dated Aug. 5, 2009; 5 pages.
USPTO Notice of Allowance for U.S. Appl. No. 10/033,027 dated Sep. 2, 2009; 4 pages.
USPTO Non-Final Rejection for U.S. Appl. No. 10/001,478 dated Aug. 4, 2009; 17 pages.
USPTO Advisory Action for U.S. Appl. No. 10/001,478 dated Jun. 30, 2009; 3 pages.
USPTO Final Rejection for U.S. Appl. No. 10/001,478 dated Apr. 20, 2009; 16 pages.
USPTO Notice of Allowance for U.S. Appl. No. 10/002,217 dated Sep. 17, 2009; 6 pages.
USPTO Notice of Allowance for U.S. Appl. No. 10/002,217 dated Jun. 8, 2009; 8 pages.
USPTO Notice of Allowance for U.S. Appl. No. 10/001,477 dated Dec. 4, 2009; 7 pages.
USPTO Notice of Allowance for U.S. Appl. No. 10/001,477 dated Aug. 26, 2009; 6 pages.
USPTO Ex Parte Quayle Action for U.S. Appl. No. 09/975,115 dated Aug. 20, 2009; 7 pages.

USPTO Non-Final Rejection for U.S. Appl. No. 09/994,601 dated Jul. 9, 2009; 11 pages.
USPTO Non-Final Rejection for U.S. Appl. No. 11/818,005 dated Nov. 23, 2009; 8 pages.
USPTO Advisory Action for U.S. Appl. No. 09/989,778 dated Jun. 17, 2009; 3 pages.
USPTO Notice of Allowance for U.S. Appl. No. 09/994,600 dated Aug. 25, 2009; 4 pages.
USPTO Notice of Allowance for U.S. Appl. No. 09/994,600 dated Apr. 3, 2009; 5 pages.
USPTO Notice of Allowance for U.S. Appl. No. 09/989,762 dated Oct. 30, 2009; 6 pages.
USPTO Notice of Allowance for U.S. Appl. No. 09/989,762 dated Jul. 16, 2009; 6 pages.
USPTO Non-Final Rejection for U.S. Appl. No. 09/998,848 dated May 12, 2009; 16 pages.
USPTO Non-Final Rejection for U.S. Appl. No. 09/989,767 dated May 12, 2009; 21 pages.
USPTO Final Rejection for U.S. Appl. No. 09/989,771 dated Nov. 25, 2009; 12 pages.
USPTO Notice of Allowance for U.S. Appl. No. 09/989,765 dated Sep. 3, 2009; 7 pages.
USPTO Non-Final Rejection for U.S. Appl. No. 09/989,782 dated Oct. 27, 2009; 9 pages.
USPTO Final Rejection for U.S. Appl. No. 09/989,782 dated May 15, 2009; 10 pages.
USPTO Notice of Allowance for U.S. Appl. No. 11/986,338 dated Oct. 19, 2009; 4 pages.
USPTO Notice of Allowance for U.S. Appl. No. 09/989,777 date Aug. 6, 2009; 8 pages.
USPTO Notice of Allowance for U.S. Appl. No. 10/008,096 dated Oct. 21, 2009; 6 pages.
USPTO Notice of Allowance for U.S. Appl. No. 10/008,096 dated Jun. 5, 2009; 12 pages.
USPTO Notice of Allowance for U.S. Appl. No. 11/985,340 dated Nov. 9, 2009; 7 pages.
USPTO Advisory Action for U.S. Appl. No. 11/201,627 dated Sep. 21, 2009; 3 pages.
USPTO Final Rejection for U.S. Appl. No. 11/201,627 dated Jul. 7, 2009; 19 pages.
USPTO Miscellaneous Action for U.S. Appl. No. 11/201,922 dated Oct. 1, 2009; 2 pages.
USPTO Non-Final Rejection for U.S. Appl. No. 11/200,619 dated Jun. 17, 2009; 12 pages.
USPTO Non-Final Rejection for U.S. Appl. No. 11/166,622 dated Sep. 29, 2009; 11 pages.
USPTO Advisory Action for U.S. Appl. No. 11/166,622 dated May 27, 2009; 3 pages.
USPTO Final Rejection for U.S. Appl. No. 11/166,622 dated Mar. 10, 2009; 11 pages.
USPTO Notice of Allowance for U.S. Appl. No. 12/218,404 dated Nov. 3, 2009; 8 pages.
USPTO Notice of Allowance for U.S. Appl. No. 12/218,404 dated Jul. 10, 2009; 7 pages.
USPTO Notice of Allowance for U.S. Appl. No. 11/709,866 dated Aug. 4, 2009; 7 pages.
USPTO Non-Final Rejection for U.S. Appl. No. 11/698,660 dated Oct. 7, 2009; 12 pages.
USPTO Advisory Action for U.S. Appl. No. 11/698,660 dated Jul. 31, 2009; 3 pages.
USPTO Notice of Allowance for U.S. Appl. No. 11/983,291 dated Oct. 22, 2009; 7 pages.
USPTO Final Rejection for U.S. Appl. No. 11/983,291 dated Aug. 12, 2009; 10 pages.
USPTO Final Rejection for U.S. Appl. No. 11/322,044 dated Oct. 19, 2009; 10 pages.
USPTO Final Rejection for U.S. Appl. No. 11/644,100 dated Aug. 19, 2009; 12 pages.
USPTO Advisory Action for U.S. Appl. No. 11/850,260 dated Nov. 2, 2009; 3 pages.
USPTO Final Rejection for U.S. Appl. No. 11/850,260 dated Aug. 21, 2009; 9 pages.
USPTO Final Rejection for U.S. Appl. No. 09/989,767 dated Dec. 7, 2009; 22 pages.
USPTO Final Rejection for U.S. Appl. No. 11/698,660 dated Feb. 16, 2010; 14 pages.
USPTO Notice of Allowance for U.S. Appl. No. 09/989,765 dated Dec. 22, 2009; 8 pages.
USPTO Notice of Allowance for U.S. Appl. No. 09/994,600 dated Jan. 4, 2010; 4 pages.
USPTO Notice of Allowance for U.S. Appl. No. 10/002,217 dated Jan. 11, 2010; 7 pages.
USPTO Notice of Allowance for U.S. Appl. No. 09/989,777 dated Jan. 15, 2010; 8 pages.
USPTO Notice of Allowance for U.S. Appl. No. 11/965,291 dated Jan. 13, 2010; 4 pages.
USPTO Notice of Allowance for U.S. Appl. No. 09/975,115 dated Jan. 29, 2010; 9 pages.
USPTO Notice of Allowance for U.S. Appl. No. 10/238,966 dated Feb. 1, 2010; 4 pages.
USPTO Final Rejection for U.S. Appl. No. 09/994,601 dated Jan. 5, 2010; 13 pages.
USPTO Non-Final Rejection for U.S. Appl. No. 09/998,848 dated Dec. 10, 2009; 16 pages.
USPTO Notice of Allowance for U.S. Appl. No. 10/008,096 dated Feb. 1, 2010; 6 pages.
USPTO Non-Final Rejection for U.S. Appl. No. 11/201,627 dated Dec. 24, 2009; 22 pages.
USPTO Final Rejection for U.S. Appl. No. 11/200,619 dated Jan. 4, 2010; 18 pages.
USPTO Non-Final Rejection for U.S. Appl. No. 11/644,100 dated Dec. 16, 2009; 13 pages.
USPTO Non-Final Rejection for U.S. Appl. No. 11/850,260 dated Jan. 14, 2010; 8 pages.
USPTO Notice of Allowance for U.S. Appl. No. 10/033,027 dated Feb. 18, 2010; 4 pages.
USPTO Notice of Allowance for U.S. Appl. No. 09/989,762 dated Feb. 22, 2010; 7 pages.
USPTO Notice of Allowance for U.S. Appl. No. 11/986,338 dated Feb. 16, 2010; 4 pages.
USPTO Non-Final Rejection for U.S. Appl. No. 12/136,557 dated Mar. 15, 2010; 10 pages.
USPTO Notice of Allowance for U.S. Appl. No. 11/965,677 dated Feb. 12, 2010; 4 pages.
USPTO Notice of Allowance for U.S. Appl. No. 11/985,340 dated Feb. 19, 2010; 8 pages.
USPTO Notice of Allowance for U.S. Appl. No. 12/218,404 dated Feb. 16, 2010; 7 pages.
USPTO Notice of Allowance for U.S. Appl. No. 11/709,866 dated Feb. 16, 2010; 7 pages.
USPTO Non-Final Rejection for U.S. Appl. No. 10/113,581 dated Aug. 12, 2005; 12 pages.
USPTO Notice of Allowance for U.S. Appl. No. 10/113,581 dated Mar. 5, 2010; 9 pages.
USPTO Non-Final Rejection for U.S. Appl. No. 10/113,581 dated Sep. 1, 2009; 18 pages.
USPTO Final Rejection for U.S. Appl. No. 10/113,581 dated May 11, 2009; 21 pages.
USPTO Non-Final Rejection for U.S. Appl. No. 10/113,581 dated Nov. 26, 2008; 20 pages.
USPTO Final Rejection for U.S. Appl. No. 10/113,581 dated Jun. 11, 2008; 14 pages.
USPTO Non-Final Rejection for U.S. Appl. No. 10/113,581 dated Nov. 27, 2007; 15 pages.
USPTO Final Rejection for U.S. Appl. No. 10/113,581 dated Jul. 13, 2007; 15 pages.
USPTO Non-Final Rejection for U.S. Appl. No. 10/113,581 dated Jan. 10, 2007; 14 pages.
USPTO Final Rejection for U.S. Appl. No. 10/113,581 dated Aug. 10, 2006; 13 pages.
USPTO Non-Final Rejection for U.S. Appl. No. 10/113,581 dated Feb. 24, 2006; 11 pages.
USPTO Notice of Allowance for U.S. Appl. No. 10/001,477 dated Mar. 23, 2010; 6 pages.

USPTO Notice of Allowance for U.S. Appl. No. 09/989,765 dated Mar. 31, 2010; 8 pages.
USPTO Notice of Allowance for U.S. Appl. No. 12/104,672 dated Jan. 11, 2010; 7 pages.
USPTO Non-Final Rejection for U.S. Appl. No. 11/799,439 dated Nov. 2, 2007; 7 pages.
USPTO Non-Final Rejection for U.S. Appl. No. 11/799,439 dated May 29, 2008; 8 pages.
USPTO Final Rejection for U.S. Appl. No. 11/799,439 dated Dec. 18, 2008; 6 pages.
USPTO Notice of Allowance for U.S. Appl. No. 11/799,439 dated Jun. 25, 2009; 6 pages.
USPTO Notice of Allowance for U.S. Appl. No. 11/799,439 dated Feb. 5, 2010; 4 pages.
USPTO Notice of Allowance for U.S. Appl. No. 11/347,189 dated Sep. 27, 2007; 4 pages.
USPTO Non-Final Rejection for U.S. Appl. No. 11/347,189 dated Jun. 8, 2007; 6 pages.
USPTO Notice of Allowance for U.S. Appl. No. 12/070,547 dated Feb. 24, 2010; 4 pages.
USPTO Final Rejection for U.S. Appl. No. 12/070,547 dated Oct. 30, 2009; 5 pages.
USPTO Non-Final Rejection for U.S. Appl. No. 12/070,547 dated Jun. 3, 2009; 6 pages.
USPTO Non-Final Rejection for U.S. Appl. No. 11/201,922 dated Jun. 11, 2010; 12 pages.
USPTO Notice of Allowance for U.S. Appl. No. 09/943,062 dated Jun. 29, 2010; 4 pages.
USPTO Final Rejection for U.S. Appl. No. 11/818,005 dated May 24, 2010; 8 pages.
USPTO Non-Final Rejection for U.S. Appl. No. 12/132,527 dated Apr. 29, 2010; 7 pages.
Vixel, "InSpeed SOC 320 Embedded Storage Switch," 2003, Vixel, pp. 1-5; 5 pages.
A.F. Harvey, "DMA Fundamentals on Various PC Platforms," 2001, 2004, National Instruments Corporation, pp. 1-19; 19 pages.
Balough et al., "White Paper: Comparing IP Integration Approaches for FPGA Implementation," Feb. 2007, Version 1.1, Altera, pp. 1-7; 7 pages.
John Mangino, "Using DMA with High Performance Peripherals to Maximize System Performance," 2007, Texas Instruments, pp. 1-23; 23 pages.
USPTO Non-Final Rejection for U.S. Appl. No. 12/060,176 dated Mar. 30, 2010; 22 pages.
The Written Opinion of the International Search Report for International Application No. PCT/US10/33626 mailed Jun. 24, 2010; 5 pages.
International Search Report for International Application No. PCT/US10/33626 mailed Jun. 24, 2010; 3 pages.
U.S. Appl. No. 12/765,400: "Autonomous Control in a Programmable System," Sullam et al., filed on Apr. 22, 2010; 30 pages.
U.S. Appl. No. 12/057,149: "Power Management Architecture, Method and Configuration System," Kenneth Ogami, filed on Mar. 27, 2008; 34 pages.
U.S. Appl. No. 12/058,569: "Configuration of Programmable IC Design Elements," Best et al., filed on Mar. 28, 2008; 19 pages.
U.S. Appl. No. 12/004,833: "Systems and Methods for Dynamically Reconfiguring a Programmable System on a Chip," Ogami et al., filed on Dec. 21, 2007; 40 pages.
USPTO Notice of Allowance for U.S. Appl. No. 09/989,817 dated May 9, 2005; 6 pages.
USPTO Non-Final Rejection for U.S. Appl. No. 09/989,817 dated Jan. 12, 2005; 5 pages.
USPTO Non-Final Rejection for U.S. Appl. No. 09/989,817 dated Jun. 8, 2004; 7 pages.
USPTO Notice of Allowance for U.S. Appl. No. 10/327,207 dated Jun. 11, 2007; 4 pages.
USPTO Notice of Allowance for U.S. Appl. No. 10/327,207 dated Dec. 26, 2006; 5 pages.
USPTO Non-Final Rejection for U.S. Appl. No. 10/327,207 dated Jul. 21, 2006; 12 pages.
USPTO Final Rejection for U.S. Appl. No. 10/327,207 dated Mar. 2, 2006; 13 pages.
USPTO Non-Final Rejection for U.S. Appl. No. 10/327,207 dated Sep. 20, 2005; 11 pages.
USPTO Miscellaneous Action for U.S. Appl. No. 10/327,207 dated May 13, 2003; 1 page.
USPTO Notice of Allowance for U.S. Appl. No. 09/989,570 dated May 19, 2005; 4 pages.
USPTO Non-Final Rejection for U.S. Appl. No. 09/989,570 dated Jan. 26, 2005; 9 pages.
USPTO Notice of Allowance for U.S. Appl. No. 09/989,570 dated Sep. 10, 2004; 8 pages.
USPTO Non-Final Rejection for U.S. Appl. No. 09/989,570 dated Mar. 25, 2004; 8 pages.
USPTO Non-Final Rejection for U.S. Appl. No. 09/989,570 dated Oct. 7, 2003; 6 pages.
USPTO Advisory Action for U.S. Appl. No. 09/989,570 dated Aug. 14, 2003; 3 pages.
USPTO Final Rejection for U.S. Appl. No. 09/989,570 dated May 30, 2003; 9 pages.
USPTO Non-Final Rejection for U.S. Appl. No. 09/989,570 dated Jan. 2, 2003; 7 pages.
USPTO Notice of Allowance for U.S. Appl. No. 09/989,571 dated Sep. 13, 2005; 6 pages.
USPTO Non-Final Rejection for U.S. Appl. No. 09/989,571 dated May 23, 2005; 8 pages.
USPTO Non-Final Rejection for U.S. Appl. No. 09/989,571 dated Jul. 12, 2004; 9 pages.
M. Mooris Mano, "Computer System Architecture," 1982, Prentice-Hall, 2nd Edition, pp. 261-264 and 435-440; 14 pages.
Dirk Killat, "A One-Chip Solution for Electronic Ballasts in Fluorescent Lamps," Power Electronics, <http://powerelectronics.com/mag/power_onechip_solution_electronic/>, dated Mar. 1, 2004, accessed Sep. 13, 2005; 4 pages.
Fred Eady, "PSoC 101," Circuit Cellar, Aug. 2004, accessed Sep. 13, 2005, <http://www.circuitcellar.com/library/print/0804/eady169/2.htm>; 4 pages.
USPTO Notice of Allowance for U.S. Appl. No. 10/803,030 dated Jan. 8, 2007; 6 pages.
USPTO Non-Final Rejection for U.S. Appl. No. 10/803,030 dated Jun. 8, 2005; 4 pages.
U.S. Appl. No. 12/058,586: "System and Method for Monitoring a Target Device," Ogami et al., filed on Mar. 28, 2008; 41 pages.
U.S. Appl. No. 12/058,534: "System and Method for Controlling a Target Device," Ogami et al., filed on Mar. 28, 2008; 40 pages.
USPTO Miscellaneous Action for U.S. Appl. No. 10/113,581 dated Jun. 23, 2010; 6 pages.
USPTO Miscellaneous Action for U.S. Appl. No. 10/001,478 dated Feb. 23, 2010; 5 pages.
USPTO Notice of Allowance for U.S. Appl. No. 10/001,478 dated Jun. 2, 2010; 11 pages.
USPTO Notice of Allowance for U.S. Appl. No. 11/985,340 dated Jun. 9, 2010; 8 pages.
USPTO Notice of Allowance for U.S. Appl. No. 11/850,260 dated Jul. 2, 2010; 8 pages.
USPTO Notice of Allowance for U.S. Appl. No. 12/060,128 dated Oct. 19, 2009; 8 pages.
USPTO Non-Final Rejection for U.S. Appl. No. 09/975,338 dated Apr. 30, 2010; 2 pages.
USPTO Advisory Action for U.S. Appl. No. 11/818,005 dated Jul. 30, 2010; 3 pages.
USPTO Advisory Action for U.S. Appl. No. 11/201,627 dated Aug. 5, 2010; 3 pages.
USPTO Final Rejection for U.S. Appl. No. 11/201,627 dated May 24, 2010; 26 pages.
USPTO Non-Final Rejection for U.S. Appl. No. 11/166,622 dated Jun. 22, 2010; 11 pages.
USPTO Final Rejection for U.S. Appl. No. 11/166,622 dated Mar. 18, 2010; 12 pages.
USPTO Non-Final Rejection for U.S. Appl. No. 11/698,660 dated May 21, 2010; 15 pages.
USPTO Advisory Action for U.S. Appl. No. 11/644,100 dated Jul. 21, 2010; 3 pages.
USPTO Final Rejection for U.S. Appl. No. 11/644,100 dated May 19, 2010; 13 pages.

USPTO Final Rejection for U.S. Appl. No. 11/865,672 dated Dec. 30, 2009; 6 pages.
USPTO Final Rejection for U.S. Appl. No. 11/857,947 dated Oct. 14, 2009; 22 pages.
USPTO Non-Final Rejection for U.S. Appl. No. 11/857,947 dated Feb. 3, 2010; 23 pages.
USPTO Non-Final Rejection for U.S. Appl. No. 11/857,947 dated Jul. 21, 2010; 15 pages.
USPTO Non-Final Rejection for U.S. Appl. No. 12/058,569 dated Aug. 2, 2010; 9 pages.
USPTO Final Rejection for U.S. Appl. No. 11/968,145 dated Aug. 2, 2010; 6 pages.
USPTO Non-Final Rejection for U.S. Appl. No. 11/968,145 dated Mar. 4, 2010; 11 pages.
USPTO Non-Final Rejection for U.S. Appl. No. 12/104,678 dated Jul. 2, 2010; 8 pages.
USPTO Notice of Allowance for U.S. Appl. No. 10/238,966 dated Jan. 27, 2009; 4 pages.
USPTO Non-Final Rejection for U.S. Appl. No. 10/238,966 dated Jun. 30, 2008; 12 pages.
USPTO Non-Final Rejection for U.S. Appl. No. 10/238,966 dated Dec. 26, 2007; 12 pages.
USPTO Final Rejection for U.S. Appl. No. 10/238,966 dated Sep. 27, 2007; 9 pages.
USPTO Non-Final Rejection for U.S. Appl. No. 10/238,966 dated Apr. 19, 2007; 7 pages.
USPTO Non-Final Rejection for U.S. Appl. No. 10/238,966 dated Oct. 20, 2006; 8 pages.
USPTO Non-Final Rejection for U.S. Appl. No. 10/238,966 dated Apr. 6, 2006; 8 pages.
USPTO Notice of Allowance for U.S. Appl. No. 10/033,027 dated Mar. 31, 2009; 7 pages.
USPTO Non-Final Rejection for U.S. Appl. No. 10/033,027 dated Dec. 18, 2008; 5 pages.
USPTO Final Rejection for U.S. Appl. No. 10/033,027 dated Jun. 8, 2007; 8 pages.
USPTO Non-Final Rejection for U.S. Appl. No. 10/033,027 dated Dec. 21, 2006; 31 pages.
USPTO Final Rejection for U.S. Appl. No. 10/033,027 dated Aug. 9, 2006; 6 pages.
USPTO Non-Final Rejection for U.S. Appl. No. 10/033,027 dated Apr. 26, 2006; 26 pages.
USPTO Final Rejection for U.S. Appl. No. 10/033,027 dated Oct. 31, 2005; 24 pages.
USPTO Non-Final Rejection for U.S. Appl. No. 10/033,027 dated Apr. 20, 2005; 20 pages.
USPTO Non-Final Rejection for U.S. Appl. No. 10/033,027 dated Oct. 18, 2004; 17 pages.
USPTO Non-Final Rejection for U.S. Appl. No. 10/001,478 dated Oct. 20, 2008; 18 pages.
USPTO Final Rejection for U.S. Appl. No. 10/001,478 dated Jun. 4, 2008; 18 pages.
USPTO Non-Final Rejection for U.S. Appl. No. 10/001,478 dated Jan. 30, 2008; 19 pages.
USPTO Final Rejection for U.S. Appl. No. 10/001,478 dated Sep. 17, 2007; 15 pages.
USPTO Non-Final Rejection for U.S. Appl. No. 10/001,478 dated Apr. 2, 2007; 17 pages.
USPTO Final Rejection for U.S. Appl. No. 10/001,478 dated Sep. 5, 2006; 19 pages.
USPTO Non-Final Rejection for U.S. Appl. No. 10/001,478 dated Mar. 15, 2006; 19 pages.
USPTO Final Rejection for U.S. Appl. No. 10/001,478 dated Oct. 24, 2005; 15 pages.
USPTO Non-Final Rejection for U.S. Appl. No. 10/001,478 dated May 16, 2005; 13 pages.
USPTO Notice of Allowance for U.S. Appl. No. 10/002,217 dated Jan. 28, 2009; 4 pages.
USPTO Notice of Allowance for U.S. Appl. No. 10/002,217 dated Oct. 14, 2008; 6 pages.
USPTO Notice of Allowance for U.S. Appl. No. 10/002,217 dated Jun. 6, 2008; 7 pages.
USPTO Final Rejection for U.S. Appl. No. 10/002,217 dated Feb. 6, 2008; 10 pages.
USPTO Non-Final Rejection for U.S. Appl. No. 10/002,217 dated Aug. 3, 2007; 10 pages.
USPTO Final Rejection for U.S. Appl. No. 10/002,217 dated Mar. 7, 2007; 12 pages.
USPTO Non-Final Rejection for U.S. Appl. No. 10/002,217 dated Oct. 2, 2006; 21 pages.
USPTO Non-Final Rejection for U.S. Appl. No. 10/002,217 dated Apr. 3, 2006; 12 pages.
USPTO Final Rejection for U.S. Appl. No. 10/002,217 dated Nov. 17, 2005; 17 pages.
USPTO Non-Final Rejection for U.S. Appl. No. 10/002,217 dated May 19, 2005; 15 pages.
USPTO Advisory Action for U.S. Appl. No. 10/001,477 dated Oct. 10, 2008; 3 pages.
"An Analog PPL-Based Clock and Data Recovery Circuit with High Input Jitter Tolerance;" Sun, Reprinted from IEEE Journal of Solid-State Circuits, 1989; 4 pages.
"WP 3.5: An Integrated Time Reference;" Blauschild, Digest of Technical Papers, 1994; 4 pages.
"Micropower CMOS Temperature Sensor with Digital Output;" Bakker et al., IEEE Journal of Solid-State Circuits, 1996; 3 pages.
U.S. Appl. No. 09/964,991: "A Novel Band-Gap Circuit for Providing an Accurate Reference Voltage Compensated for Process State, Process Variations and Temperature," Kutz et al., filed on Sep. 26, 2001; 25 pages.
U.S. Appl. No. 09/842,966: "Precision Crystal Oscillator Circuit Used in Microcontroller," Monte Mar, filed on Apr. 25, 2001; 28 pages.
USPTO Non-Final Rejection for U.S. Appl. No. 09/975,115 dated Oct. 9, 2008; 34 pages.
USPTO Final Rejection for U.S. Appl. No. 09/975,115 dated May 12, 2008; 33 pages.
USPTO Non-Final Rejection for U.S. Appl. No. 09/975,115 dated Jan. 7, 2008; 30 pages.
USPTO Non-Final Rejection for U.S. Appl. No. 09/975,115 dated Jul. 31, 2007; 28 pages.
USPTO Final Rejection for U.S. Appl. No. 09/975,115 dated Feb. 21, 2007; 25 pages.
USPTO Non-Final Rejection for U.S. Appl. No. 09/975,115 dated Oct. 31, 2006; 19 pages.
USPTO Final Rejection for U.S. Appl. No. 09/975,115 dated Jun. 23, 2006; 20 pages.
USPTO Non-Final Rejection for U.S. Appl. No. 09/975,115 dated Jan. 11, 2006; 15 pages.
USPTO Non-Final Rejection for U.S. Appl. No. 09/975,115 dated Jul. 27, 2005; 11 pages.
USPTO Non-Final Rejection for U.S. Appl. No. 09/975,115 dated Feb. 11, 2005; 86 pages.
USPTO Final Rejection for U.S. Appl. No. 09/975,338 dated Jan. 31, 2008; 21 pages.
USPTO Non-Final Rejection for U.S. Appl. No. 09/975,338 dated Aug. 14, 2007; 19 pages.
USPTO Final Rejection for U.S. Appl. No. 09/975,338 dated Feb. 27, 2007; 23 pages.
USPTO Non-Final Rejection for U.S. Appl. No. 09/975,338 dated Sep. 6, 2006; 11 pages.
USPTO Advisory Action for U.S. Appl. No. 09/975,338 dated May 15, 2006; 4 pages.
USPTO Final Rejection for U.S. Appl. No. 09/975,338 dated Jan. 18, 2006; 12 pages.
USPTO Non-Final Rejection for U.S. Appl. No. 09/975,338 dated Apr. 5, 2005; 13 pages.
USPTO Final Rejection for U.S. Appl. No. 10/008,096 dated Feb. 10, 2005; 15 pages.
USPTO Final Rejection for U.S. Appl. No. 10/008,096 dated Jun. 16, 2008; 23 pages.
USPTO Final Rejection for U.S. Appl. No. 10/008,096 dated Sep. 4, 2007; 19 pages.
USPTO Final Rejection for U.S. Appl. No. 10/008,096 dated Oct. 13, 2006; 17 pages.

USPTO Final Rejection for U.S. Appl. No. 10/008,096 dated Nov. 25, 2005; 17 pages.
USPTO Non-Final Rejection for U.S. Appl. No. 10/008,096 dated Mar. 7, 2007; 19 pages.
USPTO Non-Final Rejection for U.S. Appl. No. 10/008,096 dated Apr. 17, 2006; 18 pages.
USPTO Non-Final Rejection for U.S. Appl. No. 10/008,096 dated Jun. 14, 2004; 24 pages.
USPTO Non-Final Rejection for U.S. Appl. No. 10/008,096 dated Jun. 24, 2005; 15 pages.
USPTO Non-Final Rejection for U.S. Appl. No. 10/008,096 dated Dec. 12, 2007; 14 pages.
USPTO Notice of Allowance for U.S. Appl. No. 10/008,096 dated Dec. 22, 2008; 24 pages.
USPTO Notice of Allowance for U.S. Appl. No. 09/975,105 dated Dec. 4, 2006; 4 pages.
USPTO Final Rejection for U.S. Appl. No. 09/975,105 dated Jul. 13, 2006; 7 pages.
USPTO Non-Final Rejection for U.S. Appl. No. 09/975,105 dated Jan. 19, 2006; 5 pages.
USPTO Non-Final Rejection for U.S. Appl. No. 09/975,105 dated Apr. 19, 2005; 9 pages.
U.S. Appl. No. 09/943,062: "Apparatus and Method for Programmable Power Management in a Programmable Analog Circuit Block," Monte Mar, filed on Aug. 29, 2001; 46 pages.
U.S. Appl. No. 10/238,966: "Method for Parameterizing a User Module," Perrin et al., filed on Sep. 9, 2002; 41 pages.
USPTO Notice of Allowance for U.S. Appl. No. 10/324,455 dated Feb. 12, 2004; 4 pages.
USPTO Non-Final Rejection for U.S. Appl. No. 10/324,455 dated Nov. 6, 2003; 4 pages.
USPTO Non-Final Rejection for U.S. Appl. No. 10/324,455 dated Aug. 21, 2003; 4 pages.
USPTO Notice of Allowance for U.S. Appl. No. 09/998,859 dated Mar. 14, 2005; 6 pages.
USPTO Non-Final Rejection for U.S. Appl. No. 09/998,859 dated Nov. 4, 2004; 6 pages.
USPTO Final Rejection for U.S. Appl. No. 09/998,859 dated Nov. 19, 2003; 5 pages.
USPTO Non-Final Rejection for U.S. Appl. No. 09/998,859 dated May 28, 2003; 6 pages.
USPTO Non-Final Rejection for U.S. Appl. No. 09/998,859 dated May 15, 2003; 6 pages.
USTPO Notice of Allowance for U.S. Appl. No. 09/998,834 dated May 19, 2005; 7 pages.
USPTO Non-Final Rejection for U.S. Appl. No. 09/998,834 dated Sep. 20, 2004; 11 pages.
USPTO Notice of Allowance for U.S. Appl. No. 10/113,065 dated Apr. 6, 2006; 8 pages.
USPTO Final Rejection for U.S. Appl. No. 10/113,065 dated Oct. 26, 2005; 17 pages.
USPTO Non-Final Rejection for U.S. Appl. No. 10/113,065 dated May 20, 2005; 14 pages.
U.S. Appl. No. 09/207,912: "Circuit(s), Architecture and Method(s) for Operating and/or Tuning a Ring Oscillator," Monte Mar, filed on Dec. 9, 1998; 23 pages.
USPTO Notice of Allowance for U.S. Appl. No. 10/001,477 dated May 8, 2009; 6 pages.
USPTO U.S. Appl. No. 09/935,454: "Method and Apparatus for Local and Global Power Management in a Programmable Analog Circuit," Monte Mar, filed on Aug. 22, 2001; 51 pages.
USPTO U.S. Appl. No. 09/923,461: "Non-Interfering Multiply-Mac (Multiply Accumulate) Circuit," Warren Snyder, filed on Aug. 6, 2001; 25 pages.
USPTO U.S. Appl. No. 09/924,734: "Programmable Microcontroller (PSoC) Architecture (Mixed Analog/Digital)"; Snyder et al., filed on Aug. 7, 2001; 28 pages.
USPTO U.S. Appl. No. 09/909,045: "Digital Configurable Macro Architecture," Warren Snyder, filed on Jul. 18, 2001; 37 pages.
USPTO U.S. Appl. No. 09/909,109: "Configuring Digital Functions in a Digital Configurable Macro Architecture," Warren Snyder, filed on Jul. 18, 2001; 38 pages.

USPTO U.S. Appl. No. 09/909,047: "A Programmable Analog System Architecture," Monte Mar, filed on Jul. 18, 2001; 60 pages.
USPTO U.S. Appl. No. 09/930,021: "Programmable Methodology and Architecture for a Programmable Analog System"; Mar et al., filed on Aug. 14, 2001; 87 pages.
USPTO U.S. Appl. No. 09/969,311: "Method for Synchronizing and Resetting Clock Signals Supplied to Multiple Programmable Analog Blocks," Bert Sullam, filed on Oct. 1, 2001; 57 pages.
USPTO U.S. Appl. No. 09/875,599: "Method and Apparatus for Programming a Flash Memory," Warren Snyder, filed on Jun. 5, 2001; 23 pages.
USPTO U.S. Appl. No. 09/975,115: "In-System Chip Emulator Architecture," Snyder et al., filed on Oct. 10, 2001; 38 pages.
USPTO U.S. Appl. No. 09/953,423: "A Configurable Input/Output Interface for a Microcontroller," Warren Snyder, filed on Sep. 14, 2001; 28 pages.
USPTO U.S. Appl. No. 09/893,050: "Multiple Use of Microcontroller Pad," Kutz et al., filed on Jun. 26, 2001; 21 pages.
USPTO U.S. Appl. No. 09/929,891: "Programming Architecture for a Programmable Analog System," Mar et al., filed on Aug. 14, 2001; 82 pages.
USPTO U.S. Appl. No. 09/969,313: "Architecture for Synchronizing and Resetting Clock Signals Supplied to Multiple Analog Programmable Analog Blocks," Bert Sullam, filed on Oct. 1, 2001; 50 pages.
USPTO Non-Final Rejection for U.S. Appl. No. 09/994,601 dated Nov. 14, 2006; 15 pages.
USPTO Final Rejection for U.S. Appl. No. 09/994,601 dated Mar. 8, 2006; 11 pages.
USPTO Non-Final Rejection for U.S. Appl. No. 09/994,601 dated Sep. 21, 2005; 12 pages.
USPTO Final Rejection for U.S. Appl. No. 09/994,601 dated Mar. 24, 2005; 10 pages.
Hintz et al., "Microcontrollers", 1992, McGraw-Hill; 11 pages.
Ganapathy et al., "Hardware Emulation for Functional Verification of K5", Jun. 1996, 33rd Design Automation Conference Proceedings, Jun. 3-7, 1996; 4 pages.
The U.S. Appl. No. 60/243,708 "Advanced Programmable Microcontroller Device"; Snyder et al., filed on Oct. 26, 2000; 277 pages.
"Webster's Third New International Dictionary", 1996, G. & C. Merriam Company; 3 pp. (including pp. 1328-1329).
USPTO Advisory Action for U.S. Appl. No. 09/998,848 dated Sep. 7, 2005; 3 pages.
USPTO U.S. Appl. No. 09/957,084: "A Crystal-Less Oscillator with Trimmable Analog Current Control for Increased Stability," Mar et al., filed on Sep. 19, 2001; 28 pages.
USPTO U.S. Appl. No. 10/011,214: "Method and Circuit for Synchronizing a Write Operation between an On-Chip Microprocessor and an On-Chip Programmable Analog Device Operating at Different Frequencies," Sullam et al., filed on Oct. 25, 2001; 49 pages.
USPTO U.S. Appl. No. 09/972,319: "Method for Applying Instructions to Microprocessor in Test Mode," Warren Snyder, filed on Oct. 5, 2001; 31 pages.
USPTO U.S. Appl. No. 09/972,003: "Test Architecture for Microcontroller Providing for a Serial Communication Interface," Warren Snyder, filed on Oct. 5, 2001; 32 pages.
USPTO U.S. Appl. No. 09/972,133: "Method for Entering Circuit Test Mode," Warren Snyder, filed on Oct. 5, 2001; 30 pages.
USPTO U.S. Appl. No. 09/973,535: "Architecture for Decimation Algorithm," Warren Snyder, filed on Oct. 9, 2001; 26 pages.
USPTO U.S. Appl. No. 09/977,111: "A Frequency Doubler Circuit with Trimmable Current Control," Shutt et al., filed on Oct. 11, 2001; 35 pages.
USPTO U.S. Appl. No. 10/272,231: "Digital Configurable Macro Architecture," Warren Snyder, filed on Oct. 15, 2002; 36 pages.
USPTO U.S. Appl. No. 11/125,554: "A Method for a Efficient Supply to a Microcontroller," Kutz et al., filed on May 9, 2005; 1 page.
USPTO U.S. Appl. No. 09/855,868: "Protecting Access to Microcontroller Memory Blocks," Warren Snyder, filed on May 14, 2001; 28 pages.

USPTO U.S. Appl. No. 09/887,923: "Novel Method and System for Interacting between a Processor and a Power on Reset to Dynamically Control Power States in a Microcontroller," Kutz et al., filed on Jun. 22, 2001; 44 pages.
USPTO U.S. Appl. No. 10/000,383: "System and Method of Providing a Programmable Clock Architecture for an Advanced Microcontroller," Sullam et al., filed on Oct. 24, 2001; 34 pages.
USPTO U.S. Appl. No. 10/001,477: "Breakpoint Control in an In-Circuit Emulation System," Roe et al., filed on Nov. 1, 2001; 43 pages.
USPTO U.S. Appl. No. 10/004,197: "In-Circuit Emulator with Gatekeeper Based Halt Control," Nemecek et al., filed on Nov. 14, 2001; 47 pages.
USPTO U.S. Appl. No. 10/004,039: "In-Circuit Emulator with Gatekeeper for Watchdog Timer," Nemecek et al., filed on Nov. 14, 2001; 46 pages.
USPTO U.S. Appl. No. 10/002,217: "Conditional Branching in an In-Circuit Emulation System," Craig Nemecek, filed on Nov. 1, 2001; 43 pages.
USPTO U.S. Appl. No. 10/001,568: "Combined In-Circuit Emulator and Programmer," Nemecek et al., filed on Nov. 1, 2001; 47 pages.
USPTO U.S. Appl. No. 10/001,478: "In-Circuit Emulator and POD Synchronized Boot," Nemecek et al., filed on Nov. 1, 2001; 44 pages.
USPTO U.S. Appl. No. 09/887,955: "Novel Power on Reset Circuit for Microcontroller," Kutz et al., filed on Jun. 22, 2001; 42 pages.
USPTO U.S. Appl. No. 09/826,397: "Method and Circuit for Allowing a Microprocessor to Change its Operating Frequency on-the-Fly," Bert Sullam, filed on Apr. 2, 2001; 24 pages.
USPTO U.S. Appl. No. 09/893,048: "A Microcontroller having an On-Chip High Gain Amplifier," Kutz et al., filed on Jun. 26, 2001; 22 pages.
USPTO U.S. Appl. No. 09/912,768: "A Microcontroller having a Dual Mode Relax Oscillator that is Trimmable," James Shutt; filed on Jul. 24, 2001; 33 pages.
USPTO U.S. Appl. No. 09/922,419: "A Power Supply Pump Circuit for a Microcontroller," Kutz et al., filed on Aug. 3, 2001; 38 pages.
USPTO U.S. Appl. No. 09/922,579: "A Method for a Efficient Supply to a Microcontroller," Kutz et al., filed on Aug. 3, 2001; 37 pages.
Bursky, "FPGA Combines Multiple Interfaces and Logic," Electronic Design, vol. 48 No. 20, pp. 74-78 (Oct. 2, 2000); 5 pages.
Anonymous, "Warp Nine Engineering—The IEEE 1284 Experts-F/Port Product Sheet," undated web page found at http://www.fapo.com/fport.htm; printed on Apr. 12, 2005; 2 pages.
Anonymous, "F/Port:Fast Parallel Port for the PC" Installation Manual Release 7.1, circa 1997, available for download from http://www.fapo.com/fport.htm; 25 pages.
Nam et al.; "Fast Development of Source-Level Debugging System Using Hardware Emulation"; IEEE 2000; 4 pages.
Huang et al.; "Iceberg: An Embedded In-Cicuit Emulator Synthesizer for Microcontrollers"; ACM 1999; 6 pages.
Khan et al.; "FPGA Architectures for Asic Hardware Emulators"; IEEE 1993; 5 pages.
Oh et al.; Emulator Environment Based on an FPGA Prototyping Board; IEEE 21-23; Jun. 2000; 6 pages.
Hong et al.; "An FPGA-Based Hardware Emulator for Fast Fault Emulation"; IEEE 1997; 4 pages.
Ching et al.; "An In-Cuircuit-Emulator for TMS320C25"; IEEE 1994; 6 pages.
Pastermak et al.; "In-Circuit-Emulation in ASIC Architecture Core Designs"; IEEE 1989; 4 pages.
Melear; "Using Background Modes for Testing, Debugging and Emulation of Microcontrollers"; IEEE 1997; 8 pages.
Walters, Stephen; "Computer-Aided Prototyping for ASIC-Based Systems", 1991, IEEE Design & Test of Computers; vol. 8, Issue 2; 8 pages.
Anonymous; "JEENI JTAG EmbeddedICE Ethernet Interface"; Aug. 1999; Embedded Performance, Inc.; 3 pages.
Sedory; "A Guide to Debug"; 2004; retrieved on May 20, 2005; 7 pages.
"Microsoft Files Summary Judgement Motions"; Feb. 1999; Microsoft PressPass; retrieved on May 20, 2005 from http://www.microsoft.com/presspass/press/1999/feb99/Feb99/Calderapr.asp; 3 pages.

Xerox; "Mesa Debugger Documentation"; Apr. 1979; Xerox Systems Development Department; Version 5.0; 33 pages.
Stallman et al.; "Debugging with GDB the GNU Source-Level Debugger"; Jan. 1994; retrieved on May 2, 2005 from http://www.cs.utah.edu; 4 pages.
Wikipedia.org; "Von Neumann architecture"; retrieved from http://en.wikipedia.org/wiki/Von_Neumann_architecture on Jan. 22, 2007; 4 pages.
Stan Augarten; "The Chip Collection—Introduction—Smithsonian Institute"; "State of the Art"; "The First 256-Bit Static RAM"; retrieved on Nov. 14, 2005 from http://smithsonianchips.si.edu/augarten/p24.htm; 2 pages.
"POD—Piece of Data, Plain Old Documentation, Plain Old Dos . . ."; retrieved on Nov. 14, 2005 from http://www.auditmypc.com/acronym/Pod.asp; 2 pages.
USPTO Final Rejection for U.S. Appl. No. 09/989,771 dated Feb. 27, 2007; 8 pages.
USPTO Final Rejection for U.S. Appl. No. 09/989,771 dated Mar. 28, 2006; 9 pages.
USPTO Final Rejection for U.S. Appl. No. 09/989,771 dated Apr. 6, 2005; 7 pages.
USPTO Final Rejection for U.S. Appl. No. 09/989,771 dated Dec. 10, 2008; 12 pages.
USPTO Final Rejection for U.S. Appl. No. 09/989,771 dated Dec. 27, 2007; 15 pages.
USPTO Non-Final Rejection for U.S. Appl. No. 09/989,771 dated May 28, 2008; 14 pages.
USPTO Non-Final Rejection for U.S. Appl. No. 09/989,771 dated Jul. 16, 2007; 14 pages.
USPTO Non-Final Rejection for U.S. Appl. No. 09/989,771 dated Aug. 23, 2006; 7 pages.
USPTO Non-Final Rejection for U.S. Appl. No. 09/989,771 dated Sep. 12, 2005; 7 pages.
USPTO Non-Final Rejection for U.S. Appl. No. 09/989,771 dated Sep. 22, 2004; 7 pages.
USPTO Final Rejection for U.S. Appl. No. 09/989,765 dated Apr. 3, 2007; 12 pages.
USPTO Final Rejection for U.S. Appl. No. 09/989,765 dated Apr. 4, 2008; 16 pages.
USPTO Final Rejection for U.S. Appl. No. 09/989,765 dated Apr. 17, 2006; 12 pages.
USPTO Non-Final Rejection for U.S. Appl. No. 09/989,765 dated Sep. 19, 2007; 14 pages.
USPTO Non-Final Rejection for U.S. Appl. No. 09/989,765 dated Sep. 26, 2008; 17 pages.
USPTO Non-Final Rejection for U.S. Appl. No. 09/989,765 dated Oct. 2, 2006; 13 pages.
USPTO Non-Final Rejection for U.S. Appl. No. 09/989,765 dated Oct. 5, 2005; 9 pages.
USPTO Final Rejection for U.S. Appl. No. 09/989,782 dated Jul. 9, 2008; 10 pages.
USPTO Final Rejection for U.S. Appl. No. 09/989,782 dated Jul. 24, 2007; 9 pages.
USPTO Final Rejection for U.S. Appl. No. 09/989,782 dated Sep. 21, 2006; 10 pages.
USPTO Final Rejection for U.S. Appl. No. 09/989,782 dated Nov. 3, 2005; 11 pages.
USPTO Non-Final Rejection for U.S. Appl. No. 09/989,782 dated Jan. 29, 2007; 9 pages.
USPTO Non-Final Rejection for U.S. Appl. No. 09/989,782 dated Mar. 28, 2006; 8 pages.
USPTO Non-Final Rejection for U.S. Appl. No. 09/989,782 dated Apr. 29, 2005; 11 pages.
USPTO Non-Final Rejection for U.S. Appl. No. 09/989,782 dated Oct. 6, 2004; 11 pages.
USPTO Non-Final Rejection for U.S. Appl. No. 09/989,782 dated Nov. 26, 2008; 10 pages.
USPTO Non-Final Rejection for U.S. Appl. No. 09/989,782 dated Dec. 14, 2007; 8 pages.
USPTO Final Rejection for U.S. Appl. No. 09/989,765 dated Mar. 31, 2009; 18 pages.
USPTO Final Rejection for U.S. Appl. No. 09/989,778 dated Mar. 16, 2009; 26 pages.

"Pod-Wikipedia, the free encyclopedia"; retrieved on Nov. 14, 2005 from http://en.wikipedia.org/wiki/Pod; 3 pages.
"pod-defintion by dict.die.net"; retrieved on Nov. 14, 2005 from http://dict.die.net/pod; 2 pages.
"In-Curcuit Emulators—descriptions of the major ICEs around"; retrieved on Nov. 14, 2005 from http://www.algonet.se/~staffann/developer/emulator.htm; 6 pages.
USPTO U.S. Appl. No. 09/975,104: "Capturing Test/Emulation and Enabling Real-Time Debugging Using FPGA for In-Circuit Emulation," Warren Snyder, filed on Oct. 10, 2001; 35 pages.
USPTO Non-Final Rejection for U.S. Appl. No. 09/989,767 dated Jul. 24, 2008; 21 pages.
Anonymous; "Using Debug"; 1999; Prentice-Hall Publishing; 20 pages.
Harrison et al.; "Xilinx FPGA Design in a Group Environment Using VHDS and Synthesis Tools"; Colloquium on Digital System Design Using Synthesis Techniques; Feb. 15, 1996; 4 pages.
Microsoft Press Computer User's Dictionary; 1998; 3 pages (including p. 18).
Sreeram Duvvuru and Siamak Arya, "Evaluation of a Branch Target Address Cache," 1995; IEEE; 8 pages.
Andrew S. Tanenbaum with contributions from James R. Goodman, "Structured Computer Organization," 1999, Prentice Hall, Fourth Edition; 32 pages.
USPTO U.S. Appl. No. 09/975,338: "Method for Breaking Execution of a Test Code in DUT and Emulator Chip Essentially Simultaneously and Handling Complex Breakpoint Events," Nemecek et al., filed on Oct. 10, 2001; 34 pages.
USPTO U.S. Appl. No. 09/975,030: "Emulator Chip-Board Architecture for Interface," Snyder et al., filed on Oct. 10, 2001; 37 pages.
Wikipedia—Main Page, retrieved on Mar. 8, 2006 from http://en.wikipedia.org/wiki/Main_Page and http://en.wikipedia.org/wiki/Wikipedia:Introduction; 5 pages.
Wikipedia—Processor register, retrieved on Mar. 7, 2006 from http://en.wikipedia.org/wiki/Processor_register; 4 pages.
Jonathan B. Rosenburg, "How Debuggers Work" John Wiley & Sons, Inc. 1996; 259 pages.
Dahl, et al.; "Emulation of the Sparcle Microprocessor with the MIT Virtual Wires Emulation System"; 1994; IEEE; 9 pages.
Bauer et al.; "A Reconfigurable Logic Machine for Fast Event-Driven Simulation"; Jun. 1998; Design Automation Conference Proceedings; 8 pages.
USPTO U.S. Appl. No. 09/975,105: "Host to FPGA Interface in an In-Circuit Emulation System," Craig Nemecek, filed on Oct. 10, 2001; 44 pages.
USPTO Advisory Action for U.S. Appl. No. 09/994,601 dated May 23, 2006; 3 pages.
USPTO Non-Final Rejection for U.S. Appl. No. 09/994,601 dated Jul. 29, 2004; 10 pages.
USPTO Ex Parte Qualyle Action for U.S. Appl. No. 09/992,076 dated Jun. 18, 2007; 6 pages.
USPTO Non-Final Rejection for U.S. Appl. No. 09/989,767 dated Jul. 2, 2007; 22 pages.
USPTO Notice of Allowance for U.S. Appl. No. 09/992,076 dated Mar. 26, 2008; 23 pages.
USPTO Notice of Allowance for U.S. Appl. No. 09/992,076 dated Jul. 29, 2008; 6 pages.
UPSTO Advisory Action for U.S. Appl. No. 09/989,778 dated May 15, 2006; 4 pages.
USPTO Final Rejection for U.S. Appl. No. 09/989,778 dated Jan. 8, 2009; 25 pages.
USPTO Final Rejection for U.S. Appl. No. 09/989,778 dated Feb. 5, 2007; 17 pages.
USPTO Final Rejection for U.S. Appl. No. 09/989,778 dated Feb. 15, 2006; 9 pages.
USPTO Final Rejection for U.S. Appl. No. 09/989,778 dated Dec. 20, 2007; 14 pages.
USPTO Non-Final Rejection for U.S. Appl. No. 09/989,778 dated Mar. 29, 2005; 14 pages.
USPTO Non-Final Rejection for U.S. Appl. No. 09/989,778 dated Jul. 14, 2008; 24 pages.
USPTO Non-Final Rejection for U.S. Appl. No. 09/989,778 dated Jul. 19, 2007; 18 pages.
USPTO Non-Final Rejection for U.S. Appl. No. 09/989,778 dated Sep. 1, 2005; 10 pages.
USPTO Non-Final Rejection for U.S. Appl. No. 09/989,778 dated Sep. 18, 2006; 11 pages.
USPTO Final Rejection for U.S. Appl. No. 09/998,848 dated Jun. 14, 2005; 17 pages.
USPTO Final Rejection for U.S. Appl. No. 09/998,848 dated Jul. 25, 2006; 16 pages.
USPTO Final Rejection for U.S. Appl. No. 09/998,848 dated Aug. 10, 2007; 14 pages.
USPTO Final Rejection for U.S. Appl. No. 09/998,848 dated Nov. 24, 2008; 15 pages.
USPTO Non-Final Rejection for U.S. Appl. No. 09/998,848 dated Jan. 26, 2006; 17 pages.
USPTO Non-Final Rejection for U.S. Appl. No. 09/998,848 dated Jan. 29, 2007; 13 pages.
USPTO Non-Final Rejection for U.S. Appl. No. 09/998,848 dated Feb. 22, 2008; 15 pages.
USPTO Non-Final Rejection for U.S. Appl. No. 09/998,848 dated Dec. 21, 2004; 14 pages.
USPTO Final Rejection for U.S. Appl. No. 09/989,767 dated Jan. 11, 2007; 12 pages.
USPTO Final Rejection for U.S. Appl. No. 09/989,767 dated Jan. 15, 2009; 21 pages.
USPTO Final Rejection for U.S. Appl. No. 09/989,767 dated Mar. 6, 2006; 15 pages.
USPTO Final Rejection for U.S. Appl. No. 09/989,767 dated Apr. 6, 2005; 13 pages.
USPTO Final Rejection for U.S. Appl. No. 09/989,767 dated Dec. 27, 2007; 21 pages.
USPTO Non-Final Rejection for U.S. Appl. No. 09/989,767 dated Jul. 17, 2006; 12 pages.
USPTO Notice of Allowance for U.S. Appl. No. 09/992,076 dated Nov. 13, 2008; 15 pages.
USPTO Final Rejection for U.S. Appl. No. 09/994,601 dated May 18, 2007; 17 pages.
USPO Notice of Allowance for U.S. Appl. No. 09/992,076 dated Nov. 29, 2007; 8 pages.
USPTO Final Rejection for U.S. Appl. No. 09/992,076 dated Jan. 30, 2007; 32 pages.
USPTO Non-Final Rejection for U.S. Appl. No. 09/992,076 dated Aug. 10, 2006; 19 pages.
USPTO Final Rejection for U.S. Appl. No. 09/992,076 dated Mar. 17, 2006; 16 pages.
USPTO Non-Final Rejection for U.S. Appl. No. 09/992,076 dated Nov. 21, 2005; 29 pages.
USPTO Non-Final Rejection for U.S. Appl. No. 09/992,076 dated Jun. 1, 2005; 20 pages.
USPTO Notice of Allowance for U.S. Appl. No. 09/994,600 dated Nov. 12, 2008; 35 pages.
USPTO Notice of Allowance for U.S. Appl. No. 09/994,600 dated May 14, 2008; 22 pages.
USPTO Final Rejection for U.S. Appl. No. 09/994,600 dated Oct. 17, 2007; 13 pages.
USPTO Non-Final Rejection for U.S. Appl. No. 09/994,600 dated May 15, 2007; 14 pages.
USPTO Final Rejection for U.S. Appl. No. 09/994,600 dated Dec. 8, 2006; 14 pages.
USPTO Non-Final Rejection for U.S. Appl. No. 09/994,600 dated Jul. 17, 2006; 14 pages.
USPTO Final Rejection for U.S. Appl. No. 09/994,600 dated Feb. 13, 2006; 13 pages.
USPTO Non-Final Rejection for U.S. Appl. No. 09/994,600 dated Aug. 23, 2005; 13 pages.
USPTO Final Rejection for U.S. Appl. No. 09/994,600 dated May 4, 2005; 16 pages.
USPTO Non-Final Rejection for U.S. Appl. No. 09/994,600 dated Oct. 21, 2004; 37 pages.
USPTO Notice of Allowance for U.S. Appl. No. 10/001,477 dated Nov. 10, 2008; 7 pages.
USPTO Final Rejection for U.S. Appl. No. 10/001,477 dated Jun. 30, 2008; 19 pages.

USPTO Non-Final Rejection for U.S. Appl. No. 10/001,477 dated Dec. 6, 2007; 17 pages.
USPTO Final Rejection for U.S. Appl. No. 10/001,477 dated Jul. 23, 2007; 19 pages.
USPTO Non-Final Rejection for U.S. Appl. No. 10/001,477 dated Jan. 22, 2007; 17 pages.
USPTO Final Rejection for U.S. Appl. No. 10/001,477 dated Aug. 24, 2006; 15 pages.
USPTO Non-Final Rejection for U.S. Appl. No. 10/001,477 dated Mar. 2, 2006; 17 pages.
USPTO Final Rejection for U.S. Appl. No. 10/001,477 dated Oct. 24, 2005; 18 pages.
USPTO Non-Final Rejection for U.S. Appl. No. 10/001,477 dated May 11, 2005; 31 pages.
Ito, Sergio Akira and Carro, Luigi; "A Comparison of Microcontrollers Targeted to FPGA-Based Embedded Applications", Sep. 2000, Proceedings of 13th Symposium on Integrated Circuits and Systems Design, Sep. 18-24, 2000; 6 pages.
Julio Faura et al.; "A Novel Mixed Signal Programmable Device With On-Chip Microprocessor", 1997, IEEE 1997 Custom Integrated Circuits Conference; 4 pages.
Monte Mar, Bert Sullam, Eric Blom; "An architecture for a configurable Mixed-signal device", 2003, IEEE Journal of Solid-State Circuits, vol. 3; 4 pages.
Robinson, Gordon D; "Why 1149.1 (JTAG) Really Works", May 1994, Conference Proceedings Electro/94 International, May 10-12, 1994, Combined Volumes; 6 pages.
USPTO Non-Final Rejection for U.S. Appl. No. 09/994,601 dated Oct. 4, 2007; 20 pages.
"PSoC designer: Integrated development environment, getting started 25-minute tutorial, version 1.0", Cypress Microsystems., Cypress Microsystems, Inc. CMS10006A, Jul. 3, 2001; 25 pages.
"PSoC technology complete changes 8-bit MCU system design", Cypress Microsystems, Inc. retrieved from <http>://www.archive.org/web/20010219005250/http://cypressmicro.com- /t...>, Feb. 19, 2001; 21 pages.
Specks et al., "A Mixed Digital-Analog 16B Microcontroller with 0.5MB Flash Memory, On-Chip Power Supply, Physical Nework Interface, and 40V I/O for Automotive Single-Chip Mechatronics," IEEE, Feb. 9, 2000; 1 page.
Hsieh et al., "Modeling Micro-Controller Peripherals for High-Level Co-Simulation and Synthesis," IEEE, 1997; 4 pages.
USPTO Notice of Allowance for U.S. Appl. No. 09/989,777 dated Nov. 4, 2008; 3 pages.
USPTO Notice of Allowance for U.S. Appl. No. 09/989,777 dated Sep. 15, 2008; 28 pages.
USPTO Notice of Allowance for U.S. Appl. No. 09/989,777 dated Jul. 7, 2008; 23 pages.
USPTO Final Rejection for U.S. Appl. No. 09/989,777 dated Jan. 30, 2008; 14 pages.
USTPO Non-Final Rejection for U.S. Appl. No. 09/989,777 dated Sep. 11, 2007; 18 pages.
USPTO Final Rejection for U.S. Appl. No. 09/989,777 dated Mar. 13, 2007; 24 pages.
USPTO Non-Final Rejection for U.S. Appl. No. 09/989,777 dated Sep. 13, 2006; 18 pages.
USPTO Non-Final Rejection for U.S. Appl. No. 09/989,777 dated Apr. 11, 2006; 21 pages.
USPTO Final Rejection for U.S. Appl. No. 09/989,777 dated Dec. 21, 2005; 29 pages.
USPTO Non-Final Rejection for U.S. Appl. No. 09/989,777 dated Jul. 5, 2005; 36 pages.
USPTO Notice of Allowance for U.S. Appl. No. 09/994,601 dated Dec. 22, 2008; 15 pages.
USPTO Final Rejection for U.S. Appl. No. 09/994,601 dated Apr. 17, 2008; 24 pages.
USPTO U.S. Appl. No. 10/033,027: "Microcontrollable Programmable System on a Chip," Warren Snyder; filed on Oct. 22, 2001; 117 pages.
USPTO U.S. Appl. No. 10/803,030: "Programmable Microcontrollable Architecture (Mixed Analog/Digital)," Snyder et al., filed on Mar. 16, 2004; 13 pages.

USPTO Notice of Allowance for U.S. Appl. No. 09/930,021 dated Nov. 26, 2004; 4 pages.
USPTO Final Rejection for U.S. Appl. No. 09/930,021 dated Aug. 31, 2004; 8 pages.
USPTO Non-Final Rejection for U.S. Appl. No. 09/930,021 dated Apr. 26, 2004; 6 pages.
USPTO Miscellaneous Action with SSP for U.S. Appl. No. 09/930,021 dated Oct. 1, 2001; 1 page.
USPTO Notice of Allowance for U.S. Appl. No. 09/953,423 dated Jul. 12, 2004; 6 pages.
USPTO Non-Final Rejection for U.S. Appl. No. 09/953,423 dated Feb. 6, 2004; 5 pages.
USPTO Notice of Allowance for U.S. Appl. No. 09/957,084 dated May 18, 2004; 5 pages.
USPTO Final Rejection for U.S. Appl. No. 09/957,084 dated Jan. 29, 2004; 8 pages.
USPTO Non-Final Rejection for U.S. Appl. No. 09/957,084 dated Aug. 27, 2003; 8 pages.
USPTO Final Rejection for U.S. Appl. No. 09/957,084 dated Apr. 23, 2003; 8 pages.
USPTO Non-Final Rejection for U.S. Appl. No. 09/957,084 dated Aug. 23, 2002; 6 pages.
USPTO Notice of Allowance for U.S. Appl. No. 09/969,313 dated Oct. 4, 2005; 6 pages.
USPTO Non-Final Rejection for U.S. Appl. No. 09/969,313 dated May 6, 2005; 9 pages.
USPTO Requirement for Restriction/Election for U.S. Appl. No. 09/969,313 dated Mar. 18, 2005; 6 pages.
USPTO Notice of Allowance for U.S. Appl. No. 09/969,311 dated Mar. 1, 2005; 4 pages.
USPTO Non-Final Rejection for U.S. Appl. No. 09/969,311 dated Sep. 21, 2004; 4 pages.
USPTO Advisory Action for U.S. Appl. No. 09/969,311 dated Jul. 21, 2003; 2 pages.
USPTO Final Rejection for U.S. Appl. No. 09/969,311 dated Apr. 7, 2003; 7 pages.
USPTO Non-Final Rejection for U.S. Appl. No. 09/969,311 dated Nov. 6, 2002; 8 pages.
USPTO Notice of Allowance for U.S. Appl. No. 09/972,319 dated Dec. 30, 2004; 4 pages.
USPTO Non-Final Rejection for U.S. Appl. No. 09/972,319 dated Sep. 16, 2004; 9 pages.
USPTO Notice of Allowance for U.S. Appl. No. 09/972,003 dated Jul. 14, 2004; 4 pages.
USPTO Requirement for Restriction/Election for U.S. Appl. No. 09/972,003 dated May 6, 2004; 4 pages.
USPTO Non-Final Rejection for U.S. Appl. No. 09/972,003 dated Feb. 2, 2004; 10 pages.
USPTO Non-Final Rejection for U.S. Appl. No. 09/972,003 dated Aug. 19, 2003; 11 pages.
USPTO Notice of Allowance for U.S. Appl. No. 09/972,133 dated Jun. 9, 2006; 6 pages.
USPTO Final Rejection for U.S. Appl. No. 09/972,133 dated Mar. 30, 2006; 8 pages.
USPTO Non-Final Rejection for U.S. Appl. No. 09/972,133 dated Nov. 25, 2005; 9 pages.
USPTO Advisory Action for U.S. Appl. No. 09/972,133 dated Aug. 31, 2005; 3 pages.
USPTO Final Rejection for U.S. Appl. No. 09/972,133 dated Jun. 29, 2005; 10 pages.
USPTO Non-Final Rejection for U.S. Appl. No. 09/972,133 dated Mar. 8, 2005; 9 pages.
USPTO Notice of Allowance for U.S. Appl. No. 09/975,104 dated Oct. 19, 2006; 6 pages.
USPTO Non-Final Rejection for U.S. Appl. No. 09/975,104 dated Jun. 16, 2006; 8 pages.
USPTO Final Rejection for U.S. Appl. No. 09/975,104 dated Feb. 15, 2006; 7 pages.
USPTO Non-Final Rejection for U.S. Appl. No. 09/975,104 dated Aug. 16, 2005; 6 pages.
USPTO Non-Final Rejection for U.S. Appl. No. 09/975,104 dated Mar. 21, 2005; 7 pages.

USPTO Notice of Allowance for U.S. Appl. No. 09/975,030 dated Feb. 6, 2006; 7 pages.
USPTO Non-Final Rejection for U.S. Appl. No. 09/975,030 dated Oct. 20, 2005; 7 pages.
USPTO Non-Final Rejection for U.S. Appl. No. 09/975,030 dated Mar. 29, 2005; 13 pages.
USPTO Notice of Allowance for U.S. Appl. No. 09/977,111 dated Sep. 28, 2006; 6 pages.
USPTO Notice of Allowance for U.S. Appl. No. 10/272,231 dated Mar. 8, 2004; 6 pages.
USPTO Final Rejection for U.S. Appl. No. 10/272,231 dated Nov. 5, 2003; 5 pages.
USPTO Non-Final Rejection for U.S. Appl. No. 10/272,231 dated Jul. 14, 2003; 6 pages.
USPTO Notice of Allowance for U.S. Appl. No. 11/125,554 dated Feb. 7, 2008; 4 pages.
USPTO Notice of Allowance for U.S. Appl. No. 11/125,554 dated Apr. 24, 2007; 7 pages.
USPTO Non-Final Rejection for U.S. Appl. No. 11/125,554 dated Dec. 11, 2006; 9 pages.
USPTO Notice of Allowance for U.S. Appl. No. 09/855,868 dated Apr. 25, 2005; 6 pages.
USPTO Non-Final Rejection for U.S. Appl. No. 09/855,868 dated Aug. 26, 2004; 7 pages.
USPTO Notice of Allowance for U.S. Appl. No. 09/887,923 dated Sep. 27, 2004; 5 pages.
USPTO Non-Final Rejection for U.S. Appl. No. 09/887,923 dated May 25, 2004; 7 pages.
USPTO Notice of Allowance for U.S. Appl. No. 09/875,599 dated Oct. 17, 2006; 4 pages.
USPTO Non-Final Rejection for U.S. Appl. No. 09/875,599 dated May 31, 2006; 18 pages.
USPTO Final Rejection for U.S. Appl. No. 09/875,599 dated Feb. 15, 2006; 18 pages.
USPTO Final Rejection for U.S. Appl. No. 09/875,599 dated Nov. 21, 2005; 16 pages.
USPTO Advisory Action for U.S. Appl. No. 09/875,599 dated Jun. 8, 2005; 3 pages.
USPTO Final Rejection for U.S. Appl. No. 09/875,599 dated Mar. 29, 2005; 20 pages.
USPTO Non-Final Rejection for U.S. Appl. No. 09/875,599 dated Dec. 3, 2004; 16 pages.
USPTO Final Rejection for U.S. Appl. No. 09/875,599 dated Aug. 25, 2004; 17 pages.
USPTO Final Rejection for U.S. Appl. No. 09/875,599 dated Apr. 26, 2004; 15 pages.
USPTO Non-Final Rejection for U.S. Appl. No. 09/875,599 dated Oct. 27, 2003; 13 pages.
USPTO Notice of Allowance for U.S. Appl. No. 10/004,197 dated Feb. 9, 2007; 7 pages.
USPTO Notice of Allowance for U.S. Appl. No. 10/004,197 dated Oct. 6, 2006; 7 pages.
USPTO Non-Final Rejection for U.S. Appl. No. 10/004,197 dated Apr. 3, 2006; 13 pages.
USPTO Final Rejection for U.S. Appl. No. 10/004,197 dated Nov. 23, 2005; 17 pages.
USPTO Non-Final Rejection for U.S. Appl. No. 10/004,197 dated Jun. 6, 2005; 21 pages.
USPTO Notice of Allowance for U.S. Appl. No. 10/004,039 dated Aug. 15, 2006; 7 pages.
USPTO Non-Final Rejection for U.S. Appl. No. 10/004,039 dated Apr. 11, 2006; 14 pages.
USPTO Final Rejection for U.S. Appl. No. 10/004,039 dated Nov. 22, 2005; 19 pages.
USPTO Non-Final Rejection for U.S. Appl. No. 10/004,039 dated Jun. 6, 2005; 17 pages.
USPTO Notice of Allowance for U.S. Appl. No. 10/001,568 dated Mar. 17, 2006; 9 pages.
USPTO Final Rejection for U.S. Appl. No. 10/001,568 dated Oct. 26, 2005; 16 pages.
USPTO Non-Final Rejection for U.S. Appl. No. 10/001,568 dated May 19, 2005; 16 pages.
USPTO Notice of Allowance for U.S. Appl. No. 09/887,955 dated Oct. 12, 2004; 5 pages.
USPTO Non-Final Rejection for U.S. Appl. No. 09/887,955 dated May 26, 2004; 5 pages.
USPTO Notice of Allowance for U.S. Appl. No. 09/826,397 dated Oct. 7, 2004; 8 pages.
USPTO Non-Final Rejection for U.S. Appl. No. 09/826,397 dated Apr. 21, 2004; 6 pages.
USPTO Notice of Allowance for U.S. Appl. No. 09/893,048 dated Jul. 25, 2006; 4 pages.
USPTO Non-Final Rejection for U.S. Appl. No. 09/893,048 dated Jan. 12, 2006; 6 pages.
USPTO Non-Final Rejection for U.S. Appl. No. 09/893,048 dated Jul. 27, 2005; 6 pages.
USPTO Non-Final Rejection for U.S. Appl. No. 09/893,048 dated Oct. 6, 2004; 5 pages.
USPTO Notice of Allowance for U.S. Appl. No. 09/893,050 dated Jul. 5, 2005; 6 pages.
USPTO Non-Final Rejection for U.S. Appl. No. 09/893,050 dated Jan. 5, 2005; 13 pages.
USPTO Final Rejection for U.S. Appl. No. 09/893,050 dated Aug. 30, 2004; 13 pages.
USPTO Non-Final Rejection for U.S. Appl. No. 09/893,050 dated Jan. 15, 2004; 9 pages.
USPTO Notice of Allowance for U.S. Appl. No. 09/909,047 dated May 11, 2005; 25 pages.
USPTO Notice of Allowance for U.S. Appl. No. 09/909,047 dated Feb. 15, 2005; 6 pages.
USPTO Non-Final Rejection for U.S. Appl. No. 09/909,047 dated Jul. 6, 2004; 9 pages.
USPTO Notice of Allowance for U.S. Appl. No. 09/912,768 dated Sep. 13, 2005; 5 pages.
USPTO Non-Final Rejection for U.S. Appl. No. 09/912,768 dated Apr. 11, 2005; 14 pages.
USPTO Final Rejection for U.S. Appl. No. 09/912,768 dated Nov. 17, 2004; 13 pages.
USPTO Non-Final Rejection for U.S. Appl. No. 09/912,768 dated Jun. 22, 2004; 11 pages.
USPTO Notice of Allowance for U.S. Appl. No. 09/922,579 dated Dec. 28, 2004; 6 pages.
USPTO Non-Final Rejection for U.S. Appl. No. 09/922,579 dated Aug. 18, 2004; 6 pages.
USPTO Notice of Allowance for U.S. Appl. No. 09/923,461 dated May 12, 2005; 6 pages.
USPTO Non-Final Rejection for U.S. Appl. No. 09/923,461 dated Jul. 16, 2004; 6 pages.
USPTO Notice of Allowance for U.S. Appl. No. 09/929,891 dated Dec. 23, 2005; 4 pages.
USPTO Notice of Allowance for U.S. Appl. No. 09/929,891 dated Jun. 15, 2005; 6 pages.
USPTO Non-Final Rejection for U.S. Appl. No. 09/929,891 dated Sep. 13, 2004; 6 pages.
USPTO Notice of Allowance for U.S. Appl. No. 10/011,214 dated Apr. 11, 2005; 4 pages.
USPTO Final Rejection for U.S. Appl. No. 10/011,214 dated Jan. 21, 2005; 8 pages.
USPTO Non-Final Rejection for U.S. Appl. No. 10/011,214 dated Aug. 13, 2004; 10 pages.
Hong et al., "Hierarchial System Test by an IEEE 1149.5 MTM-Bus Slave-Module Interface Core," IEEE, 2000; 14 pages.
Haberl et al., "Self Testable Boards with Standard IEEE 1149.5 Module Test and Maintenance (MTM) Bus Interface," IEEE, 1994; 6 pages.
Varma et al., "A Structured Test Re-Use Methodology for Core-Based System Chips," IEEE, 1998; 9 pages.
Andrews, "Roadmap for Extending IEEE 1149.1 for Hierarchical Control of Locally-Stored, Standardized command Set, Test Programs," IEEE, 1994; 7 pages.
Adham et al., "Preliminary Outline of the IEEE P1500 Scalable Architecture for Testing Embedded Cores," 1999, IEEE; 6 pages.
Ghosh et al., "A Low Overhead Design for Testability and Test Generation Technique for Core-based Systems," IEEE, 1997; 10 pages.

Zorian, "Test Requirements for Embedded Core-based Systems and IEEE P1500," IEEE, 1997; 9 pages.

Zorian et al., "Testing Embedded-Core Based System Chips," IEEE, 1998; 14 pages.

Papachristou et al., "Microprocessor Based Testing for Core-Based System on a Chip," IEEE, 1999; 6 pages.

Maroufi et al., "Solving the I/O Bandwidth Problem in System on a Chip Testing," IEEE, 2000; 6 pages.

Marsh, "Smart Tools Illuminate Deeply Embedded Systems," EDN, 2000; 7 pages.

York et al., "On-chip Support Needed for SOC Debug," Electronic Engineering Times, 1999; 2 pages.

Atmel Corporation: AT9OSC Summary: "Secure Microcontrollers for Smart Cards," 1999; 7 pages.

Hwang et al., "Integrated circuit for automatically varying resistance in computer system, has pair of transistors connected in parallel with respective resistors such that resistors are bypassed when corresponding transistors are enabled," Derwent Information LTD; 2002; 2 pages.

Morrison, "IBM Eyes Merchant Packaging Services," Jul. 13, 1998; Electronic News <http://www.findarticles.com>; 4 pages.

Charles, Jr. et al., "Wirebonding: Reinventing the Process for MCMs," Apr. 1998; IEEE 7th International Conference on Multichip Modules and High Density Packaging; 3 pages.

Tran et al., "Fine Pitch and Wirebonding and Reliability of Aluminum Capped Copper Bond Pads," May 2000, IEEE Electronic Components and Technology Conference; 8 pages.

Song et al., "A 50% Power Reduction Scheme for CMOS Relaxation Oscillator," IEEE, 1999; 4 pages.

"Electronic Circuit Protector-Circuit Breaker;" IBM Technical Disclosure Bulletin; vol. 36, Issue 8, Aug. 1, 1993; 1 page.

USPTO Notice of Allowance for U.S. Appl. No. 09/992,076 dated Feb. 27, 2009; 6 pages.

USPTO Non-Final Rejection for U.S. Appl. No. 09/989,771 dated Apr. 30, 2009; 11 pages.

USPTO Notice of Allowance for U.S. Appl. No. 09/989,762 dated Mar. 25, 2009; 7 pages.

USPTO Notice of Allowance for U.S. Appl. No. 09/989,762 dated Oct. 24, 2008; 7 pages.

USPTO U.S. Appl. No. 09/989,815: "A Data Driven Method and System for Monitoring Hardware Resource Usage for Programming an Electric Device," Bartz et al., filed on Nov. 19, 2001; 36 pages.

USPTO Notice of Allowance for U.S. Appl. No. 09/989,762 dated Jun. 2, 2008; 6 pages.

USPTO Notice of Allowance for U.S. Appl. No. 09/989,762 dated Jan. 2, 2008; 6 pages.

USPTO Non-Final Rejection for U.S. Appl. No. 09/989,762 dated Jul. 23, 2007; 15 pages.

USPTO Final Rejection for U.S. Appl. No. 09/989,762 dated Jan. 26, 2007; 13 pages.

USPTO Non-Final Rejection for U.S. Appl. No. 09/989,762 dated Aug. 10, 2006; 18 pages.

USPTO Final Rejection for U.S. Appl. No. 09/989,762 dated Mar. 14, 2006; 19 pages.

USPTO Non-Final Rejection for U.S. Appl. No. 09/989,762 dated Jul. 27, 2005; 15 pages.

USPTO U.S. Appl. No. 09/275,336: "Programmable Oscillator Scheme," Mar et al., filed on Mar. 24, 1999; 25 pages.

USPTO U.S. Appl. No. 09/721,316: "Programmable Oscillator Scheme," Mar et al., filed on Nov. 22, 2000; 26 pages.

USPTO U.S. Appl. No. 10/324,455: "Programmable Oscillator Scheme," Mar et al., filed on Dec. 20, 2002; 23 pages.

USPTO U.S. Appl. No. 09/998,859: "A System and a Method for Checking Lock Step Consistency between in Circuit Emulation and a Microcontroller while Debugging Process is in Progress," Craig Nemecek, filed on Nov. 15, 2001; 33 pages.

USPTO U.S. Appl. No. 09/998,834: "A System and a Method for Communication between and Ice and a Production Microcontroller while in a Halt State," Craig Nernecek, filed on Nov. 15, 2001; 33 pages.

USPTO U.S. Appl. No. 10/113,065: "System and Method for Automatically Matching Components in a Debugging System," Nemecek et al., filed on Mar. 29, 2002; 32 pages.

USPTO U.S. Appl. No. 09/989,574: "Method and System for using a Graphics user Interface for Programming an Electronic Device," Bartz et al., filed on Nov. 19, 2001; 43 pages.

USPTO U.S. Appl. No. 09/989,816: "Datasheet Browsing and Creation with Data-Driven Datasheet Tabs within a Microcontroller Design Tool," Bartz et al., filed on Nov. 19, 2001; 55 pages.

Stephen Walters, "Computer-Aided Prototyping for ASIC-Based Systems," 1991, IEEE Design & Test of Computers, vol. 8, Issue 2, pp. 4-10; 8 pages.

Robert A. Blauschild, "WP 3.5: An Integrated Time Reference," ISSCC94/Session 3, Analog Techniques/Paper WP 3.5, Feb. 1994, pp. 56-58; 4 pages.

Frank Goodenough, "Analog counterparts of FPGAS Ease System Design," Electronic Design, Penton Publishing, Cleveland, OH, Oct. 14, 1994, vol. 42, No. 21, pp. 63-66, 68; 10 pages.

Duvvuru et al., "Evaluation of a Branch Target Address Cache," 1995, IEEE, pp. 173-180; 8 pages.

Dick Pastemak, "In-Circuit-Emulation in ASIC Architecture Cor Designs," IEEE, 1989, pp. P6-4.1-P6-4.4; 4 pages.

U.S. Appl. No. 09/957,084: "A Crystal-Less oscillator Circuit with Trimmable Analog Current Control for Increased Stability," Mar et al., filed Sep. 19, 2001; 29 pages.

Daniel B. Sedory, "A Guide to DEBUG," 2004, retrieved on May 20, 2005 from http://www.geocites.com/thestarman3/asm/debug/debug2.htm, pp. 1-11; 7 pages.

U.S. Appl. No. 10/033,027: "Microcontrollable Programmable System on a Chip," Snyder, filed on Oct. 22, 2001; 117 pages.

U.S. Appl. No. 10/137,497: "Reconfigurable Testing System and Method," Pleis et al.; filed on May 1, 2002; 40 pages.

U.S. Appl. No. 11/088,028: "Method and Circuit for Rapid Alignment of Signals," Moyal et al., filed on Nov. 13, 2007; 34 pages.

U.S. Appl. No. 11/166,622: "Touch Wake for electronic Devices," Beard et al., filed on Jun. 23, 2005; 22 pages.

U.S. Appl. No. 11/965,291: "Universal Digital Block Interconnection and Channel Routing," Snyder et al., filed on Dec. 27, 2007; 31 pages.

U.S. Appl. No. 11/985,340: "Method and Circuit for Rapid Alignment of Signals," Moyal et al., filed on Nov. 13, 2007; 34 pages.

U.S. Appl. No. 12/356,468: "System and Method for Dynamically Generating a Configuration Datasheet," Anderson et al.; filed on Jan. 20, 2009; 27 pages.

Bakker et al., "Micropower CMOS Temperature Sensor with Digital Output," IEEE Journal of Solid-State Circuits, Jul. 1996; 3 pages.

USPTO Non-Final Rejection for U.S. Appl. No. 09/989,767 dated Oct. 6, 2004; 15 pages.

USPTO Non-Final Rejection for U.S. Appl. No. 10/001,477 dated Dec. 6, 2007; 13 pages.

USPTO Final Rejection for U.S. Appl. No. 10/001,477 dated Jun. 30, 2008; 15 pages.

USPTO Final Rejection for U.S. Appl. No. 10/001,477 dated Jul. 23, 2007; 16 pages.

USPTO Final Rejection for U.S. Appl. No. 10/001,477 dated Aug. 24, 2006; 13 pages.

USPTO Final Rejection for U.S. Appl. No. 10/001,477 dated Oct. 24, 2005; 13 pages USPTO Final Rejection for U.S. Appl. No. 10/001,477 dated Jan. 22, 2007; 15 pages.

USPTO Final Rejection for U.S. Appl. No. 10/001,477 dated Mar. 2, 2006; 14 pages.

USPTO Final Rejection for U.S. Appl. No. 10/001,477 dated May 11, 2005; 10 pages.

Charles Melear, "Using Background Modes for Testing, Debugging and Emulation of Microcontrollers," IEEE, 1997, pp. 90-97; 8 pages.

"PSoC designer: Integrated development environment, getting started 25-minute tutorial, version 1.0," Cypress Microsystems., Cypress Microsystems, Inc. CMS10006A, Jul. 3, 2001; 25 pages.

Killat, Kirk; "A One-Chip Solution for Electronic Ballasts in Fluorescent Lamps"; Power Electronics; http://powerelectonics.com/mag/power_onechip_solution_electronic/, Mar. 1, 2004.

Mano, Morris; "Computer System Architecture"; 1982; Prentice-Hall, Inc.; 2nd edition; p. 261-264 and 435-440.

Eady, Fred; "PSoc 101"; Circuit Cellar; http://www.circuitcellar.com/library/print/0804/eady169/2.htm, Aug. 2004.

Killat, Kirk; "A One-Chip Solution for Electronic Ballasts in Fluorescent Lamps"; Power Electronics; http://powerelectonics.com/mag/power_onechip_solution_electronic/, Mar. 1, 2004.

Mano, Morris; "Computer System Architecture"; 1982; Prentic-Hall, Inc.; 2nd edition; p. 261-264 and 435-440.

U.S. Appl. No. 11/864,137 "Configurable Liquid Crystal Display Driver system," David Wright et al., filed on Sep. 28, 2007; 22 pages.

Application No. PCT/US08/60699 "Active Liquid Crystal Display Drivers and Duty Cycle Operation," filed on Apr. 17, 2008; 23 pages.

Jinbin Zhao, et al., "Steady-State and Dynamic Analysis of a Buck Converter Using a Hysteretic PWM Control" Dated 2004; 5 pages.

USPTO Final Rejection for U.S. Appl. No. 09/989,571 dated Jan. 26, 2005; 11 pages.

USPTO Non-Final Rejection for U.S. Appl. No. 11/965,520 dated Dec. 18, 2012; 13 pages.

* cited by examiner

GRAPHICAL USER INTERFACE FOR DYNAMICALLY RECONFIGURING A PROGRAMMABLE DEVICE

RELATED APPLICATIONS

This application is a continuation of U.S. patent application No. 09/989,817, filed Nov. 19, 2001, now U.S. Pat. No. 6,971,004, issued Nov. 29, 2005.

This application is related to co-pending commonly-owned U.S. patent application Ser. No. 10/033,027, filed Oct. 22, 2001, entitled "MICROCONTROLLER PROGRAMMABLE SYSTEM ON A CHIP," U.S. patent application Ser. No. 09/989,574, filed Nov. 19, 2001, entitled "METHOD AND SYSTEM FOR USING A GRAPHICS USER INTERFACE FOR PROGRAMMING AN ELECTRONIC DEVICE," U.S. patent application Ser. No. 09/989,570, filed Nov. 19, 2001, entitled "METHOD FOR FACILITATING MICROCONTROLLER PROGRAMMING," U.S. patent application Ser. No. 09/989,571, filed Nov. 19, 2001, entitled "METHOD FOR DESIGNING A CIRCUIT FOR PROGRAMMABLE MICROCONTROLLERS," and U.S. patent application Ser. No. 09/989,817, filed Nov. 19, 2001, entitled "SYSTEM AND METHOD OF DYNAMICALLY RECONFIGURING A PROGRAMMABLE SYSTEM ON A CHIP," all of which are incorporated herein by reference.

FIELD OF THE INVENTION

Embodiments of the present invention generally relate to the field of software interfaces and methods for programming and/or developing integrated circuits. More specifically, embodiments of the present invention pertain to a graphical user interface (GUI) and method for programming a dynamically reconfigurable integrated circuit.

BACKGROUND

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Electronic systems designed to provide these benefits often include integrated circuits on a single substrate that provide a variety advantages over discrete component circuits. However, traditional design and manufacturing approaches for integrated circuits are often very complex and consume significant resources.

Electronic systems often rely upon a variety of components included in integrated circuits to provide numerous functions. Microcontrollers are one example of integrated circuit components with characteristics that are potentially useful in a variety of applications. For example, microcontrollers are typically reliable and relatively economical to produce. Microcontrollers have evolved since they were first introduced and have substantially replaced mechanical and electromechanical components in numerous applications and devices. However, while traditional microcontrollers have some characteristics that are advantageous, they also tend to be limited in the number of applications in which any given microcontroller integrated circuit can be utilized.

Traditionally each microcontroller is custom designed precisely for a narrow range of applications with a fixed combination of required peripheral functionalities. Developing custom microcontroller designs with particular fixed peripherals is time and resource intensive, typically requiring separate and dedicated manufacturing operations for each different microcontroller (which is particularly expensive for small volume applications). Even if a microcontroller may suffice for more than one application, the range of those applications may be somewhat limited. For example, completely different and totally separate integrated circuits are generally used for disparate applications such as monitoring ambient temperature over time and transmitting the time/temperature data to a remote location, or detecting light and controlling the operation of a motor, or playing an audio recording and receiving/checking digital security information.

Application specific integrated circuits (ASICs) may appear to address some of the above issues, but they can present significant hurdles. ASICs tend to require sophisticated design expertise, high development costs, and large volume requirements. To the extent some flexibility may be provided by the inclusion of gate arrays or other logic devices, the traditional approaches remain expensive and require a sophisticated level of design expertise. In addition, traditional integrated circuit configurations and configuration are typically set during initial manufacture and are not readily adaptable to changing conditions in the field.

Traditional integrated circuits typically have a predetermined set configuration and configuration that do not conveniently facilitate dynamic changes. Typically, one set of components is included and set to perform one function and a second set of components perform another function. Many applications require a variety of different functions, resulting in significantly increased resource commitments where the configuration is "hard-wired" into the design. Providing circuit components dedicated to single functions may results in less than the most efficient utilization of those dedicated components. For example, numerous functions in a variety of applications are performed infrequently or intermittently, and the valuable resources committed to these activities sit idle for much of the time. In addition, in some applications, functions are performed sequentially, with a second group of components dedicated to later activities sitting idle waiting on input from a first group of components dedicated to earlier activities, and when the first group of components has finished, they sit idle while the second group performs their dedicated function.

Similarly, the purpose of particular external ports or pins is typically fixed, and traditional systems typically dedicate external ports or pins to very precise, well-defined purposes. Accomplishing additional or different interactions with external components sometimes requires additional dedicated external ports or pins which consume valuable resources that are typically limited. Some dedicated external ports or pins may be utilized infrequently (e.g., only on start-up) and/or required to wait while activities proceed via other external ports or pins.

What is desired is an interface, system and method that enables dynamic reconfiguration of a programmable device in a convenient and efficient manner.

SUMMARY

The present invention relates to a GUI, system and method for programming a dynamically reconfigurable electronic device (e.g., a programmable mixed signal integrated circuit, such as a programmable microcontroller, data communications device or clock device). In one embodiment of the present invention, the GUI enables easy and efficient switching between different configurations while preserving and/or monitoring the validity of the different configuration states. In one exemplary embodiment, the present invention is implemented in software for dynamically programming different configurations and functions of a microcontroller having integrated, configurable analog and digital/mathematical blocks of circuitry. A plurality of different configuration images may be utilized to define the different configurations and functions and facilitate allocation of programmable components included in the electronic device accordingly.

In one embodiment, the GUI is used to program a microcontroller that further includes configurable analog and digital/mathematical blocks of circuitry, all on a single substrate. (The term "configurable digital/mathematical block of circuitry" as used herein refers to a configurable digital block of circuitry that has been at least partially optimized to perform a variety of mathematical functions, such as counting, incrementing, adding, subtracting, multiplying, dividing, etc.)

In a preferred embodiment, the microcontroller (which may be as described in U.S. patent application Ser. No. 10/033,027, may further include a microprocessor, a plurality of internal peripherals, an interconnecting component, an external coupling port, and a memory for storing instructions. The microprocessor processes information. The plurality of internal peripherals (which may be configured from the configurable analog and digital/mathematical blocks of circuitry) are programmably configurable to perform a variety of functions associated with the microcontroller. The interconnecting component may be programmably configurable for selectively interconnecting the internal peripherals and other internal microcontroller components. The external coupling port may be programmably configurable to implement different connectability states by which the electronic system is connectable to an external device. The memory may store instructions and data (e.g., a configuration image) directed at setting the configurations and functions allocated to the plurality of internal peripherals, the interconnecting component and the external coupling port.

DRAWINGS

DETAILED DESCRIPTION OF THE INVENTION

Figure 1:
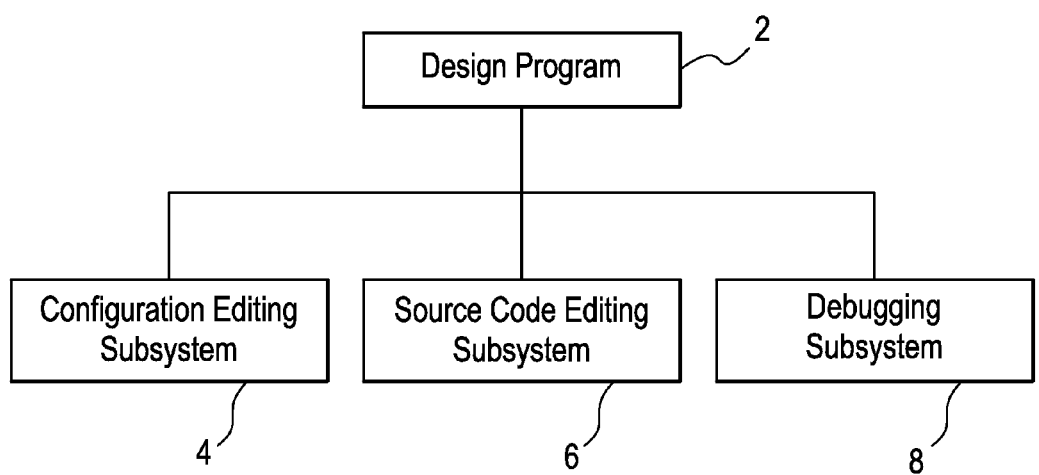
FIG. 1 is a box diagram showing a high-level architectural overview of an exemplary programmable device design/development software program and its primary components.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer, processor, controller and/or memory. These descriptions and representations are the means generally used by those skilled in data processing arts to effectively convey the substance of their work to others skilled in the art. A procedure, logic block, process, etc., is herein, and is generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

The present invention concerns an interface, method and system for dynamically (re)programming a programmable electronic device, comprising one or more configuration workspaces for configuring the programmable electronic device such that it has different functionalities at different times, and a separate "reconfiguration operations" workspace for adding, deleting, opening, closing, importing, exporting, saving and/or selecting a configuration and/or its corresponding workspace. The graphical depiction of a particular device configuration in a workspace on the screen or monitor of a general purpose computer or PC configured to run a software tool that includes the present interface is sometimes referred to as an "overlay."

For a given reprogrammable device having different time-multiplexed configurations and/or functionality, the software tool that designs, programs or configures each such configuration and/or functionality will have a number of viewing screens, windows or workspaces corresponding to the number of device configurations and/or functionalities. The view screen(s), window(s) or workspace(s) corresponding to a given/unique device configuration and/or functionality may sometimes be known as an "overlay." Thus, the software design, program, data file set or configuration(s) for a given reprogrammable device having different time-multiplexed configurations and/or functionality (a so-called "project") may contain multiple overlays.

Each overlay may be considered to be a hardware design within the programmable electronic device that exists at a given point in time to perform a given function. One overlay may be replaced or augmented (or partially replaced and partially augmented) by another overlay within the same project, to enable the device to perform two different functions (or have two different performance capabilities) at two different times. The two overlays map onto the same hardware resources in the device, and therefore, should be (and preferably are) time-multiplexed (i.e., operable in the device at mutually exclusive times, or configured such that at most one overlay is operable in the device at any given time). As a result, different functions and/or performance capabilities can be time-multiplexed within a single (re)programmable device by virtue of different overlays (e.g., different configuration data sets) that may be stored in memory that is in communication with the device. In the present system, such memory (which may be volatile, such as dynamic and/or static random access memory, non-volatile, such as EPROM, EEPROM, or flash memory, or both) is preferably on the same die as the electronic device (i.e., is monolithic).

In one embodiment, the programmable electronic device can be reconfigured dynamically; e.g., the different configurations and/or functionalities may be swapped or switched (partially or fully) "on the fly." At one instant in time, the device can configured using a first set of partially or fully programmed (and optionally pre-programmed) modules to transmit electrical signals (an exemplary "first overlay"), then within the time a processor takes to unload and load a set of registers or register banks, the same device can be reprogrammed with a second set of partially or fully programmed (and optionally pre-programmed) modules to receive electrical data signals (an exemplary "second overlay").

The present invention relates to an interface, system and method that enables such dynamic reconfiguration of a programmable electronic device, notably through software tools, operations, instructions and/or code that allows one to design, configure, create or modify multiple overlays or configurations, the active states of which are operably time-multiplexed in the device. For example, within a module or component placement and/or configuration workspace displayed by such software operating in a suitable computing environment, one may switch back and forth between different overlays to easily compare functional and/or performance (parameter value) similarities and differences between the different overlays. Thus, in a preferred embodiment in the present interface and system provides the first configuration with instructions, programming and/or information sufficient to enable reconfiguration of the device from said first configuration to said second, different configuration.

In a preferred embodiment, a tool having such a "reconfiguration operation" GUI for operating on overlays within a project created with the tool can also compute the hardware resources that are shared and/or that are different and/or not compatible between the different overlays. Such capability is useful because it enables the programmer to reprogram only those features, parameters and/or hardware resources that differ between the different overlays. Resources, features and/or parameters that are common to the different overlays need not be reprogrammed.

The present invention is related to several U.S. patent applications which are incorporate herein by reference. U.S. patent application Ser. No. 10/033,027, filed Oct. 22, 2001, entitled "MICROCONTROLLER PROGRAMMABLE SYSTEM ON A CHIP," describes a programmable microcontroller having configurable analog and digital blocks of circuitry that solves a number of the above-described obstacles. U.S. patent application Ser. No. 09/989,570, filed Nov. 19, 2001, entitled "METHOD FOR FACILITATING MICROCONTROLLER PROGRAMMING," describes a method, interface, software and system for designing and/or programming a circuit (such as a microcontroller) having configurable, programmable functions that can be embodied in configurable analog and/or digital blocks. U.S. patent application Ser. No. 09/989,571, filed Nov. 19, 2001, entitled "METHOD FOR DESIGNING A CIRCUIT FOR PROGRAMMABLE MICROCONTROLLERS," describes a methodology, interface, software and system by which a user programs and/or configures a programmable microcontroller having configurable and/or programmable functions that can be embodied in configurable analog and/or digital blocks of circuitry.

U.S. patent application Ser. No. 09/989,574, filed Nov. 19, 2001, entitled "METHOD AND SYSTEM FOR USING A GRAPHICS USER INTERFACE FOR PROGRAMMING AN ELECTRONIC DEVICE," describes a method, system and GUI for programming and/or configuring such a programmable microcontroller. U.S. patent application Ser. No. 09/989,817, filed Nov. 19, 2001, entitled "SYSTEM AND METHOD OF DYNAMICALLY RECONFIGURING A PROGRAMMABLE SYSTEM ON A CHIP," describes an improved programmable electronic device wherein instructions stored in memory facilitate dynamic reconfiguration of the device. Based upon the existence of a predetermined condition, the electronic device is automatically reconfigured by activating different configuration images.

FIG. 1 is a block-level overview of an exemplary software program or tool 2 for designing, configuring and/or programming a programmable electronic device, such as a mixed signal integrated circuit having configurable analog and/or digital circuit/function blocks (see, e.g., U.S. patent application Ser. No. 10/033,027.

In a preferred embodiment, the tool 2 is exemplified by PSoC Designer™ software (for designing and/or configuring programmable analog and/or digital functional blocks and/or modules of circuitry in a programmable integrated circuit; see version 3.10, available from Cypress MicroSystems, Inc., Bothell, Wash., or from the world wide web at http://www-.cypressmicro.com/).

Tool 2 may contain one or more component subsystems: a device configuration editing subsystem 4 (known as "Device Editor" in PSoC Designer™ software), a source code editing subsystem 6 (known as "Application Editor" in PSoC Designer™ software), and a debugging subsystem 8 (known as "Debugger" in PSoC Designer™ software). A preferred embodiment of the present system comprises at least device configuration editing subsystem 4. Source code editing subsystem 6 enables further customization of device configurations and operation(s), and debugging subsystem 8 enables testing of device configuration(s) and/or programming. Thus, although preferred, subsystems 6 and 8 are optional in the present invention. For detailed descriptions of particularly preferred, working embodiments of device configuration editing subsystem 4, source code editing subsystem 6, and debugging subsystem 8, see the PSoC Designer IDE User Guide, version 1.13 (available from Cypress MicroSystems, Inc., Bothell, Wash., or from the world wide web at http://www.cypressmicro.com/).

Figure 2:
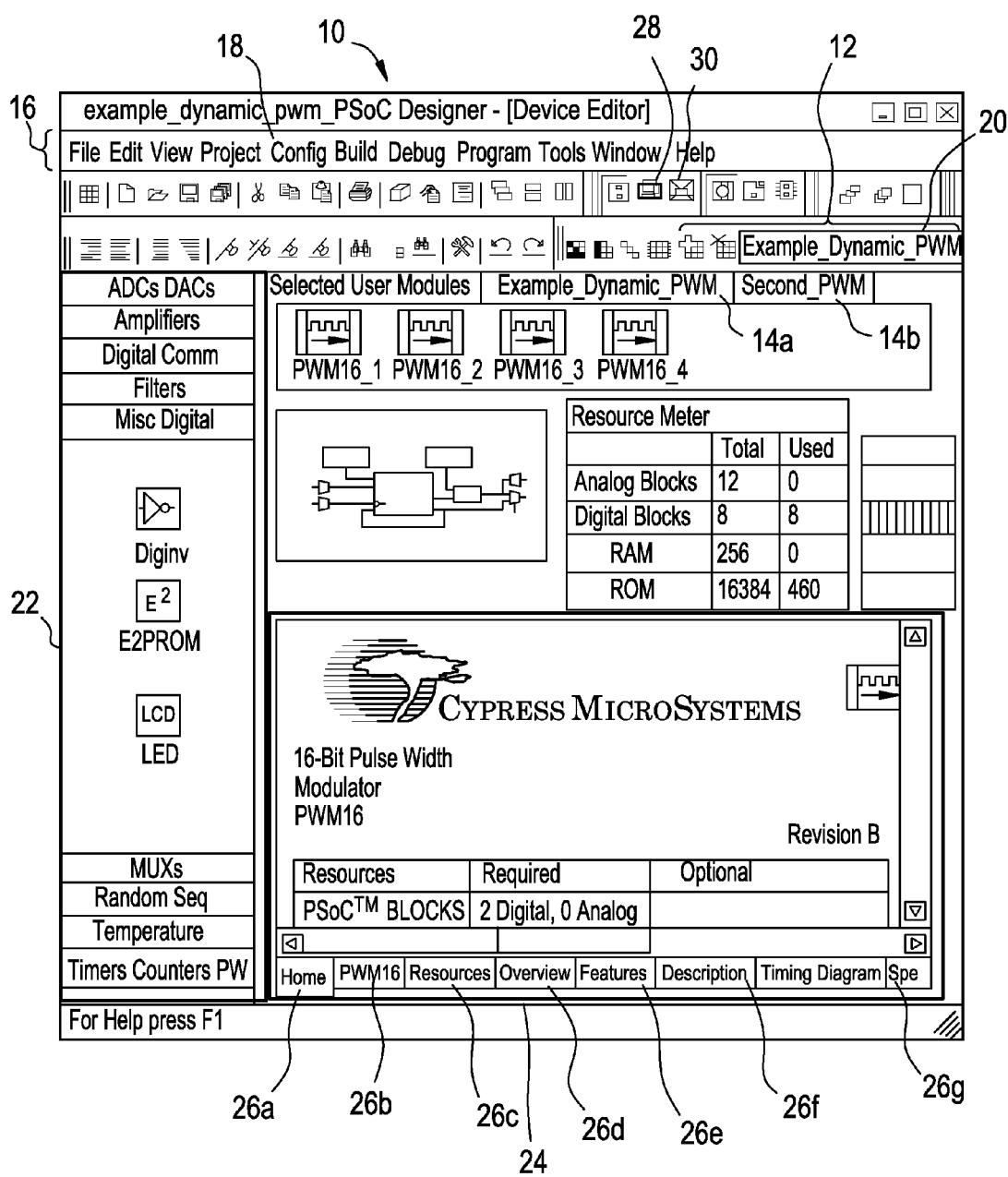
FIG. 2 is a screen view of a first configuration for an exemplary programmable device, as seen in a user module/datasheet view of the configuration editing subsystem component of FIG. 1.

FIG. 2 shows an exemplary functional block or module "selection" view 10 within configuration editing subsystem 4 of tool 2 in FIG. 1. (For a general description of an exemplary configuration editing subsystem 4, see, e.g., U.S. patent application Ser. Nos. 09/989,570 and 09/989,571, each of which was filed Nov. 19, 2001.) In FIG. 2, the present interface is embodied in toolbar 12, which is sometimes referred to herein as a "reconfiguration operation" toolbar, and tabs 14a and 14b, which are sometimes referred to herein as "overlay" or "configuration" tabs. Alternatively (or additionally), the present interface can be implemented as a dropdown list in box 20 (which, as shown, may be contained within workspace 12) and/or as one or more commands (each of which may optionally contain one or more subcommands) under a heading in menu 16, such as "Config" 18.

The configuration workspace(s) in the present graphical user interface may contain commands, operations and/or instructions for adding a new or existing configuration, deleting an existing or open configuration, saving an open configuration, importing a saved configuration, exporting a completed configuration, and/or selecting between at least first and second configurations. Preferably, the commands and/or operations carried out through the interface comprise adding a configuration, deleting a configuration, and selecting a different configuration, more preferably further including importing a configuration and exporting a configuration.

Figure 6:
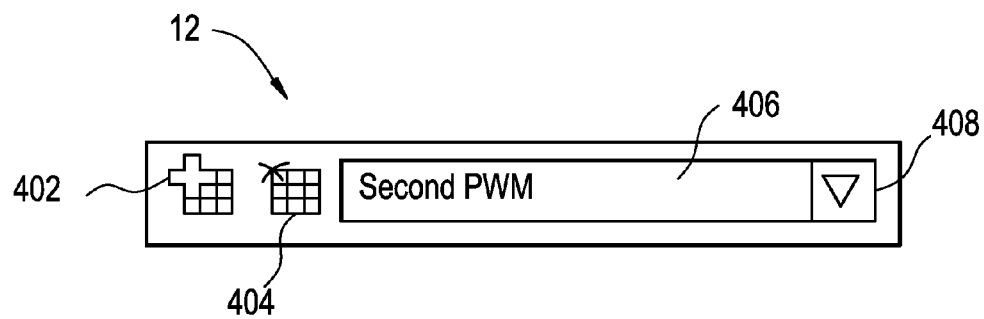
FIG. 6 shows a toolbar (GUI) configured for adding, deleting or switching between configurations in an exemplary dynamic reconfiguration process.
Figure 7:
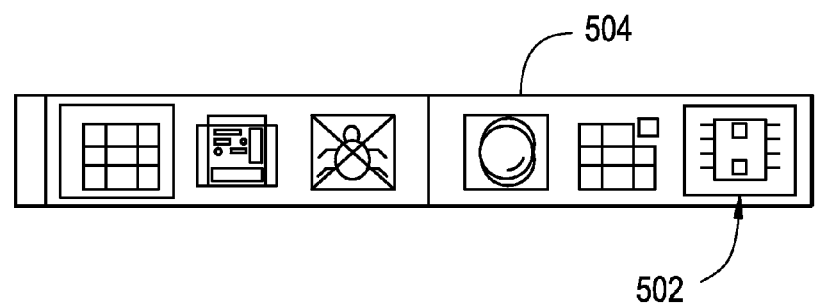
FIG. 7 shows an icon-based GUI for selecting between the different subsystems in the program of FIG. 1 and between different exemplary views of the configuration editing subsystem component of FIG. 1.

Referring now to FIG. 6, toolbar 12 comprises a plurality of icons 402 and 404 and down-arrow box 406. Icons 402 and 404 carry out reconfiguration operations, such as adding a new configuration (e.g., icon 402) or deleting an open configuration (e.g., icon 404). These icons are not required to practice the present invention; menu- and down-arrow-based alternatives are described elsewhere herein. Additional or alternative icons can be added or substituted for additional or other commands, functions or operations. Down-arrow box 406, when activated by clicking on down-arrow 408, explodes into a list (not shown) containing the names of all overlays in the project. Optionally, this "down-arrow list" may further include a selection/entry for a new configuration (e.g., "[New Config]"). It is noted that the overlay shown in down-arrow box 406, named "Second_PWM," differs from the overlay shown in down-arrow box 20 in FIG. 2 (from a working embodiment; see elsewhere herein for details).

Figure 3:
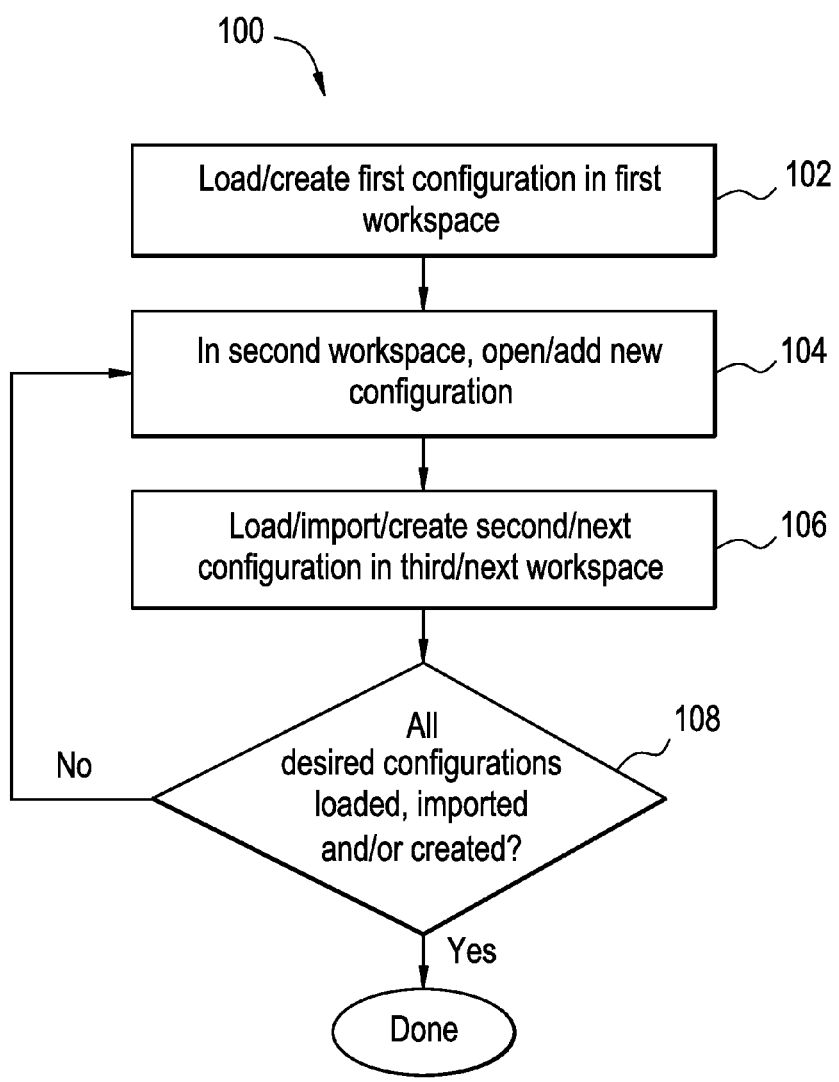
FIG. 3 is a flow chart describing a basic dynamic reconfiguration process.

FIG. 3 is a flow chart of dynamic reconfiguration method 100, one embodiment of the present invention. In step 102, a first configuration (or "overlay") is loaded or created in a first (configuration and/or placement) workspace. The workspace(s) for configuring, designing, developing or modifying an overlay may have a plurality of different subworkspaces (in FIG. 2, see, e.g., [preconfigured] user module selection workspace 22, user module configuration workspace 24), each of which may have a plurality of different selectable views (in FIG. 2, see, e.g., tabs 26a-26g).

At any point (but preferably after the first configuration/overlay has been loaded and/or is otherwise completed and/or functionally operable), in step 104, one may activate (e.g., open, add or select) a new configuration in a second (e.g., "reconfiguration operation") workspace. Preferably, the software tool is configured (using conventional techniques) such that the first configuration or overlay defines a set of valid (e.g., allowed, permissible and/or legal) states for the second, new configuration or overlay. Conversely, the software tool is also preferably configured (using conventional techniques) such that the first configuration or overlay enables a highlighting or alerting function in the second, new overlay when an invalid configuration or state (e.g., not allowed, impermissible and/or illegal) is entered, designed, programmed or configured therein.

In step 106, one configures (e.g., creates, designs, develops, loads and/or modifies) the second (or next incremental) configuration or overlay for the device in a third (or next incremental) configuration or placement workspace. The workspace for the second (or next incremental) configuration or overlay may occupy the same or different display area as the workspace for the first (or any previous) configuration or overlay. Preferably, the default workspace areas for each overlay are coextensive (i.e., the same). However, and preferably, a user may adjust the workspace boundaries for a given overlay in a project as desired. Thus, the workspaces for different overlays may not necessarily coincide, and they can be adjusted or modified such that two or more overlays are partially or completely visible (but, preferably, only one configuration workspace at a time is active, to avoid potential automatic source code generation errors).

Decision point 108 is where the user decides whether to create a new, incremental overlay. If, for example, after two overlays have been created, the user determines that all desired time-multiplexed device functionalities in the project have been loaded, imported, created and/or added, the user is done. On the other hand, for example, if the user determines that, after two overlays have been created, more time-multiplexed device functionalities are desired in the project, the user may return to step 104 and activate a new, incremental overlay in the second (reconfiguration operation) workspace. The cycle of steps 104, 106 and 108 may be repeated as often as the user likes, until all of the desired time-multiplexed device functionalities, configurations and/or performance capabilities have been designed into the project.

In one embodiment of the present invention, the configuration images are provided by a design tool (e.g., a computer implemented software design tool). Additional details on an exemplary implementation of a present invention design tool are set forth in co-pending commonly-owned U.S. patent application Ser. No. 09/989,570 filed Nov. 19, 2001, entitled "METHOD FOR FACILITATING MICROCONTROLLER PROGRAMMING", which is incorporated herein by reference, and U.S. patent application Ser. No. 09/989,819 filed Nov. 19, 2001, entitled "A SYSTEM AND METHOD FOR CREATING A BOOT FILE UTILIZING A BOOT TEMPLATE", also incorporated herein by reference.

In one further embodiment, the design process embodied in design program 2 (FIG. 1) and the reconfiguration development process 100 (FIG. 3) may be carried out by a computer system under the control of computer-readable and computer-executable instructions directed at implementing such a process. One embodiment of an exemplary computer system utilized to implement design tool process 400 is set forth in incorporated U.S. patent application Ser. No. 09/989,570, filed Nov. 19, 2001, entitled "METHOD FOR FACILITATING MICROCONTROLLER PROGRAMMING". The computer-readable and computer-executable instructions reside, for example, in data storage features of the computer system such as a computer usable volatile memory, computer-usable non-volatile memory and/or data storage device. The computer-readable and computer-executable instructions direct the computer system operation (e.g., a processor) in accordance with the process of design tool 2 and/or dynamic reconfiguration flow 100.

Although specific steps are disclosed in process 100 of FIG. 3, such steps are exemplary. That is, the present invention is well suited to use with various other steps or variations of the steps recited in process 100. Additionally, for purposes of clarity and brevity, the discussion is directed at times to specific examples. The present invention, design tool 2 and/or process 100, however, are not limited to designing a sole particular target device (e.g., a mixed signal device and/or microcontroller). Instead, the present invention is well suited to use with other types of computer-aided hardware and software design systems in which it may be desirable to accomplish a multitude of tasks as part of an overall process directed at designing an electronic device.

One aspect of the invention described herein includes the generation of automatic interrupts and/or "API's," by the software tool that contains, configures and/or controls the present interface. The interrupts and/or "API's," load, unload and/or reload the device registers, effectively reprogramming and/or reconfiguring the device to conform with a different overlay. Each overlay contains a set of instructions, tables and/or data (which may be compiled from one or more sets of corresponding instructions, tables and/or data in one or more user modules incorporated into the overlay) that generate the API's in accordance with the programming and/or configuration in the overlay. For example, if a first overlay defines an event monitor (e.g., a temperature or light sensor), then that first overlay is configured to generate an API when the event being monitored occurs. At that point, the API unloads the first overlay and loads a second overlay (which may be a data transmitter, UART or modem that reports the occurrence of the event). Alternatively, an API can be generated from a preset timer (for which a variety of user modules exist), for applications in which collection and/or reporting of data at specific time intervals is desired.

EXAMPLE

PSoC Designer software (version 3.10, dated Apr. 16, 2002; for designing and/or configuring programmable analog and/or digital functional blocks and/or modules of circuitry in a programmable integrated circuit) was downloaded from the Cypress MicroSystems, Inc., web site (at http://www.cypressmicro.com/) onto a Gateway Solo laptop computer having at least the minimum requirements for installing and operating the software. The software was installed according to the provider's instructions. After rebooting to allow new computer settings to take effect, the PSoC Designer software was launched and the "Dynamic PWM example" project (time-multiplexed pulse width modulator) was loaded.

The PSoC Designer IDE User Guide, version 1.13, was also downloaded onto the Gateway Solo laptop computer. Section 6 of the User Guide was consulted for reference to dynamic reconfiguration.

Dynamic reconfiguration allows for microcontroller applications to dynamically load and unload configurations. With this feature, a single MCU can have multiple functions. Upon installing and launching an appropriate version of software that contains dynamic reconfiguration capabilities, an example project that has multiple configurations was selected.

In the Start dialog box, a subsystem icon (preferably Device Editor) was selected by clicking on the icon, and C:\Program Files\Cypress Micro-Systems\Designer\ Examples\Example_Dynamic_PWM\Example_Dynamic_ PWM.SOC was opened. Using the example project, features of dynamic reconfiguration were sampled.

Adding a Configuration

To add a loadable configuration to the project, the following steps were executed (the designer, device editor, and target project files/workspaces were open). From the menu, Config>>Loadable Configuration>>New were clicked/selected. Alternatively, the "New Configuration" (left-most) icon 402 in the dynamic reconfiguration toolbar 12 was clicked (see FIG. 6). The name of the new configuration is Config1 (and each additional configuration will take on consecutive numbering, i.e., Config2, Config3, Config4, etc.).

Upon the addition of a new configuration, a new tab 406 appeared directly below the dynamic reconfiguration toolbar 404, and a drop-arrow selection 408 appeared in the dynamic reconfiguration toolbar 404, both bearing the name Config1. The different project configurations were selected (or "moved between") by clicking on the corresponding tabs. Whichever tab is selected dictates the project configuration, regardless of the view. All views showed the settings or configuration for the project configuration of the current tab.

There is at least one tab with the project name when a project is created. This tab represents the base configuration and has special characteristics. In this embodiment of the software, the base configuration cannot be deleted but can be exported. Any new configuration, by default, has global settings and pin settings identical to the base configuration.

The configuration name (to be configuration or project specific) was changed by double-clicking (or right-clicking) the tab 406 and typing the new name. The new name appeared on the tab 406 and in the drop-arrow selection 408 in the dynamic reconfiguration toolbar 404. The configuration corresponding to that named in the tab 406 (and drop-arrow selection 408) now was the currently "loaded" working configuration.

The configuration process (i.e., selecting and placing user modules, setting up parameters, and specifying pinout) was conducted according to the procedures defined elsewhere in the PSoC Designer IDE User Guide, version 1.13, the relevant portions of which are incorporated by reference herein, and described generally in copending U.S. patent application Ser. Nos. 09/989,570 and 09/989,571, each of which was filed Nov. 19, 2001.

To avoid confusion in code generation, user module instance names should be unique across all configurations (i.e., a user module name in one configuration should not be re-used in a different configuration). Otherwise, the functions of all other icons and menu items in the software are identical to projects that do not employ additional configurations. In this embodiment of the software, additional configuration tabs appear in alphabetical order from left to right (beginning after the base configuration tab).

Importing a Configuration

In order to import an existing configuration (e.g., a .cfg file), the desired configuration to be imported must have been previously exported (i.e., the .cfg file generated). See the "Exporting a Configuration" section below for details. To import a loadable configuration to a project using dynamic reconfiguration, the following steps are executed (the designer, device editor, and target project files/workspaces were open):

1. From the menu, Config>>Loadable Configuration>>Import were each selected.
2. In the Import Loadable Configuration dialog box, the .cfg file to be imported was located (i.e., to be added to the open project). One may also specify whether to auto-load configuration information, which is done (in this embodiment, checked) by default.
3. "OK" was clicked.

Once the configuration was imported (added), it was loaded and ready for further developing, manipulating and/or configuring.

Exporting a Configuration

To export a loadable configuration from a project (to later be imported to a different project), the following steps were executed (the designer, device editor, and target project files/workspaces were open):

1. From the menu, Config>>Loadable Configuration>>Export were each selected/clicked.
2. In the Export Loadable Configuration dialog box, the configuration, by name, to be exported was selected/clicked (to be later imported to a project). One may select all configurations by holding the [Shift] key and dragging the mouse down, or alternatively, certain specific configurations may be selected by holding the [Ctrl] key and clicking only those desired configurations.
3. "OK" was clicked.
4. In the Save Loadable Configuration dialog box, the configuration name was typed and the file path designated. In this embodiment, notes could be added for later reference.
5. "OK" was clicked.

These steps created an exported configuration (e.g., a .cfg file) that can now be imported (added) to another project (see, e.g., "Importing a Configuration" above for details).

Deleting a Configuration

To delete a loadable configuration from your project, the following steps were executed (the designer, device editor, and target project files/workspaces were open):

1. From the menu, Config>>Loadable Configuration>>Delete were clicked. Alternatively, the "Delete Configuration" icon 404 (see FIG. 6) could be clicked, or tab 14a or 14b (see FIG. 2) of the configuration to be deleted could be right-clicked and "Delete" selected.
2. Once deleting the configuration was selected, the software asked to confirm the selection. "Yes" was clicked. (Alternatively, to cancel the "delete" operation, one may click "No.")

Once a configuration is deleted, the associated source files are removed from the project (if application files had been generated).

Global Parameters and Dynamic Reconfiguration

When employing dynamic reconfiguration, global parameters are set in the same manner as in a project having a single configuration. However, in this example of dynamic reconfiguration, changes to base configuration global parameters were propagated by default to all additional configurations. Therefore, global parameter changes made to an additional configuration are done locally to only that particular configuration. The code generation operation (Application Generation icon 28 in FIG. 2) considered global parameter changes made to some, but not all, configurations to determine compatibility issues and the possibility of invalid states between the different configurations. These so-called "local" global parameter changes should be made cautiously to prevent unexpected configuration incompatibility issues.

Pin Settings and Dynamic Reconfiguration

When employing dynamic reconfiguration, port pin settings are similar to global parameters in that all settings in the base configuration are propagated to additional configurations. When manually set, port pin settings become local to the configuration.

Port Pin Interrupts

Figure 4:
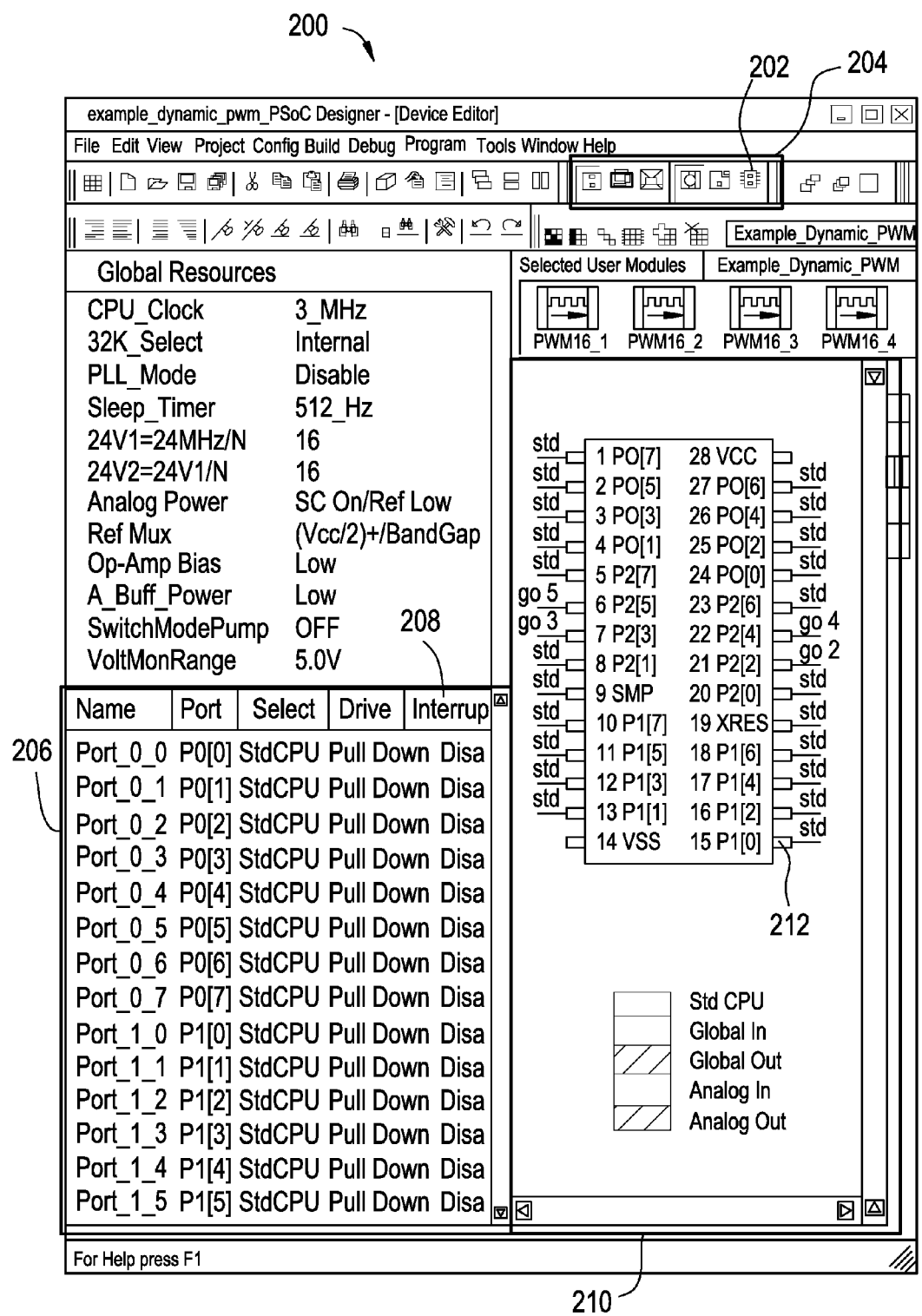
FIG. 4 is a screen view of the first configuration of FIG. 2, as seen in a pinout view of the configuration editing subsystem component of FIG. 1.

To enable port pin settings that are local to a particular configuration, port pin interrupts are created. To set port pin interrupts, execute the following steps:

1. The Pin-out View mode 200 of the device editor workspace was accessed by clicking on icon 202 in toolbar 204 (see FIG. 4).
2. The drop-arrow item 408 or tab 14a/14b was selected that corresponds to the configuration view for which port pin interrupts were to be set.
3. The pin interrupt was set in either of two places: (a) in the Pin Parameter Grid 206 (see FIG. 4), under the Interrupt column 208; or (b) through the pop-up menu (not shown) that appears when a pin (e.g., 212) in the pin-out diagram 210 is clicked.

In the Pin Parameter Grid 206, the drop-down list was accessed by clicking the drop-arrow (not shown) in the Interrupt column 208 and highlighting a selection. In the pop-up menu (not shown) on diagram 210, the interrupt setting appears in a list along with the select and drive options. Clicking the Port Pin Interrupt option enables the same drop-arrow selection as in the Pin Parameter Grid 206. A choice is selected by double-clicking.

The default pin interrupt setting is "Disable." In this embodiment, if all pin interrupts are set to "Disable," there is no additional code generated for the pin interrupts. If at least one pin is set to a value other than "Disable," code generation performs some additional operations. In boot.asm, the vector table is modified so that the GPIO interrupt vector has an entry with the name ProjectName_GPIO_ISR. Additional files (e.g., PSoCGPIOINT.asm and PSoCGPIOINT.inc) are generated as necessary and/or desired.

PSoCGPIOINT.asm contains an export and a placeholder label so the appropriate pin interrupt handling code can be entered. This file is generated once and treated in a similar way to the user module interrupt source files in that they are generated once, and then are not overwritten in subsequent code generation cycles.

PSoCGPIOINT.inc contains equates that are useful in writing the pin interrupt handling code. For each pin (with enabled interrupt or custom name), a set of equates are generated that define symbols for (i) the data address and bit, and (ii) the interrupt mask address and bit associated with the pin. In this embodiment, the naming convention for the equates is:

CustomPinName_Data_ADDR
CustomPinName_MASK
CustomPinName_IntEn_ADDR
CustomPinName_Bypass_ADDR
CustomPinName_DriveMode_0_ADDR
CustomPinName_DriveMode_1_ADDR
CustomPinName_IntCtrl_0_ADDR
CustomPinName_IntCtrl_1_ADDR The CustomPinName is replaced by the name entered for the pin during code generation. Custom pin naming allows one to change the name of the pin. The name field is included in the pin parameter area of the pin-out diagram.

The Name column in the Pin Parameter Grid 602 shows the names assigned to each of the pins. The default name shows the port and bit number. The name field may be double-clicked and the custom name typed in. In this embodiment, the name cannot include embedded spaces. The pin name is primarily used in code generation when the pin interrupt is enabled. The pin name may be appended to the equates that are used to represent the address and bit position associated with the pin for interrupt enabling and disabling, as well as testing the state of the port data.

Code Generation and Dynamic Reconfiguration

When more than one configuration is present in a project, there is a considerable difference in code generation and the files generated, although the user module files may be generated identically to previous versions. Differences are described below.

PSoCConfig.asm

The static PSoCConfig.asm file contains exports and code for:

LoadConfigInit: Initial configuration-loading function
LoadConfig_projectname: Load configuration function
and code only for:
LoadConfig: General load registers from a table For projects with more than one configuration, a variable is added to the bottom of the file that tracks the configurations that are loaded. The LoadConfig function does not change at all. The LoadConfig_projectname function includes a line that sets the appropriate bit in the active configuration status variable. The name of this variable is fixed for all projects. Additional variables that shadow the "write only" registers are added when useful and/or needed.

Additional functions named LoadConfig_configurationname are generated with exports that load the respective configuration. These functions are the equivalent of the LoadConfig_projectname function, including the setting of the bit in the active configuration status variable. The only difference is that LoadConfig_configurationname loads values from LoadConfigTBL_configurationname_Bankn, and there is some additional code that manages the values of any global registers that are changed in the configuration relative to the base configuration.

For each LoadConfig_xxx function, an UnloadConfig_xxx function is generated and exported to unload each configuration, including the base configuration. The UnloadConfig_xxx_Bankn operations are similar to the LoadConfig_xxx functions except that they load an UnloadConfigTBL_xxx_Bankn register (or register set or bank) and clear a bit in the active configuration status variable. In these functions, the global registers are restored to a state that depends on the currently active configuration.

With regard to the base configuration, UnloadConfig_xxx and ReloadConfig_xxx functions are also generated. These functions load and unload only user modules contained in the base configuration. When the base configuration is unloaded, the ReloadConfig_xxx function must be used to restore the base configuration user modules. The ReloadConfig_xxx function ensures the integrity of the "write only" shadow registers. Respective load tables are generated for these functions in PSoCConfigTBL.asm.

An additional unload function is generated as UnloadConfig_Total, which loads tables UnloadConfigTBL_Total_Bank0 and UnloadConfigTBL_Total_Bank1. These tables include the unload registers and values for all blocks. The active configuration status variable is also set to 0. The global registers are not set by this function.

The name of the base configuration matches the name of the project. The project name changes to match the base configuration name if the name of the base configuration is changed from the project name.

A "C" callable version of each function is defined and exported so that these functions can be called from a "C" program.

PSoCConfigTBL.asm

PSoCConfigTBL.asm contains the personalization data tables used by the functions defined in PSoCConfig.asm. For static configurations, there are only two tables defined: LoadConfigTBL_projectname_Bank0 and LoadConfigTBL_projectname_Bank1, which support the LoadConfig_projectname function. These tables personalize the entire global register set and all registers associated with blocks that are used by user modules placed in the project.

For projects with additional configurations, a pair of tables are generated for each LoadConfig_xxx function generated in PSoCConfig.asm. The naming convention follows the same pattern as LoadConfig_xxx and uses two tables: LoadConfigTBL_xxx_Bank0 and LoadConfigTBL_xxx_Bank1. UnloadConfigTBL_xxx_Bank0 and UnloadConfigTBL_xxx_Bank1 are used by UnloadConfig_xxx. The labels for these tables are exported at the top of the file.

The tables for the additional configurations' loading function differ from the base configuration load table in that the additional configuration tables only include those registers associated with blocks that are used by user modules placed in the project and only those global registers with settings that differ from the base configuration. If the additional configuration has no changes to the global parameters or pin settings, only the placed user module registers are included in the tables.

The tables for additional configurations' unloading functions include registers that deactivate any blocks that were used by placed user modules, and all global registers which were modified when the configuration was loaded. The registers and the values for the blocks are determined by a list in the device description for bitfields to set when unloading a user module, and are set according to the type of block. The exceptions are the UnloadConfigTBL_Total_Bankn tables, which include the registers for unloading all blocks.

boot.asm

The boot.asm file is generated similarly to a project that has no additional configurations unless there are one or more configurations that have user modules placed in such a way that common interrupt vectors are used between configurations. In this case, the vector entry in the interrupt vector table will show the line "ljmp Dispatch_INTERRUPT_n" instead of a user module defined Interrupt Service Routine.

New Files

There are three new files that are generated when additional configurations are present in a project (while the exemplary file names given below may be changed, the corresponding functions will be the same regardless of the actual file names used):

PSoCDynamic.inc
PSoCDynamic.asm
PSoCDynamicINT.asm

The PSoCDynamic.inc file contains a set of equates that represent the bit position in the active configuration status variable, and the offset to index the byte in which the status bit resides if the number of configurations exceeds eight. A third equate for each configuration indicates an integer index representing the ordinal value of the configuration.

The PSoCDynamic.asm file contains exports and functions that test whether a configuration is loaded or not. The naming convention for these functions is IsOverlayNameLoaded.

The PSoCDynamicINT.asm file is generated only when the user module placement between configurations results in both configurations using a common interrupt vector. The reference to Dispatch_INTERRUPT_n function is resolved in this file. For each conflicting interrupt vector, one of these ISR dispatch sets is generated. The ISR dispatch has a code section that tests the configuration that is active and loads the appropriate table offset into a jump table immediately following the code. The length of the jump table and the number of tests depends on the number of user modules that need the common vector rather than the total number of configurations. The number of conflicts can equal the number of configurations if each configuration utilizes the common interrupt vector. Generally, there will be fewer interrupt conflicts on a per vector basis.

The Application (Source Code) Editor Workspace and Dynamic Reconfiguration

Figure 5:
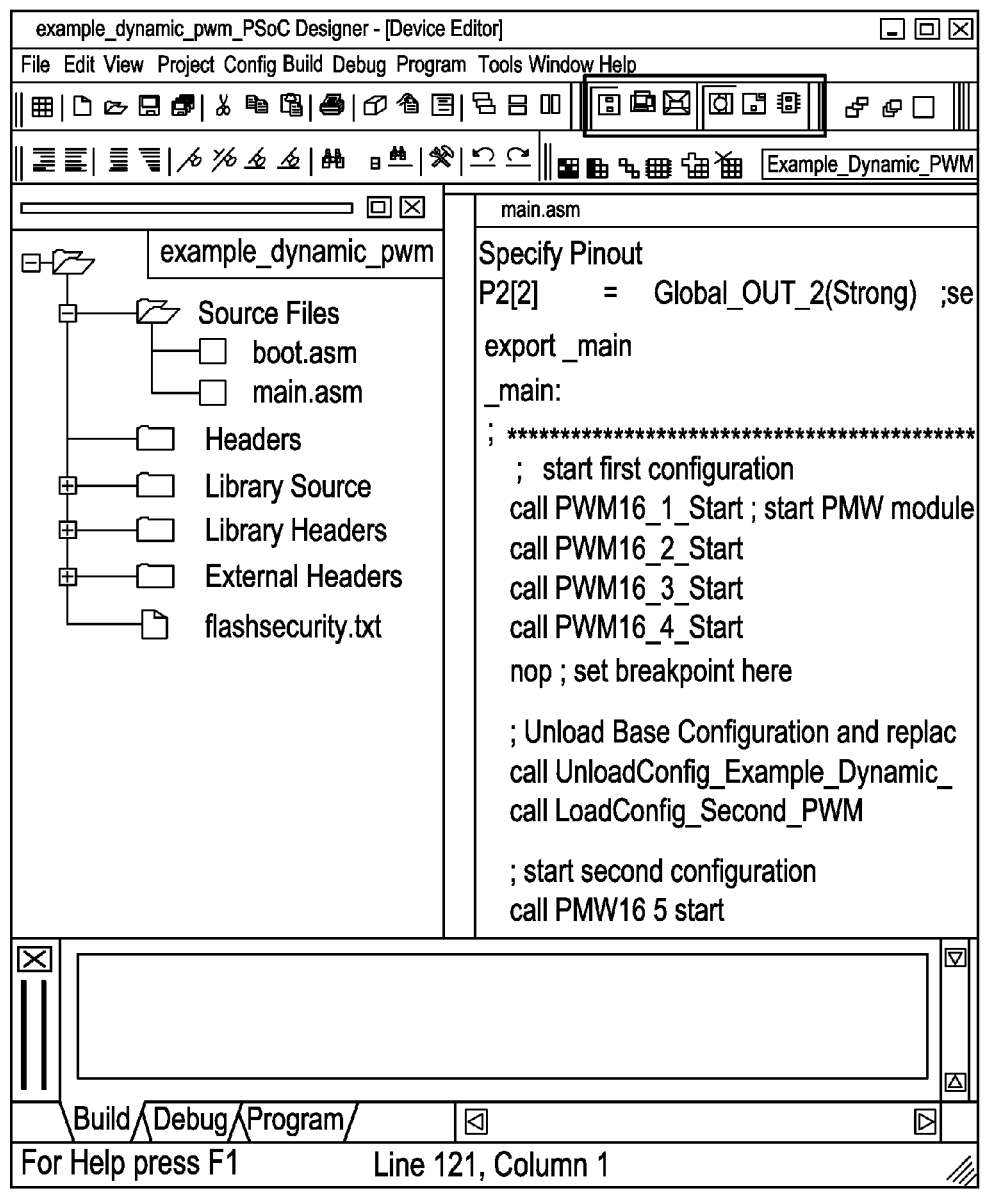
FIG. 5 is a screen view of the source code editing subsystem component of FIG. 1 for the exemplary programmable device of FIG. 2.

The application (e.g., source code) editor (see, e.g., FIG. 5) operates essentially as set forth in the PSoC Designer IDE User Guide, version 1.13, and as described generally in copending U.S. patent application Ser. Nos. 09/989,570 and 09/989,571, each of which was filed Nov. 19, 2001. The additional files generated are placed in the Library Source and Library Headers folders of the source tree. Library source files that are associated with an additional configuration are shown under a folder with the name of the configuration. This partitions the files so that the source tree view is not excessively long.

The Debugger Workspace and Dynamic Reconfiguration

A debugging subsystem in the downloaded software now displays currently loaded configuration names and input/output (I/O) register labels during debugging halts. The I/O register grid labels are compiled from the labels for all currently loaded configurations.

The names of loaded configurations are displayed in a new debugging view (see, e.g., menu item 30 in FIG. 2). The new view is a new tab titled "Config" below the memory map (which already contains RAM, I/O Banks 0,1, and Flash tabs).

The I/O register labels modify the existing I/O register bank grids. In addition to setting I/O register labels on entry to the debugger workspace, labels are updated on M8C (microcontroller) halts if the set of loaded user modules has changed since the last halt.

The debugger workspace obtains the active configuration names from the runtime configuration data stored in M8C RAM. This data is maintained by the "LoadConfig" and "UnloadConfig" routines generated by the Device Editor software.

Active Configuration Display

The set of currently active configurations is displayed in the "Config" tab of the memory map during debugging software halts. The display lists all project configurations with the status for each currently loaded configuration marked "Active." The display may not be valid immediately after a reset. In this embodiment, the initialization code must run before the "Config" tab display is valid.

Active Configuration I/O Register Labels

The debugging software I/O register bank labels (Bank 0, Bank 1) are updated to match the user modules defined in the currently active configurations.

Active Configuration Limitations

The new displays are based on a bitmap of loaded configurations maintained by the "LoadConfig" and "UnloadConfig" routines, which are generated by the Device Editor software. This bitmap can get out-of-sync with the actual device configuration in several ways:

The bitmap's RAM area can be accidentally overwritten.

Overlapping (conflicting) configurations, loaded at the same time, may scramble the register labels.

If an overlapping configuration is loaded and then unloaded, register labels from the original configuration may be used, even though some blocks will have been cleared by the last "UnloadConfig" routine.

Active Configuration Display Test

The new display features can be tested with a single project that loads and unloads configurations containing overlapping user modules. The test project should have a base configuration that defines one or more user modules and several overlay configurations, some conflicting and some not conflicting. The test project should load and unload configurations in various combinations. After each load and unload operation, the status of the active configuration display and the register label display should be checked.

Checking the displays after loading and unloading conflicting configurations is recommended.

CONCLUSION/SUMMARY

Thus, the present invention provides a convenient, simple and efficient interface for dynamically configuring an electronic device (e.g., a mixed signal integrated circuit such as a microcontroller).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An electronic computer system for enabling dynamic reconfiguration of a programmable electronic device, comprising:
   a) a first graphical user interface (GUI) workspace including a set of functions and a plurality of user selectable views, said first GUI generated responsive to user interaction to create in said first GUI workspace on a screen display having a first configuration of the programmable electronic device comprising configurable analog and digital circuit blocks;
   b) a second GUI workspace activated in response to user selection of a screen display icon, tab, an item from a pulldown menu or a down-arrow list of a reconfiguration operation toolbar, to create another screen display of a third GUI workspace having the same or a subset of said functions of said first workspace in an alternative second configuration;
   c) said GUI third workspace including a plurality of user selectable views and user interactive capabilities, programming, operations and information provided by said GUI for configuring said alternative second configuration for said programmable electronic device comprising configurable analog circuit blocks and configurable digital circuit blocks, wherein said first and alternative second configurations have a same pin out;
   d) said electronic computer system operable to compute and indicate hardware resources that are shared, resources that are different or resources that are not compatible between said first configuration and said alternative second configuration; and
   e) tangible storage to store said first and said alternative second configurations for loading to said programmable electronic device.

2. The electronic computer system of claim 1, wherein said second GUI workspace comprises means for adding, deleting, saving, importing, exporting and selecting a configuration.

3. The electronic computer system of claim 1, wherein said first GUI workspace comprises a first set of configurability functions and parameter values, said third GUI workspace comprises a second set of configurability functions and parameter values, and said second set of configurability functions and parameter values contains at least a subset of the first set of configurability functions and parameter values.

4. The electronic computer system of claim 1, further comprising a fourth GUI workspace for configuring the electronic device such that it has a third configuration at a third time.

5. The system of claim 1, wherein said third GUI workspace has a first view that is superimposable onto a corresponding second view in said first GUI workspace.

6. The system of claim 1, wherein said first configuration contains global device parameter values, said alternative second configuration contains local device parameter values, and said local device parameter values contain at least a subset of said global device parameter values.

7. A non-transitory computer readable storage media having computer executable instructions stored thereon that when executed by a computer aided design system cause the computing device to perform a method comprising:
   a) interacting with a first workspace of a graphical user interface (GUI) in a computer system to define a screen display of a first configuration of a programmable electronic device comprising a plurality of configurable analog circuit blocks and a plurality of configurable digital circuit blocks, said first workspace including a set of selectable functions and selectable views for configuring said configurable analog circuit blocks and said configurable digital circuit blocks, wherein said first configuration also defines a set of valid and invalid states for a second alternative configuration for said programmable electronic device;
   b) interacting with the GUI in a second workspace, said interacting including selecting an icon, a tab, an item from a pulldown menu or a down-arrow list of a reconfiguration operation toolbar, to enable reconfiguration of said programmable electronic device by interaction with the GUI in a third workspace comprising a plurality of selectable views and having the same or a subset of functions of said first workspace;
   c) selectively interacting with at least one of: capabilities, programming, operations, or information provided by said GUI and interacting with the plurality of selectable views comprising the third workspace of the GUI to define and create a screen display of said alternative second configuration for said programmable electronic device comprising configurable analog circuit blocks and configurable digital circuit blocks, said alternative second configuration having a same pinout as a pinout of the first configuration;
   d) computing hardware resources that are shared, resources that are different or resources that are not compatible between said first configuration and said second configuration, wherein said computing is performed in the electronic system; and
   e) storing said first and alternative second configurations in a computer system.

8. The computer-readable storage media of claim 7 wherein said third workspace is superimposable on said first workspace.

9. The computer-readable storage media of claim 7 wherein a)-c) are performed by a software design tool operable on a general purpose computer system.

10. The computer-readable storage media of claim 7, including storing said first and said alternative second configurations in memory of a programmable electronic device for programming selective operation of said programmable electronic device alternatively in said first configuration or in said second configuration.

11. The computer-readable storage media of claim 10, wherein the first and alternative second configurations include instructions effective to reconfigure the programmable electronic device from said first configuration to said alternative second configuration in response to occurrence of a predetermined event.

\* \* \* \* \*